United States Patent

Ito et al.

[11] Patent Number: 6,154,278
[45] Date of Patent: Nov. 28, 2000

[54] OPTICAL ENCODER FOR OPTICALLY MEASURING DISPLACEMENT OF MOVING BODY

[75] Inventors: Masami Ito, Moriguchi; Makoto Kato, Nishinomiya; Kanji Nishii; Atsushi Fukui, both of Osaka; Keiichi Fujikawa, Hirakata, all of Japan

[73] Assignee: Matsushita Electric Industrial Co., Ltd., Osaka, Japan

[21] Appl. No.: 08/258,465

[22] Filed: Jun. 10, 1994

[30] Foreign Application Priority Data

| Jun. 10, 1993 | [JP] | Japan | 5-138043 |
| Nov. 12, 1993 | [JP] | Japan | 5-283542 |
| Mar. 30, 1994 | [JP] | Japan | 6-060759 |

[51] Int. Cl.$^7$ ................................................. G01B 9/02
[52] U.S. Cl. .................... 356/354; 356/356; 356/373; 250/237 G
[58] Field of Search ........................ 250/237 G, 231.16, 250/231.17; 356/356, 363, 354, 373, 231.18, 231.14

[56] References Cited

U.S. PATENT DOCUMENTS

| 3,153,111 | 10/1964 | Barber et al. | 250/237 G |
| 3,586,665 | 6/1971 | Weyrauch | 250/237 G |
| 4,395,124 | 7/1983 | Remijan | 356/356 |
| 4,602,155 | 7/1986 | LaPlante | 250/231.14 |
| 4,650,332 | 3/1987 | Muraoka et al. | 250/237 G |
| 4,792,678 | 12/1988 | Spies | 250/237 G |
| 4,866,269 | 9/1989 | Wlodarczyk et al. | 250/231.18 |
| 4,948,968 | 8/1990 | Matsui | 250/237 G |
| 4,964,727 | 10/1990 | Huggins | 356/373 |
| 4,971,442 | 11/1990 | Okutani et al. | 356/356 |
| 4,974,077 | 11/1990 | Kusaba . | |

(List continued on next page.)

FOREIGN PATENT DOCUMENTS

| 35 04 194 | 5/1986 | Germany . |
| 38 07 011 | 4/1989 | Germany . |
| 2-176523 | 7/1990 | Japan . |
| 3-197819 | 8/1991 | Japan . |
| 3-257419 | 11/1991 | Japan . |
| 3-279812 | 12/1991 | Japan . |
| 4-329314 | 11/1992 | Japan . |

Primary Examiner—Frank G. Font
Assistant Examiner—Andrew H. Lee
Attorney, Agent, or Firm—Wenderoth, Lind & Ponack, L.L.P.

[57] ABSTRACT

In order to improve signal modulation characteristics and detect a position at a higher precision, collimated light of wavelength $\lambda$ and beam radius D enters a fixed diffraction plate and a movable diffraction plate comprising a grating of pitch "p". The grating has main diffraction components of orders $\pm 1$. The plates are arranged in parallel with a distance "g" between them and generally perpendicular to an optical axis of the beam. The beam diffracted by the diffraction plates and in parallel to the optical axis of the beam is condensed with a condenser lens for limiting an incident pupil size to be within $D-2\,g\lambda/p$. The amount of the light condensed by the condenser lens is detected by a photosensor. In a different example, a collimated light beam enters a first fixed plate and a rotary diffraction plate successively to transmit diffracted light of orders $\pm 1$. Then, the transmitting light is guided to a symmetrical point with respect to a rotation center of the rotary plate. Then, the beam is transmitted through the rotary plate and a second fixed plate which transmits only diffracted light of orders $\pm 1$. Then the beam is detected by a sensor. Then, even if the rotary plate has an eccentricity on the rotation thereof, fluctuations of the optical intensity of the beam are small, and a rotation angle can be detected with no accumulated errors. In order to detect a position of a moving diffraction plate precisely, a condenser lens is attached to the moving diffraction plate and first and second photosensors are provided on a trace of light transmitted through the condenser lens. A gap between the tow photosensors is smaller than a beam size of the condensed beam while a width of each of the two photosensors is larger than the beam size. A signal processor processes output signals of the photosensors to determine a position of the plate without being affected by the amount of light from a coherent light source.

25 Claims, 33 Drawing Sheets

U.S. PATENT DOCUMENTS

| | | | |
|---|---|---|---|
| 4,983,825 | 1/1991 | Ichikawa et al. | 250/237 G |
| 5,021,649 | 6/1991 | Nishimura et al. | 250/237 G |
| 5,030,825 | 7/1991 | Ikeuchi | 250/231.14 |
| 5,059,791 | 10/1991 | Ishizuka et al. | 250/237 G |
| 5,064,290 | 11/1991 | McMurtry et al. | 356/356 |
| 5,194,919 | 3/1993 | Katayama | 356/373 |
| 5,302,821 | 4/1994 | Igaki et al. | 250/237 G |

OPTICAL ENCODER FOR OPTICALLY MEASURING DISPLACEMENT OF MOVING BODY

BACKGROUND OF THE INVENTION

1. Field of the Invention

The present invention relates to an apparatus such as an optical encoder for optical measurement of a displacement of a moving body.

2. Description of the Prior Art

FIG. 1 shows a prior art optical encoder for measuring a position or an angle, wherein reference numeral 301 denotes a light source, reference numeral 302 denotes a rotary plate comprising an A/B phase signal region, wherein slits or a grating 306 of equal pitch are arranged on a circumference and a Z phase signal region, wherein only one slit 307 is provided on a circumference. Reference numeral 303 denotes a fixed plate having an A/B phase signal region, wherein slits or a grating 308 of the same pitch as that of the slits or a grating 306 of the rotary plate are arranged, and a Z phase signal region, wherein only one slit 309 is provided on a circumference. Reference numeral 304 denotes a photosensor for detecting light transmitted through the rotary plate 302 and the fixed plate 303. By detecting light transmitted through the A/B phase signal regions of the rotary plate and the fixed plate, a signal (A/B phase signal) in accordance with an angle of the rotary plate is detected, while by detecting light transmitted through the Z phase signal regions, a signal (Z phase signal) indicating an origin reference point of the rotary plate can be detected.

However, in the above-mentioned prior art method, there is a problem in that the degree of modulation of the A/B phase signal is deteriorated. This problem is explained below. FIG. 2 shows a basic structure of a prior art optical encoder used for measuring a position or angle of a moving body (see Japanese Laid-open Patent Publication 257419/1991). In FIG. 2, reference numeral 11 denotes a light source including a laser diode or a light-emitting diode of a relatively high coherence, reference numeral 12 denotes a collimator lens for collimating light emitted from the light source 11; reference numeral 13 denotes a fixed diffraction plate having a grating having a cross-section with a section of a rectangular-wave-like shape and arranged perpendicular to an optical axis of the collimated light emitted from the lens 12; reference numeral 14 denotes a movable diffraction plate having a cross-section of a rectangular-wave-like shape and arranged perpendicular to the optical axis, the movable diffraction plate being able to move perpendicularly (or up and down in the drawing). The gratings of the fixed and rotary diffraction plates have the same period each other.

Further, a step difference "d" of the height between the tops and bottoms of the fixed and movable diffraction plates 13 and 14 has the following relationship to the wavelength λ of the light source 11:

$$|n-n_0| \times d = (\lambda/2) \times (1+2m) \quad (1)$$

wherein m=0, ±1, ±2, . . . ; n denotes an index of refraction of the material of the fixed and rotary diffraction plates 13 and 14 and $n_0$ denotes an index of refraction of the medium between the plates 13 and 14. Furthermore, in FIG. 2, reference numeral 105 denotes a condenser lens for condensing light transmitted through the movable diffraction plate 14, while reference numeral 16 denotes a photosensor which converts a diffracted image condensed by the lens 105 into an electrical signal. The movable diffraction plate 14 is fixed, for example, to a revolving rotator, while the fixed diffraction plate 13 is held in a stationary state. The amount of rotation of the rotator can be obtained by deriving the amount of displacement of the movable diffraction plate 14 with respect to the fixed diffraction plate 13 from an output signal of the photosensor 16.

The operation of the prior art optical encoder having a structure as described above is as follows. First, light emitted from an optical source 11 is collimated by the collimator lens 12. Then, the light enters the fixed diffraction plate generally perpendicularly. The difference "d" of the height between the tops and bottoms of the fixed diffraction plate 13 is formed to have the relationship of Eq. (1) as described above. In this case, it is known that the components of diffracted light of even numbered orders including zero are equal to and that most of the energy is concentrated in diffracted light of orders ±1 (about 40% for each). Thus, the light entering the fixed diffraction plate 13 is diffracted by the plate 13 and goes out as diffracted light 110 of order ±1 and light 111 of order −1. The diffracted light 110 and 111 enter the movable diffraction plate 14 and exit as diffracted light 120 and 121. As with to the light diffracted by the fixed diffraction plate 13, the diffracted light of the movable diffraction plate 14 has zero components of diffracted light of even numbered orders including zero, and most of the energy is concentrated in diffracted light of orders ±1 (about 40% for each).

The diffracted light exiting from the movable diffraction plate 14 is expressed as (n, m), wherein n denotes an order of diffraction of the fixed diffraction plate 13, and m denotes an order of diffraction of the movable diffraction plate 14. Then, diffracted light transmitted through the movable diffraction plate 14 in parallel to the optical axis thereof includes diffracted light 121 of (+1, −1), diffracted light 122 of (−1, +1), diffracted light of (−3, +3), diffracted light of (+3, −3) and so on. However, diffracted light of orders of 3 or more have been omitted from FIG. 2 for simplicity. When the movable diffraction plate 14 is moved at a constant speed perpendicular to the optical axis, the phase of diffracted light of orders more than 3 changes relative to that of order 0. It is known that an optical intensity of light obtained by interference of diffracted light (+k, −k) with that of light (−k, +k) has a sine wave of a frequency of k/p (or a frequency of k times a basic frequency 1/k) wherein p denotes a array pitch of the grating formed in the movable diffraction plate 14. Therefore, the diffracted light of (+1, −1) and (−1, +1) which compose a main part of the total light energy interferes each other, and an output sine wave is obtained having a frequency of two times the basic frequency of the fixed and movable diffraction plates 13 and 14. Therefore, the prior art makes it possible to detect a position precisely by using the components of the doubled frequency.

However, the prior art has a problem in that the degree of modulation is deteriorated. The diffracted light of (+1, −1) and (−1, +1) are all condensed by the condenser lens 105 in order to use light efficiently as described above. Then, a minimum optical intensity detected by the photosensor 16 does not become zero or the degree of modulation is deteriorated.

This is explained with reference to FIG. 3, wherein λ denotes the wavelength of the light source 11; D denotes the beam size; p denotes the grating pitch of the fixed and movable diffraction plates 13 and 14 and reference numeral 105 denotes a Fourier transform lens of a focal length f. Furthermore, Δx denotes the amount of displacement of the movable diffraction plate 14; α denotes a diffraction angle λ/p of diffracted light of order 1. Because α is sufficiently small, sin α=tan α=α. A shape of a cross-section of the gratings of the fixed and movable diffraction plates 13 and 14 is expressed for simplicity by a complex amplitude as:

$$\cos(k\alpha x) = \{\exp(ik\alpha x) + \exp(-ik\alpha x)\}/2,$$

and the diffracted light of orders ±1 is approximated by a collimated light. Then, a complex amplitude of diffracted light of order +1 on the movable diffraction plate 14 is expressed as Aφexp(−ikαx), while that of order −1 is expressed as Aφexp(+ikαx), wherein φ=exp(−ikg cos α) and A denotes an amplitude of an incident beam. A complex amplitude f1 of the diffracted light of order +1 on the movable diffraction plate 14 is expressed as follows:

$$f1(x) = \frac{A\phi}{2}\{e^{-ik\alpha\Delta x} + e^{-ik\alpha(2x-\Delta x)}\} \quad (2)$$

Similarly, a complex amplitude f2 of the diffracted light of order +1 on the movable diffraction plate 14 is expressed as follows:

$$f2(x) = \frac{A\phi}{2}\{e^{ik\alpha(2x-\Delta x)} + e^{ik\alpha\Delta x}\} \quad (3)$$

Then, a divergence of the diffracted light of order+1 on the movable diffraction plate 14 becomes (−D/2−gα, D/2−gα). Therefore, if Eq. (2) is Fourier-transformed in the range, the following Eq. (4) is obtained, wherein ω=2πx/(fλ).

$$F1(\omega) = A\phi \frac{\sin\left(\frac{\omega D}{2}\right)}{\omega} e^{-i(k\alpha\Delta x - \omega\alpha g)} + \frac{\sin\left\{(\omega + 2k\alpha)\frac{D}{2}\right\}}{\omega + 2k\alpha} e^{i\{k\alpha\Delta x + (\omega+2k\alpha)\alpha g\}} \quad (4)$$

Similarly, because a divergence of the diffracted light of −order 1 on the movable diffraction plate 14 becomes (−D/2+gα, D/2+gVα), if Eq. (3) is Fourier-transformed in the range, the following Eq. (5) is obtained. Therefore, a complex amplitude detected by the photosensor 16 is expressed by Eq. (6).

$$F2(\omega) = A\phi \frac{\sin\left\{(\omega - 2k\alpha)\frac{D}{2}\right\}}{\omega - 2k\alpha} e^{-i\{k\alpha\Delta x + (\omega-2k\alpha)\alpha g\}} + \frac{\sin\left(\frac{\omega D}{2}\right)}{\omega} e^{i\{k\alpha\Delta x - \omega\alpha g\}} \quad (5)$$

$$F(\omega) = F1(\omega) + F2(\omega) \quad (6)$$

$$= 2A\phi \frac{\sin\left(\frac{\omega D}{2}\right)}{\omega} \cos(k\alpha\Delta x - \omega\alpha g) + A\phi \frac{\sin\left\{(\omega + 2k\alpha)\frac{D}{2}\right\}}{\omega + 2k\alpha} e^{i\{k\alpha\Delta x + (\omega+2k\alpha)\alpha g\}} + A\phi \frac{\sin\left\{(\omega - 2k\alpha)\frac{D}{2}\right\}}{\omega - 2k\alpha} e^{-i\{k\alpha\Delta x + (\omega-2k\alpha)\alpha g\}}$$

In Eq. (6), the first term relates to diffracted light of (+1, −1) and (−1, +1), and the second term relates to diffracted light of (+1, +1) and the third item relates to diffracted light of (−1, −1).

Next, an effect around the optical axis of the second and third terms is explained. In Eq. (6), if ω=Δx=0, the amplitude of the first term becomes AX. On the other hand, the amplitudes of the second and third terms become:

$$A|\sin(k\alpha D)|/(2k\alpha) \leq A/(2k\alpha) = Ap/(4\pi).$$

If D=0.5 mm and p=10 μm, (the second term/the first term) and (the third term/the first term) are 0.0016 or less. Therefore, the second and third terms are sufficiently small and are negligible around the optical axis, and only the first term is detected by the photosensor 16. Then, only the first term in Eq. (6) is considered below.

FIG. 4 shows an amplitude distribution at the photosensor 14 when an amount of displacement Δx of the movable diffraction plate 14 is zero or the output intensity is at a maximum. It is found in FIG. 4 that the amplitude is at a maximum on the optical axis. In the calculation, it is assumed that λ=633 nm, g=2 mm, f=5 mm, p=10 μm and D=0.5 mm. On the other hand, FIG. 5 shows an amplitude distribution when the intensity is at a minimum (kαΔx=π/2 or Δx=p/4), wherein the amplitude is normalized with respect to the maximum amplitude in FIG. 4. In this case, the first term in Eq. (6) becomes Eq. (7):

$$FM(\omega) = 2A\phi \frac{\sin\left(\frac{\omega D}{2}\right)}{\omega} \sin(\omega\alpha g) \quad (7)$$

FIG. 5 and Eq. (7) shows that light exists outside the optical axis. If such light exists, the degree of modulation has been deteriorated. FIG. 6 shows the degree of modulation when the above-mentioned values are used and the size of the photosensor 5 is 50 μm. The degree of modulation is defined as (output intensity−minimum intensity)/(maximum intensity−minimum intensity).

In order to avoid such an effect, a pin hole or the like may be provided to shade light outside the optical axis. However, if the beam size including the main portion of the light in FIG. 5 is as small as 12 μm, then it is necessary to make the pin hole as small as a few μm smaller than the beam size. However, in this case, light is also detected and the degree of modulation is deteriorated. Further, the position adjustment of the pin hole relative to the optical axis is difficult. Still furthermore, if such a small pin hole is used, a loss in the amount of light is large and an electrical signal obtained by the photosensor is weak and is liable to be affected by noise.

Next, another problem of prior art methods is explained. If a geometrical center of the rotary plate deviates from a rotation center thereof, errors of the A/B phase signals are accumulated. This problem is explained by using the model shown in FIG. 7, wherein reference numeral 51 denotes a light source; reference numeral 52 denotes a collimator lens for collimating light emitted by the light source, reference numeral 53 denotes a rotary plate having slits of equal pitches on a circumference; reference numeral 54 denotes a fixed plate having slits of pitches which are the same as those of the rotary plate and reference numeral 55 denotes a photosensor for detecting light transmitted through the rotary plate 53 and the fixed plate 54.

When the rotary plate 53 is rotated, the positions of the slit openings of the rotary plate 53 relative to those of the fixed plate 54 change so that the amount of light received by the photosensor 55 changes according the change in the relative relationship of the positions. FIGS. 8A and 8B show a change of output signal of the photosensor 55 in this case.

If the slit pitch is wide enough not to cause diffraction, the output signal changes as shown in FIG. 8A. If the slit pitch is small with respect to the distance between the rotary plate 53 and the fixed plate 54, a waveform of an output signal of the photosensor 55 is affected by the diffraction at the slits and corners of the waveform become rounded to change it into a waveform which approximates a sinewave as shown in FIG. 8B.

Eq. (8) shows the output of the photosensor 55 when the signal waveform is approximated as a sinewave.

$$y = A \sin(N\theta) + B \quad (8)$$

wherein A denotes a signal amplitude, B denotes a DC component of the signal, and N denotes the number of the slits formed in the rotary plate 43 and Θ denotes a rotary angle.

The accumulated errors noted above which are caused by the eccentricity of the rotary plate 53 is explained with reference to FIG. 9 which illustrates a beam irradiation position and beam trajectory on the rotary plate 53. If a eccentricity amount e exists between a rotation center 60 and a center 61 of the rotary plate 53, a rotation angle of a particular point 62 or an angle Θ relative to the rotation center 60 is different from an angle $\Theta_a$ relative to the center 61 of the rotary plate 53. If r denotes a distance between the rotation angle 60 and the photosensor 55, $\delta = \Theta - \Theta_a = (\epsilon/r)\cos \Theta$. Because the output signal of the photosensor 55 depends on the angle $\Theta_a$ on the center of the rotary plate 61, the output signal is expressed as shown in Eq. (9).

$$y = A \sin(N\Theta_a) + B$$
$$= A \sin\{N(\theta + (\epsilon/r)\cos \theta)\} + B \quad (9)$$

When a rotation angle is changed from 0 to Θ, the number of pulses of the photosensor 55 is expressed as follows:

$$N(\theta + (\epsilon/r)\cos \theta)/(2\pi) \quad (10)$$

Then, when a rotation angle is changed from α to β, the number of pulses of the photosensor 55 is expressed as follows:

$$N(\beta - \alpha + (\epsilon/r)(\cos \beta - \cos \alpha))/(2\pi) \quad (11)$$

Thus, a difference of the number of the pulses relative to a true pulse number N(β−α), or an accumulated error of the signals is expressed as follows:

$$N(\epsilon/r)(\cos \beta - \cos \alpha)/(2\pi)$$
$$= \{N\epsilon/(\pi r)\}\sin\{(\beta+\alpha)/2\}\sin\{(\beta-\alpha)/2\} \quad (12)$$

A maximum accumulated error occurs when α=0 and β=π, and it amounts to Nε/(πr) pulses. For example, if the number of pulses is 10,000 pulses per rotation, the position r of the photosensor from the rotation center is 20 mm and the eccentricity amount ε is 10 μm, the accumulated errors amount to 1.6 pulses. This is too large for an encoder of 10,000 pulses, and the encoder cannot be used practically.

The accumulated errors can be decreased if r is increased or the eccentricity amount ε is decreased. However, in order to decrease the accumulated errors down to 0.1 pulse or lower, r has to be larger than 320 mm, and the size of the encoder becomes vary large. If the eccentricity amount ε is decreased, it has to be decreased to less than 0.6 μm, and this makes the setup of the rotary plate 53 very difficult.

Therefore, in a prior art method, in order to realize an encoder having a high resolution, two photosensors are arranged at two symmetrical points with reference to the rotation center of the rotary plate 53, and an arithmetic average of the optical intensities detected by the photosensors is used to prevent the accumulated errors. The principle of this method is explained below.

When the eccentricity of the rotary plate occurs, the outputs of the two photosensors are expressed as Eqs. (13) and (14) by using Eq. (9).

$$y1 = A1 \sin\{N(\theta + (\epsilon/r)\cos \theta)\} + B1 \quad (13)$$

$$y2 = A2 \sin\{N(\theta - \pi + (\epsilon/r)\cos(\theta - \pi))\} + B2 \quad (14)$$

$$= A2 \sin\{N(\theta - (\epsilon/r)\cos \theta)\} + B2$$

If it is assumed for simplicity that A1=A2=A and B1=B2=B, an arithmetic average of the two outputs is obtained as shown in Eq. (15).

$$y = y1 + y2$$
$$= 2A \sin(N\theta) \cos\{(N\epsilon/r)\cos \theta\} + 2B \quad (15)$$

Eq. (15) shows that the errors are not accumulated error because the effect of eccentricity vanishes in the term on the period of pulse signals.

However, Eq. (15) shows clearly that an amplitude of the obtained signal is multiplied by cos{(Nε/r)cos θ}, and this means that the signal amplitude varies with the rotation angle if an eccentricity ε exists. When |Nε/r|>π, there exists a portion wherein the signal amplitude becomes zero in a rotation of the rotary plate. Therefore, in order to use it for an encoder, then it is necessary by |Nε/r|<π. For example, if N=10,000 and r=20 mm, ε must be 6.3 μm or less. Then, in order to produce a compact encoder having a high resolution, the rotary plate has to be set up very precisely, and this increases its cost. Furthermore, because the eccentricity or the axis due to a load has to be decreased too, the axis becomes large to increase its weight, and the conditions for the encoder to be used are limited.

A further problem of a prior art method, explained below, is that the precision of the position detection of the origin of the encoder is deteriorated according to a change of the intensity of the light source. It is known to detect a position of a body without contact. For example, as disclosed in Japanese Laid-open Patent Publication 44,202/1990, a body is illuminated with a light to project its image onto a video camera, and a position is detected by digitizing the output signal of a linear array sensor. Further, in order to detect a reference position of a moving body, a slit is provided in the moving body and the body is illuminated with a light. A light transmitted through the slit is received by photosensors and the output signals thereof are digitized.

An example of the prior art position detection is explained with reference to FIGS. 10 and 11A and 11B. FIG. 10 is a plan view of a prior art position detection apparatus, wherein reference numeral 251 denotes a light source and reference numeral 252 denotes a moving body. A slit 253 is provided in the moving body 252. Reference numeral 254 denotes a photosensor. The moving body 252 exists between the light source 251 and the photosensor 254, and it moves perpendicularly to an axis between the light source 251 and the photosensor 254.

An operation of the apparatus is explained below. FIG. 11A illustrates a light beam 255, passing the slit 253 in the moving body 252, and the photosensor 254. The moving body is assumed to move along an x-axis from left to right. Therefore, the light beam 255 scans the photosensor 254 according to the movement of the moving body 252. Then, the output signal of the photosensor 254 has a waveform as shown in FIG. 11B. In order to prevent influence of scattered light or the like entering the photosensor 254, a suitable threshold value is set to digitize the output. Thus, a reference position signal of the moving body can be obtained.

However, the following problem exists: When the intensity of a light emitted by the light source fluctuates, an influence similar to the fluctuation of the threshold level occurs and the pulse width of the reference position signal and the position of the signal edges are changed. Therefore, the precision of the position detection is deteriorated. Further, as the beam size on the photosensor 254 is decreased, a change in the output signal of the photosensor 254 with respect to a change of the moving body 252 becomes large. Therefore, the deterioration of the precision of position detection due to noise from scattered light and electrical noise decreases. However, if the size of the slit 253 is decreased too much in order to decrease the beam size, diffraction occurs and the beam size on the photosensor 254 increases. Further, if the slit size is decreased, the amount of light received by the photosensor 254 decreases and errors due to noise increase. A gap between the slit 253 and the photosensor 254 may be decreased in order to avoid the effects of diffraction. However, if the gap is decreased, there is a possibility that the moving body makes contact with the photosensor so as to cause damage. Further, in order to generate a pulse of a narrow prescribed width, the width of the photosensor 254 and the beam size have to be decreased. However, the above-mentioned problems of the contact between the moving body 252 and the photosensor 254 and the deterioration of the precision of the position detection due to noise occur also in this case.

SUMMARY OF THE INVENTION

An object of the present invention is to provide a method of measuring position or angle which has a good degree of modulation Another object of the present invention is to provide a method of measuring position or angle which has a high precision of position detection.

A further object of the present invention is to provide a method of measuring position or angle which has no accumulated error due to eccentricity of the rotary plate.

A still further object of the present invention is to provide a method of measuring position or angle which has small deterioration of the precision of the position detection due to intensity fluctuations of light emitted by a light source or noise.

In one aspect of the invention, a coherent collimated beam of wavelength $\lambda$ and diameter "D" enters a fixed diffraction plate and a movable diffraction plate each comprising a grating of pitch "p". The gratings have main diffraction components of orders ±1. The fixed and movable diffraction plates are arranged in parallel to each other with a distance "g" between them, and they are provided in an optical path of the collimated beam which is perpendicular to the optical axis of the collimated beam so that the collimated beam is diffracted by the gratings in the fixed and movable diffraction plates successively. Thus, interference of diffraction components of orders ±1 are generated by the successive diffraction by the first and second diffraction plates, and the amount of light of the diffracted light is detected to determine a displacement of the movable diffraction plate. Because unnecessary diffraction components are not detected, the degree of modulation is improved. Preferably, a condenser lens having an entrance pupil size within $D-2g\lambda/p$ condenses the light transmitted through the fixed and movable diffraction plates, and a photosensor detects a light condensed by the condenser lens, or a photosensor is arranged at a position distant from the fixed and movable diffraction plates by $D/2\lambda-g$ or more in a region within $D-2g\lambda/p$ around the optical axis. A triangular prism, may be used instead of the first fixed plate, and the movable diffraction plate has a diffraction angle equal to an angle of deviation of the triangular prism.

In a second aspect of the invention, a coherent collimated beam enters a first fixed diffraction plate, a rotary plate and a second fixed diffraction plate. The first and second fixed diffraction plate have first and third gratings having main diffraction components of orders ±1, respectively, while the rotary plate which can rotate around a rotation center comprises a second grating of a ring-like shape symmetrical with respect to the rotation center. The second grating has a same pitch as that of the first grating, The rotation axis of the rotary plate may coincide with the optical axis. The first fixed plate and rotary plate being provided in an optical path of the collimated beam which is perpendicular to the optical axis of the collimated beam so that the collimated beam is diffracted by the first and second gratings successively. Further, a light transmitted through the first grating and the second grating is guided to the second fixed plate at a position symmetrical with respect to the rotation center on the rotary plate. The second fixed diffraction plate is provided in an optical path to the symmetrical point so that a light guided by the optical guide means is diffracted by the second and third gratings successively. Then, the amount of a light caused substantially by the interference of the diffraction components of orders ±1 is detected. When a displacement of the rotary plate is detected from the detected amount of light, the effect of eccentricity of the rotary plate may be reduced. A triangular prism may be used instead of the first or second fixed diffraction plate. The rotary plate may be rotated with a rotation axis which is perpendicular to an optical axis of the collimated beam. In this case, the second fixed diffraction plate is provided in the rotary plate.

In a third aspect of the present invention, a coherent collimated beam enters a movable body which can pass an optical path of the collimated beam which is perpendicular to the collimated beam. Then, a first condenser such as a condenser lens which is attached to the movable body condenses the collimated beam. First and second photosensors detect the amount of light only of the beam condensed by the first condenser. The first and second photosensors have a gap between them which is smaller than a diameter of the collimated beam in a moving direction of the movable body, while they have a width which is larger than the diameter of the collimated beam. A signal processor generates a difference signal between the output signals of the first and second photosensors, and a position of the movable body can be determined according to the difference signal. Thus, a reference point for detection the position of a moving body can be decided precisely. Preferably, a second condenser is further placed to the movable body, and third and fourth photosensors detect the amount of light only of the beam collimated by the second condenser. Then, a second difference signal between output signals of the third and fourth photosensors is obtained and a position of the movable body can be determined according to a light source for providing pulse signal from the first and second difference signals.

An advantage of the present invention is that the degree of modulation is improved when a position or angle is measured.

Another advantage of the present invention is that a position or angle can be measured precisely.

A further advantage of the present invention is that no accumulated error due to the eccentricity of a rotary plate to be measured occurs when the position of the rotary plate is measured.

A still further advantage of the present invention is that a position of a moving body can be detected optically without being affected by intensity fluctuations of the light emitted by a light source.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
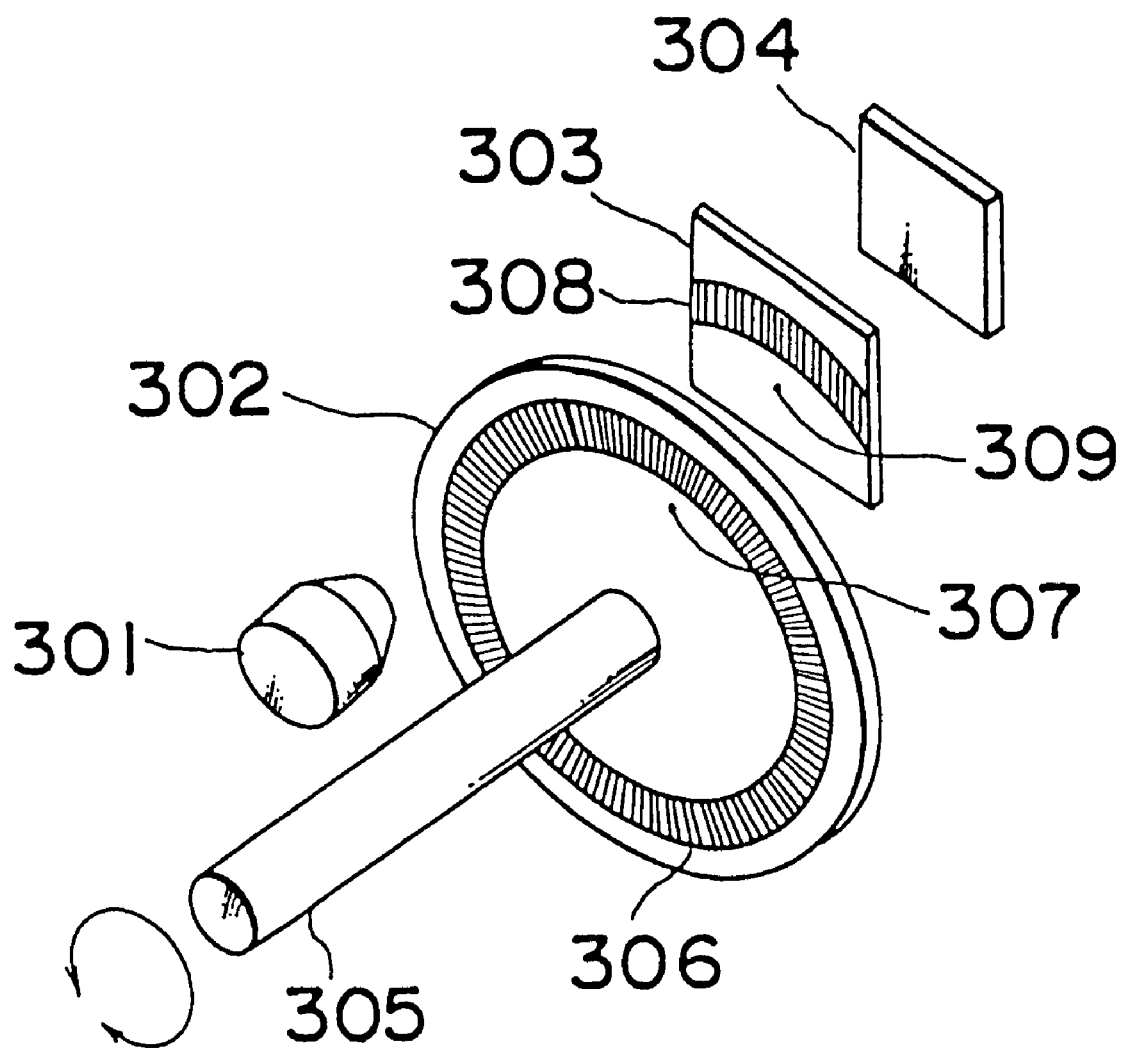
FIG. 1 is a diagram of a prior art optical encoder.

Referring now to the drawings, wherein like reference characters designate like or corresponding parts throughout the several views, the embodiments of the present invention will be explained.

First Embodiment

In the first three embodiments, a photosensor only detects light in an interference region wherein diffracted lights of orders of ±1 interfere with each other. Then, the degree of modulation is improved.

Figure 12:
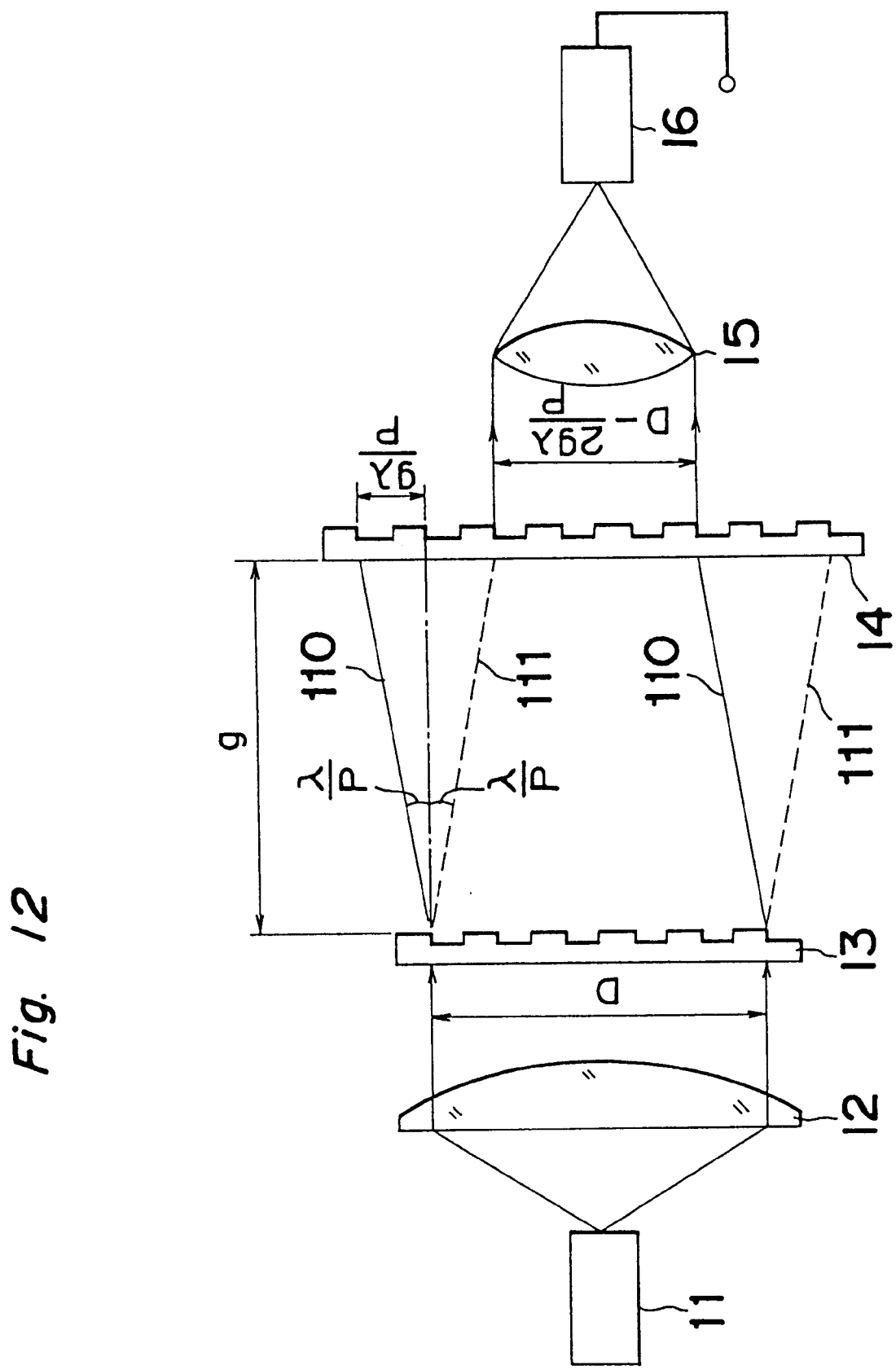
FIG. 12 is a diagram of a first embodiment of the present invention.

FIG. 12 shows a basic structure of an apparatus of a first embodiment of the present invention. A light source 11 comprises a laser diode or a light-emitting diode having a relatively high coherence and a collimator lens 12 which collimates light emitted by the light source 11. A fixed diffraction plate 13 has a grating of a rectangular wave section and is arranged so as to be perpendicular to an optical axis of the collimated light formed by the lens 12. A movable diffraction plate 14 has a grating of a rectangular wave section and is movable in a direction perpendicular to the optical axis. The grating of the fixed diffraction plate 13 has the same pitch as that of the movable diffraction plate 14. The diffraction plates 13 and 14 may be of a rotation type as shown in FIG. 1 instead of those of a translation type as shown in FIG. 12. Furthermore, a step difference "d" of the height between tops and bottoms of the gratings of the fixed and movable diffraction plates 13 and 14 has the following relationship to wavelength $\lambda$ of the light source 11 so as to satisfy Eq. (1).

$$|n-n_0| \times d = (\lambda/2) \times (1+2m) \quad (1)$$

wherein $m=0, \pm1, \pm2, \ldots$, n denotes an index of refraction of a material of the fixed and rotary diffraction plates 13 and 14 and $n_0$ denotes an index of refraction of the medium between the plates 13 and 14.

A condenser lens 15 condenses light transmitted through the movable diffraction plate 14. A photosensor 16 converts a diffracted image condensed by the lens 15 to an electrical signal. The movable diffraction plate 14 is usually fixed to a body to be measured (not shown) and moves in a same way as the body to be measured. Therefore, the speed or position or the like can be detected by detecting the speed or the relative displacement of the movable diffraction plate 14 relative to the fixed diffraction plate 13.

It is a feature of the apparatus that the entrance pupil of the condenser lens 15 is limited to be within D−2gλ/p wherein "D" denotes the size of the beam collimated by the collimator lens 12, "g" denotes a distance between the fixed diffraction plate 13 and the movable diffraction plate 14, λ denotes the wavelength of the light and "p" denotes the pitch of the gratings formed on the diffraction plates. The distance "g" between the diffraction plates is set to satisfy the inequality g<pD/(2λ). The condenser lens 15 is arranged so that its center lies along the optical axis.

The operation of the apparatus constructed as described above is as follows. The light emitted by the light source 11 is collimated by the lens 12 and enters the fixed diffraction plate 13 generally vertically. Because the step difference "d" of the height between tops and bottoms of the fixed diffraction plate 13 has a relationship to the wavelength λ of the light source 11 so as to satisfy Eq. (1), most of the energy is concentrated in diffracted light of orders ±1. Therefore, the light entering the fixed diffraction plate 13 is emitted as a diffracted light. As with the fixed diffraction plate 13, most of the energy of the diffracted light emitted from the movable diffraction plate 14 is concentrated in diffracted light of orders ±1.

Figure 11A:
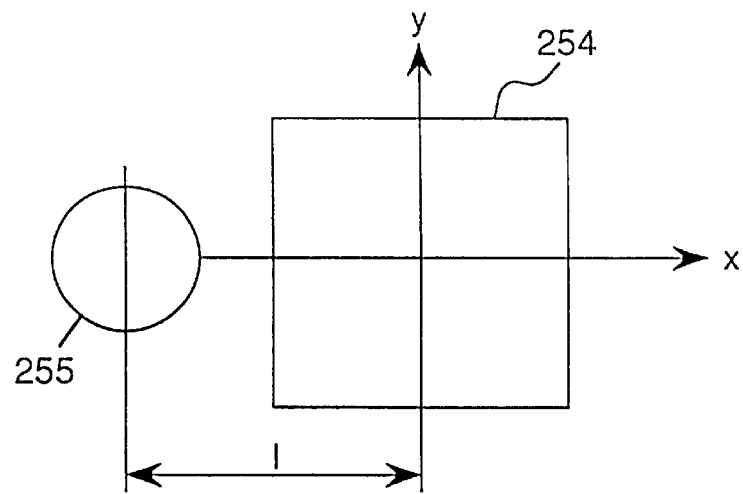
FIGS. 11A and 11B are a diagram of the apparatus and a graph of the output thereof.
Figure 11B:
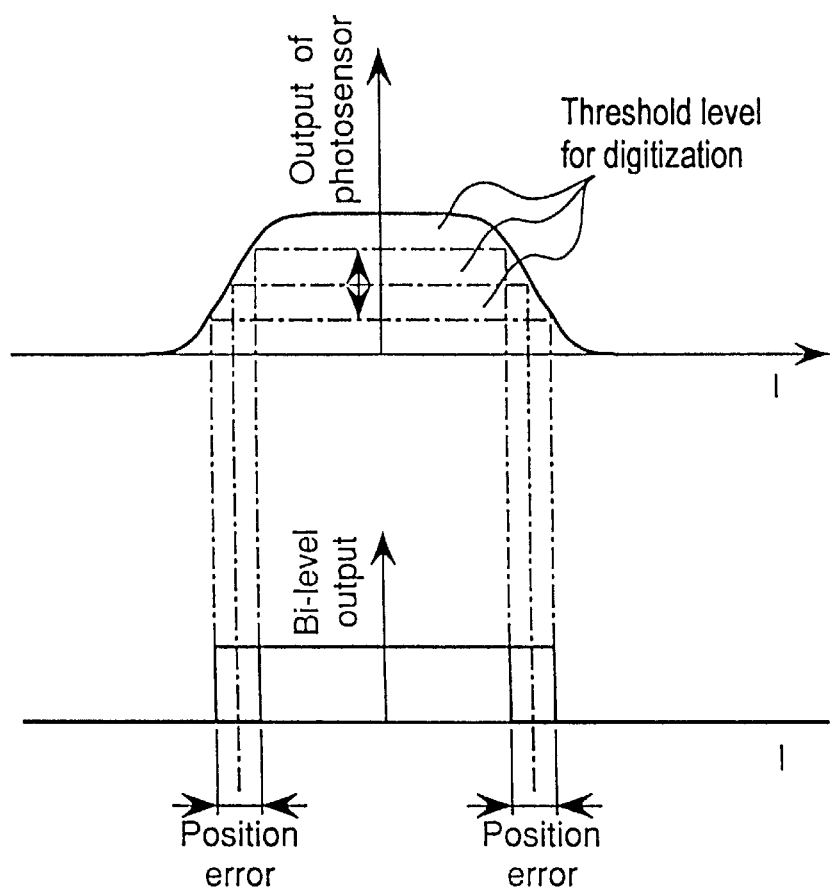

As mentioned above, the entrance pupil of the lens 15 is limited within D−2gλ/p. The region is explained with reference to FIGS. 11A and 11B. A diffraction angle of diffracted light 110 of order +1 is λ/p (radian). If λ/p is sufficiently small, the diffracted light of order +1 is diffracted only by gλ/p at a point distant by a distance "g". Similarly, diffracted light 111 of order −1 is also diffracted by gλ/p. A region enclosed by solid lines in FIG. 12 denotes a region of diffracted light of order +1, while a region enclosed by dashed lines denotes a region of diffracted light of order −1. Therefore, a region displayed by D−2gλ/p denotes a region where the diffracted light of orders ±1 interfere with each other. In the region, diffracted light from the movable diffraction plate 14 in parallel to the optical axis is condensed by the lens 15, and the light condensed by the lens 15 is detected by the photosensor 16.

In the apparatus constructed as described above, an output of a double frequency is obtained as in a prior art method. Furthermore, the degree of modulation can be improved very much. The reason of this feature of the embodiment is explained by using the above-mentioned model. Because the entrance pupil of the condenser lens 15 is limited to be within D−2gλ/p, the integration range in Eqs. (2) and (3) becomes (−D/2+gα, D/2−gα), and a complex amplitude F'1 on the photosensor 16 of the diffracted light of order +1 is expressed as Eq. (16). Similarly, a complex amplitude F'2 of the diffracted light of order −1 is expressed as Eq. (17).

$$F'1(\omega) = A\phi \frac{\sin\left\{\omega\left(\frac{D}{2} - \alpha g\right)\right\}}{\omega} e^{-ik\alpha \Delta x} + \frac{\sin\left\{(\omega + 2k\alpha)\left(\frac{D}{2} - \alpha g\right)\right\}}{\omega + 2k\alpha} e^{ik\alpha \Delta x}\right] \quad (16)$$

$$F'2(\omega) = A\phi \frac{\sin\left\{(\omega - 2k\alpha)\left(\frac{D}{2} - \alpha g\right)\right\}}{\omega - 2k\alpha} e^{-ik\alpha \Delta x} + \frac{\sin\left\{\omega\left(\frac{D}{2} - \alpha g\right)\right\}}{\omega} e^{ik\alpha \Delta x}\right] \quad (17)$$

Therefore, a complex amplitude F' detected by the photosensor 16 is described by Eq. (18).

$$F'(\omega) = F'1(\omega) + F'2(\omega) \quad (18)$$

$$= 2A\phi \frac{\sin\left\{\omega\left(\frac{D}{2} - \alpha g\right)\right\}}{\omega} \cos(k\alpha \Delta x) +$$

$$A\phi \frac{\sin\left\{(\omega + 2k\alpha)\left(\frac{D}{2} - \alpha g\right)\right\}}{\omega + 2k\alpha} e^{ik\alpha \Delta x} +$$

$$A\phi \frac{\sin\left\{(\omega - 2k\alpha)\left(\frac{D}{2} - \alpha g\right)\right\}}{\omega - 2k\alpha} e^{-ik\alpha \Delta x}$$

In Eq. (18), only the first term is considered as in the above-mentioned description on the prior art. When an amplitude becomes zero at a point on an optical axis (ω=0) (kαΔx=π/2 or Δx=p/4), the first term becomes zero. This means that no light exists around the optical axis. In other words, when a displacement amount of the movable diffraction plate is obtained from electrical signals of the photosensor, the degree of modulation of the electrical signals can be improved by entering only the diffracted light of orders ±1 to the photosensor. Therefore, the position can be detected precisely.

Figure 13:
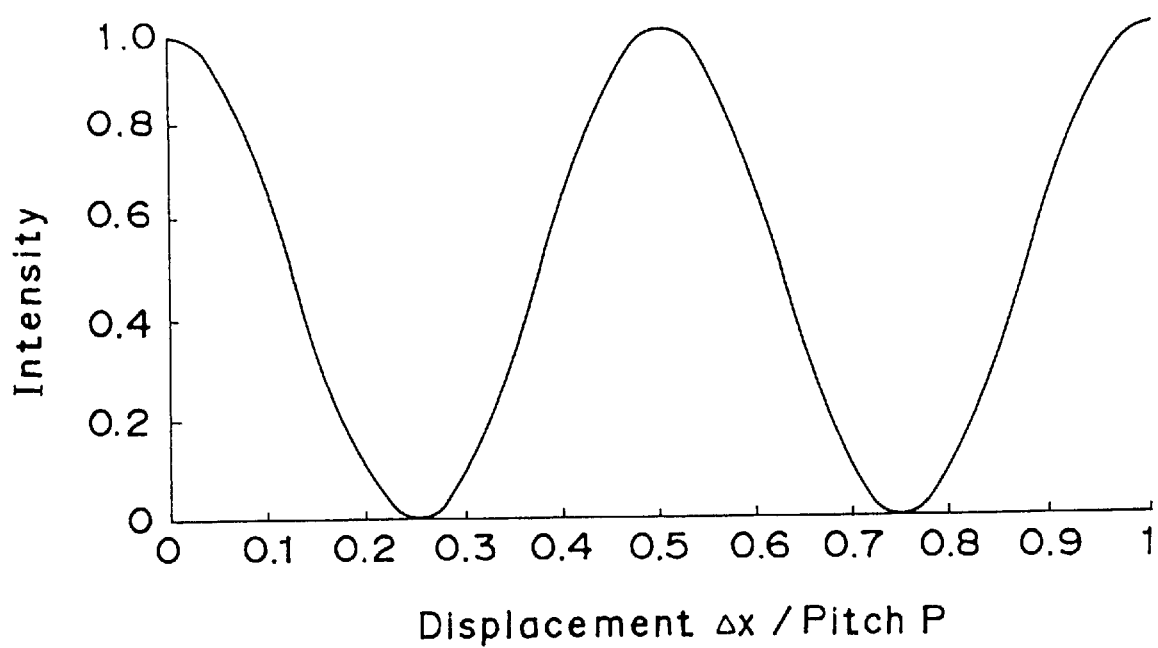
FIG. 13 is a graph of the degree of modulation in the embodiment.
Figure 14:
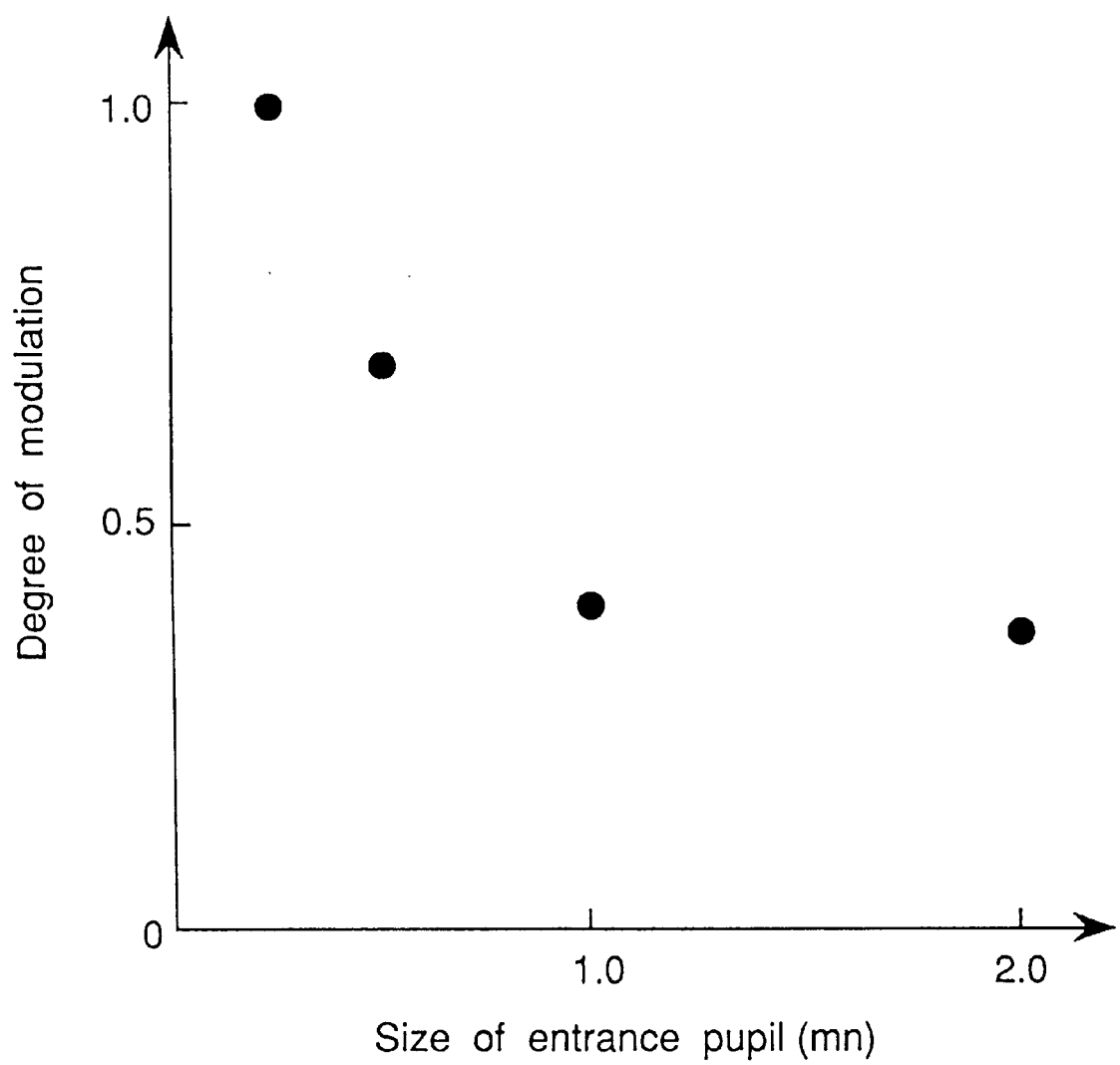
FIG. 14 is a graph of degree of modulation plotted against entrance pupil size.

FIG. 13 shows a modulation characteristic in this case. The degree of modulation in this case is 1.00. FIG. 14 is a graph of degree of modulation plotted against entrance pupil of the lens 15 in a case where the pitch p is 10 μm, the wavelength λ is 633 nm, the size D of entering beam is 0.5 mm and the gap g is 2 mm or D−2gλ/p=0.25 mm. Therefore, the data shows that when the entrance pupil satisfies the inequality condition, the degree of modulation increased to 1.0. To sum up, because the beam diffracted by the diffraction plates and in parallel to the optical axis of the beam is condensed by a condenser lens which has an entrance pupil size limited to be within D−2gλ/p, the degree of modulation is good, and the position can be detected precisely.

Though the aperture is limited by the entrance pupil of the lens 15 in the embodiment, it is understood that similar advantages can be realized by using limitation with a pin hole or the like of the same size. In the above-mentioned model, a Fourier transform lens is used as the condenser lens 15 for the convenience of the analysis. However, an ordinary lens may also be used. The movable diffraction plate 14 and the photosensor 16 may be placed at positions other than the focal plane.

Second Embodiment

Figure 15:
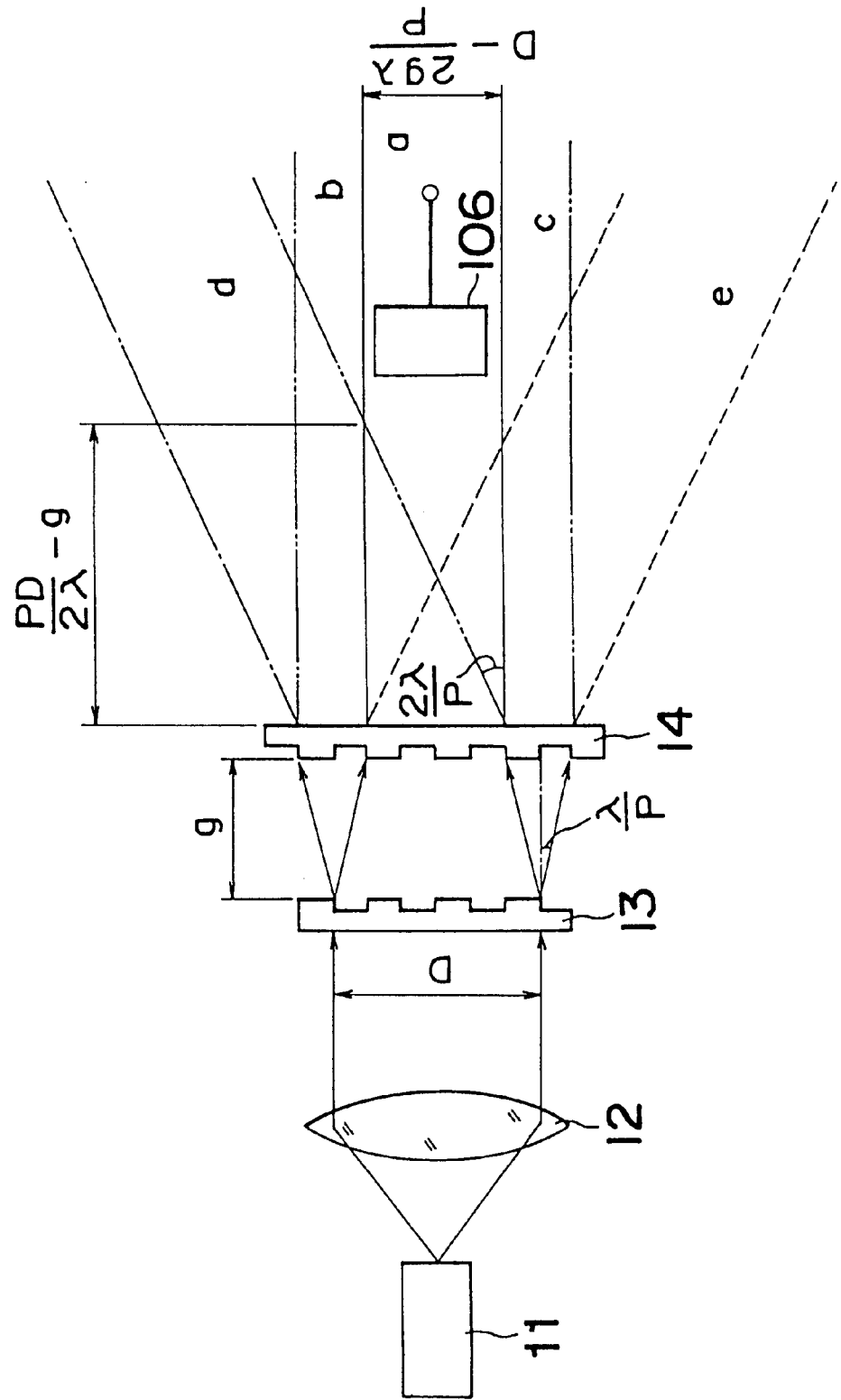
FIG. 15 is a diagram of a second embodiment of the present invention.

FIG. 15 shows a basic structure of a position measurement apparatus of a second embodiment of the present invention. A light source 11 comprises a laser diode or a light-emitting diode having a relatively high coherence. A collimator lens 12 collimates light emitted by the light source 11. A fixed diffraction plate 13 has a grating of a rectangular wave section and is arranged so as to be perpendicular to an optical axis of the collimated light formed by the lens 12. A movable diffraction plate 14 has a grating of a rectangular wave section and is movable in a direction perpendicular to the optical axis. The grating of the fixed diffraction plate 13 has the same pitch as that of the movable diffraction plate 14. The diffraction plates 13 and 14 may be of a rotation type as shown in FIG. 1 or a linear movement type. Furthermore, a step difference "d" of the height between the tops and bottoms of the fixed and movable diffraction plates 13 and 14 has a relationship to the wavelength λ of the light source 11 so as to satisfy Eq. (1). Furthermore, a photosensor 106 detects light transmitted through the plates 13 and 14.

This embodiment differs from the first embodiment shown in FIG. 12 in that the condenser lens 15 is not used. A feature of the embodiment is that the photosensor 106 is set at a distance of pD/(2λ)–g or more from the movable diffraction plate 14 and receives a light in a width of D–2gλ/p, as shown in FIG. 15. The photosensor 106 is arranged on the optical axis or at a position in a region "a" where diffracted light of orders ±1 interfere with each other. In the above-mentioned relationships, D denotes a size of the beam collimated by the collimator lens 12, g denotes a distance between the fixed diffraction plate 13 and the movable diffraction plate 14, λ denotes wavelength of light emitted by the light source 11, and p denotes the pitch of the diffraction plates 13 and 14.

The operation of the apparatus constructed as described above is as follows. Coherent light emitted by the light source 11 is collimated by the lens 12 and enters the fixed diffraction plate 13 generally vertically. Light transmitted through the fixed diffraction plate 13 enters the movable diffraction plate and is emitted as diffracted light which is expressed as (n, m), wherein n denotes an order of diffraction of the fixed diffraction plate 13 and m denotes an order of diffraction of the movable diffraction plate 14. Then, an area denoted as "a" shows an area of (−1, +1) and (+1, −1), an area denoted as "b" shows an area of (−1, +1), an area denoted as "c" shows an area of (+1, −1), an area denoted as "d" shows an area of (−1, −1) and an area denoted as "e" shows an area of (+1, +1). However, diffracted light of orders of 3 or more have been omitted from FIG. 15 for convenience. Because a light-receiving plane of the photosensor 106 is set so that a distance from the movable diffraction plate 14 is pD/(2λ)–g or more and the light is limited to be in a region within D–2gλ/p, the photosensor 106 detects the light only in the area "a".

In the present embodiment, because the photosensor receives diffracted light only of orders of ±1, the degree of modulation can be improved, as in the first embodiment. Because a photosensor receives light in a width of D–2gλ/p and is set at a distance of pD/(2λ)–g or more from fixed and movable diffraction plates, a condenser lens is not needed. Then, the number of components can be reduced, and the apparatus may have a lighter weight and a more compact size and can be produced at a lower cost.

Third Embodiment

Figure 16:
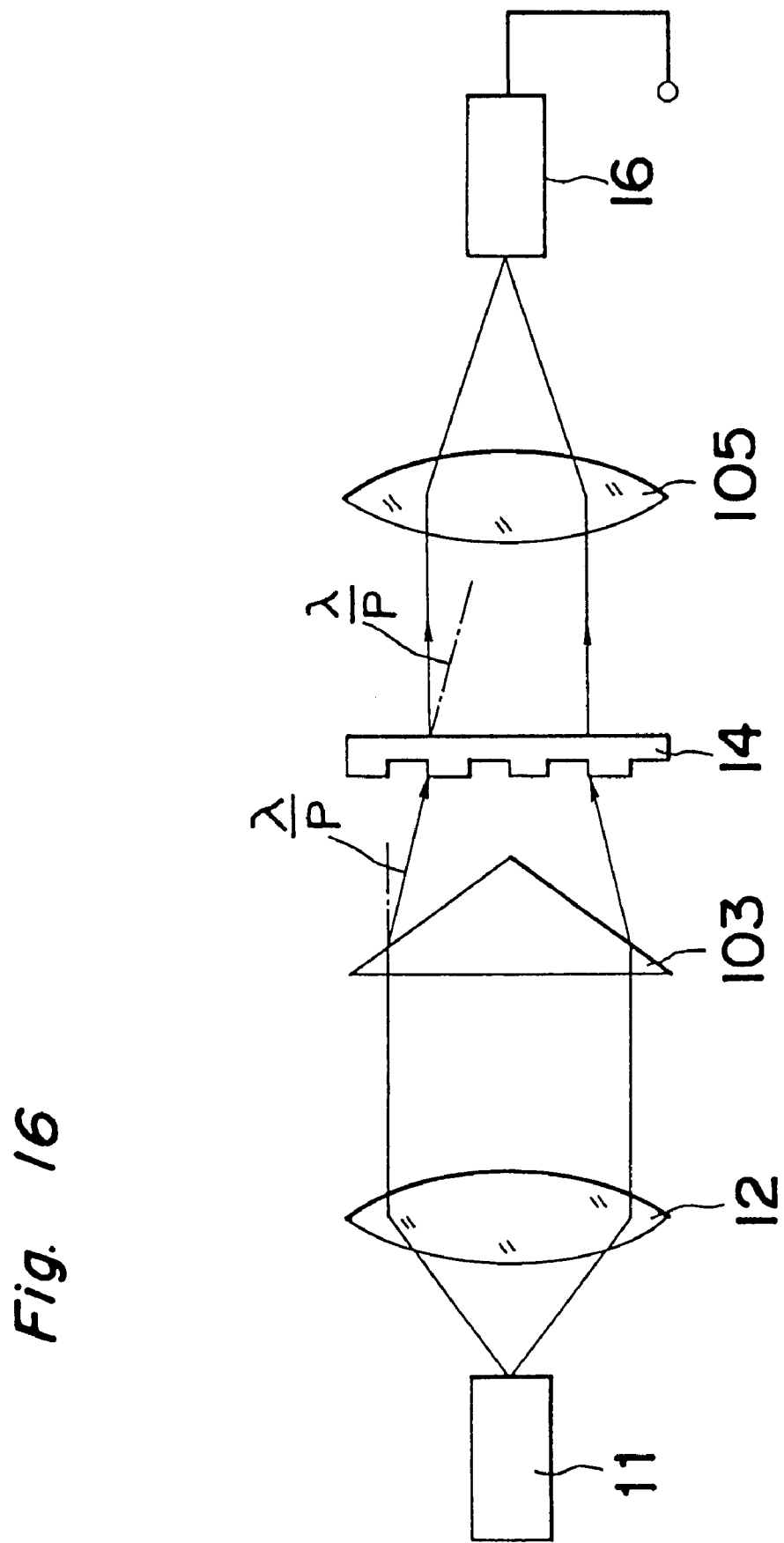
FIG. 16 is a diagram of a third embodiment of the present invention.

FIG. 16 shows a basic structure of a third embodiment of the present invention. A light source 11 comprises a laser diode or a light-emitting diode having a relatively high coherence. A collimator lens 12 collimates light emitted by the light source 11. A triangular prism 103 refracts the collimated light. A movable diffraction plate 14 has a grating of a rectangular wave section and movable in a direction perpendicular to the optical axis. The diffraction plate 14 may be of a rotation type as shown in FIG. 1 or a linear movement type. Further, a step difference "d" of the height between the tops and bottoms of the movable diffraction plate 14 has a relationship to wavelength λ of the light source 11 so as to satisfy Eq. (1). Furthermore, reference numeral 105 denotes a Fourier transform lens of a focal length f and reference numeral 16 denotes a photosensor.

This third embodiment differs from the first embodiment in a point that it uses the triangular prism 103 instead of the fixed diffraction plate used in the first embodiment. The angle of deflection of light exiting the triangular prism 103 is designed to be the same as a diffraction angle λ/p of orders ±1 of the movable diffraction plate 14 wherein λ denotes wavelength of light and p denotes a pitch of the grating of the movable diffraction plate 14.

Figure 2:
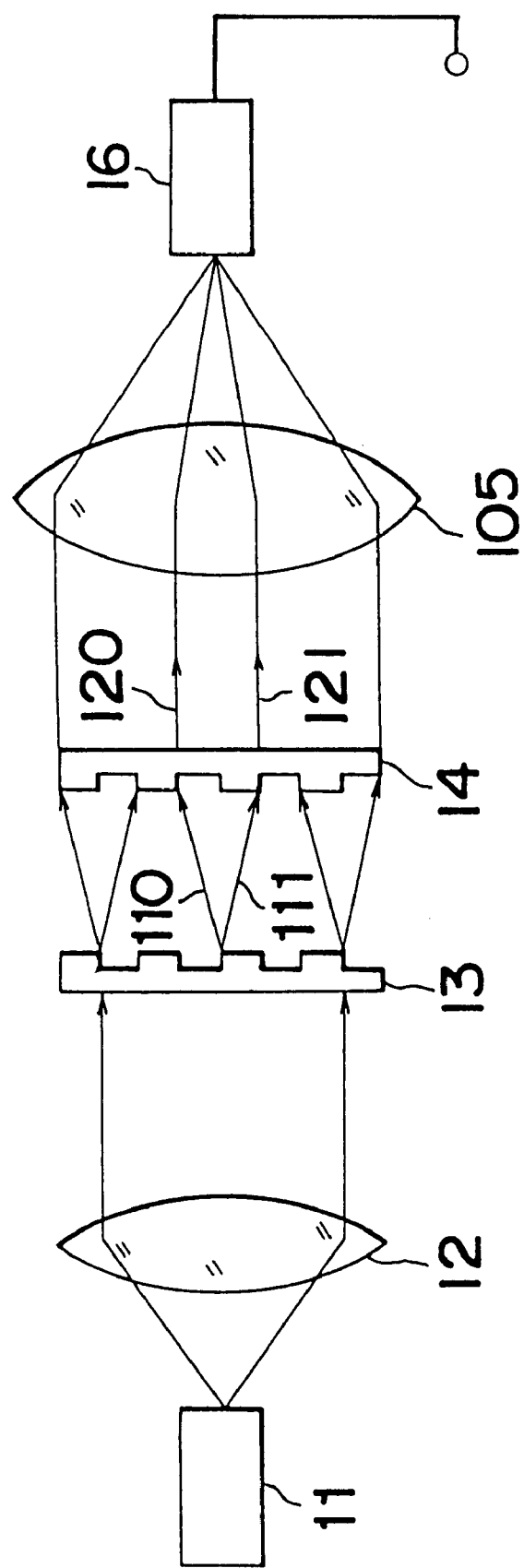
FIG. 2 is a diagram of a prior art optical encoder.
Figure 3:
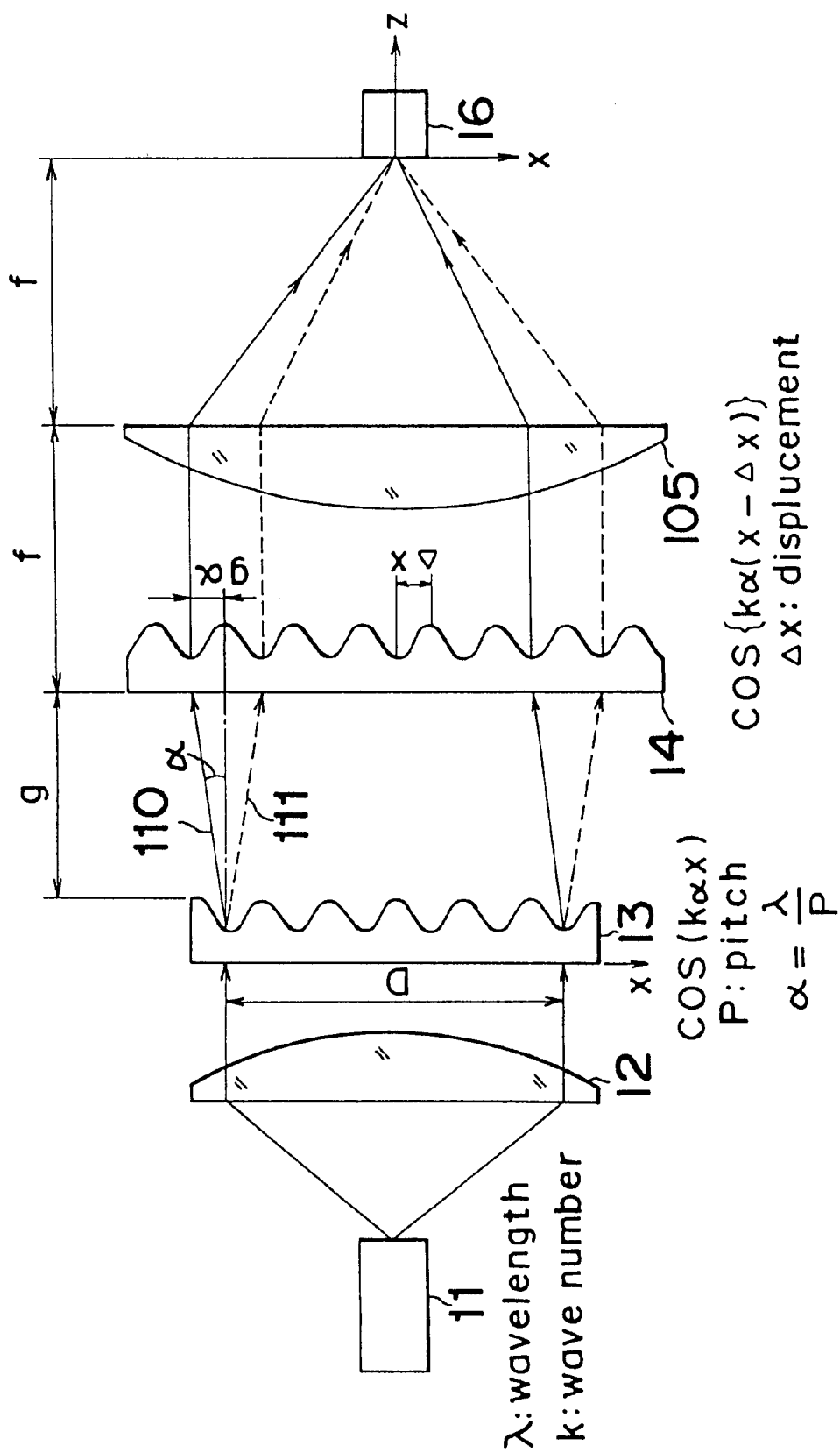
FIG. 3 is a diagram of a model of the optical encoder.
Figure 4:
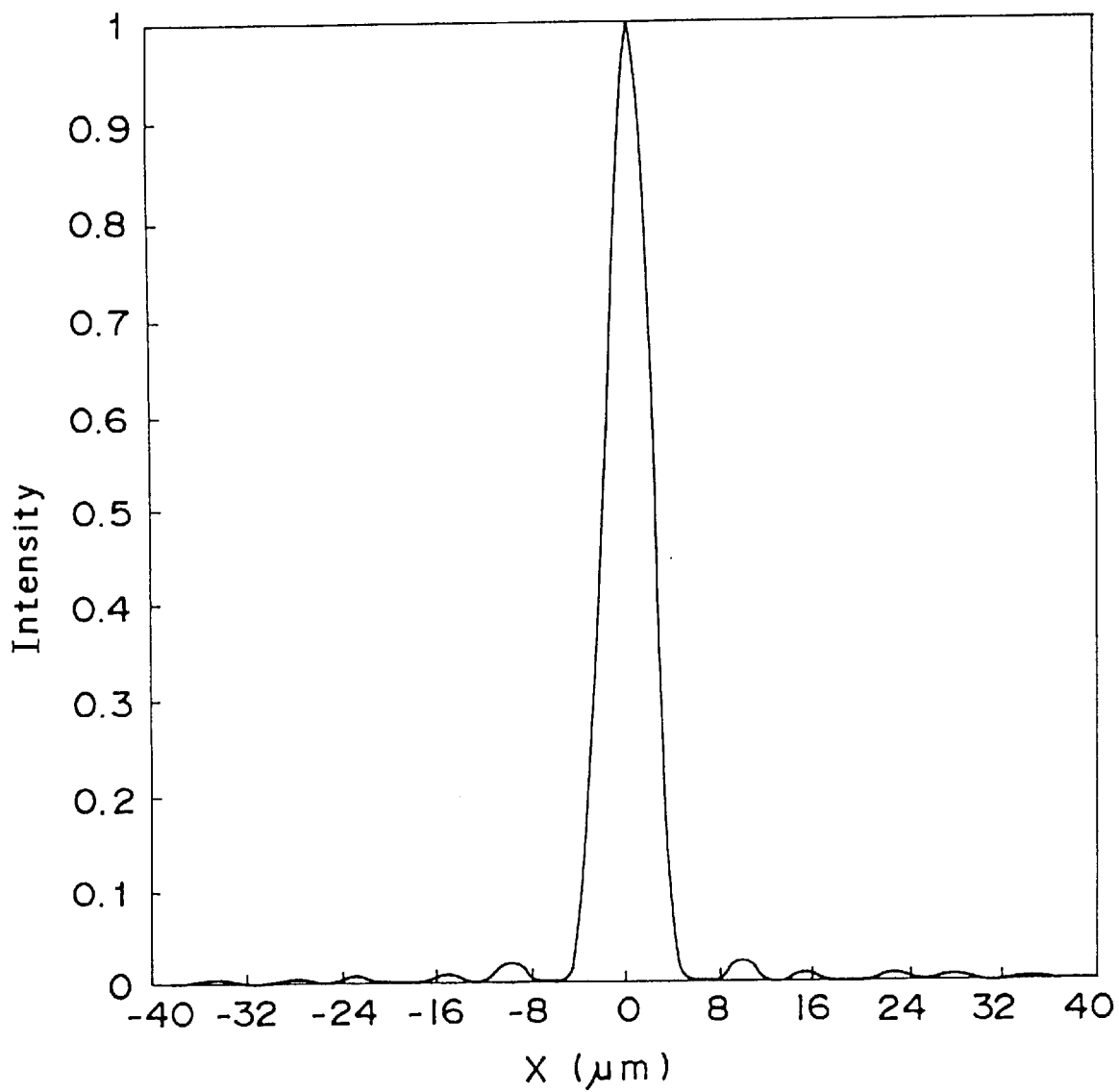
FIG. 4 is a graph of the amplitude distribution of a photosensor in the model.
Figure 5:
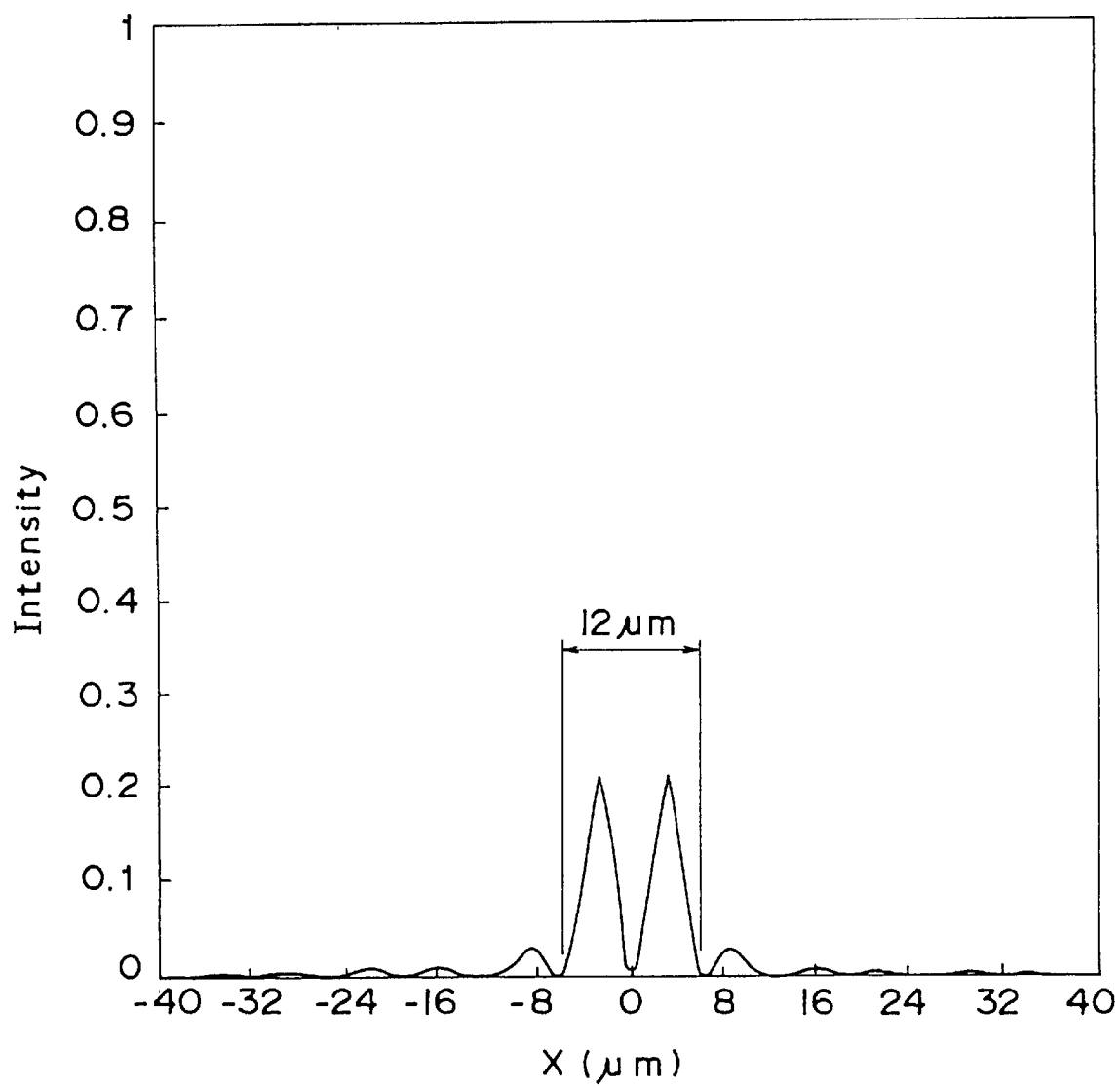
FIG. 5 is a graph of the amplitude distribution of a photosensor in the model.
Figure 6:
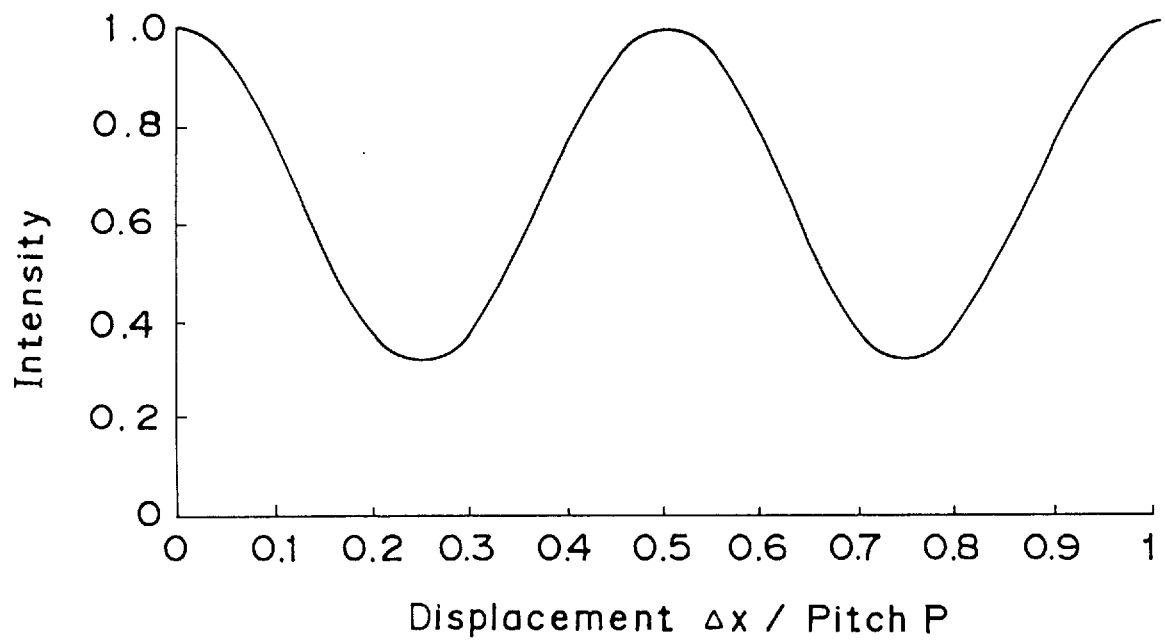
FIG. 6 is a graph of the degree of modulation in the model.

The operation of the apparatus constructed as described above is as follows. First, light emitted by the light source 11 is collimated by the lens 12 and enters the triangular prism 103 generally vertically with respect to the prism 103. As described above, the angle of deflection of light exiting the triangular prism 103 is designed to be the same as a diffraction angle λ/p of orders ±1 of the movable diffraction plate 14. Therefore, the diffracted light enters the movable diffraction plate 14 at the same angle as the diffraction light 110 of order +1 and the light 111 of order −1 as that of the prior art in FIG. 2.

The present embodiment differs from the prior art and the first embodiment in that the triangular prism 103 is used instead of the fixed diffraction plate 13 and that no diffracted light of orders of ±3 or higher generated by the fixed diffraction plate 13 are generated essentially. The light exiting the triangular prism 103 enters the movable diffraction plate 14 and exits as diffracted light. Then, it is condensed by the lens 105 at the photosensor 16. When the movable diffraction plate 14 is moved at a constant speed perpendicular to the optical axis, a double frequency is obtained as in the prior art and in the first embodiment. The light source 11, the collimating lens 12 and the prism 103 provide an example of a means for supplying a beam of wavelength λ having an angle Θ with respect to a normal of the movable diffraction plate 14 to satisfy the relationship sin(Θ)=±λ/p. Because a triangular prism is set so as to generate an angle of deflection which is the same as the diffraction angles of diffracted light of orders of ±1 of the movable diffraction plate, the effect of diffracted light of higher orders can be eliminated. Furthermore, optical losses due to the fixed diffraction plate 13 can be avoided and the light efficiency can be improved. Thus, heating of the light source can be reduced and thermal strain can be reduced. Further, a position can be measured at a higher precision.

Though the condenser lens 105 is used in the present embodiment, it is understood that a similar advantage can be realized if the photosensor is set at a position which does not receive unnecessary diffracted light without using a condenser lens as in the second embodiment or is set so that a distance from the movable diffraction plate 14 is pD/(2λ)–g or more and the light is limited to be in a region within D–2gλ/p. As in the first embodiment, by using an interference region of diffraction light of orders of ±1 or by using a condenser lens which has an entrance pupil size limited to be within D–2gλ/p, the degree of modulation can be improved more. Furthermore, the efficiency of using light can be improved more if the distance between the triangular prism 103 and the movable diffraction plate 14 is controlled so that all diffracted light exists in such a region.

Fourth Embodiment

Figure 17:
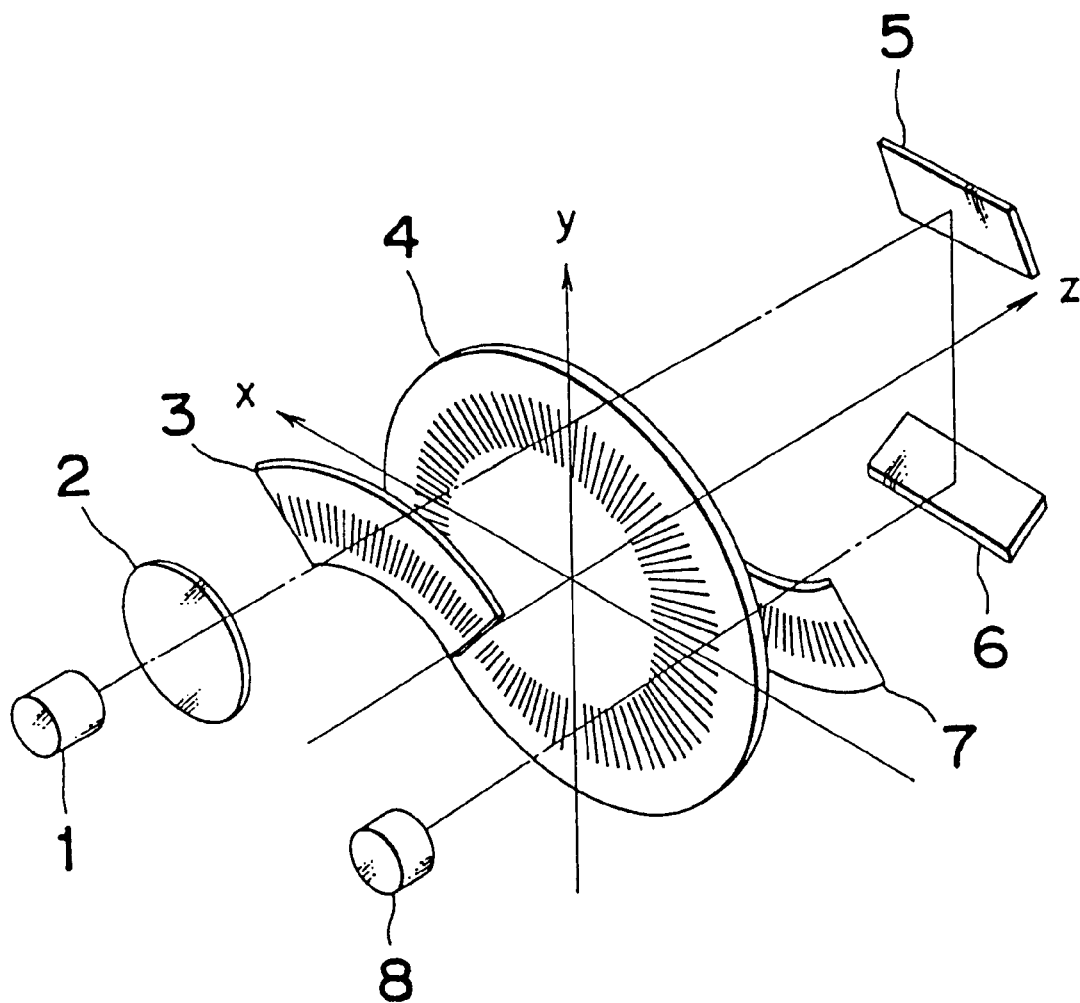
FIG. 17 is a diagram of a fourth embodiment of the present invention.

FIG. 17 shows a basic structure of a position measurement apparatus of a fourth embodiment of the present invention.

A coherent light source 1 emits light and a collimator lens 2 collimates the light. A first fixed plate 3 has a grating for transmitting only diffracted light of orders of ±1, and a rotary plate 4 has a grating provided on a circumference and transmitting only diffracted light of orders of ±1 of the same diffraction angle as that of the first fixed plate 3; grooves of the grating are formed in radial directions. Mirrors 5 and 6 guide the light exiting the rotary plate 4 to a symmetrical position with respect to the rotation center; reference numeral 7 denotes a second fixed plate having a grating for transmitting only diffracted light of orders of ±1 of same diffraction angle as that of the first fixed plate 3 and reference numeral 8 denotes a photosensor for receiving light exiting the rotary plate 4.

Figure 18:
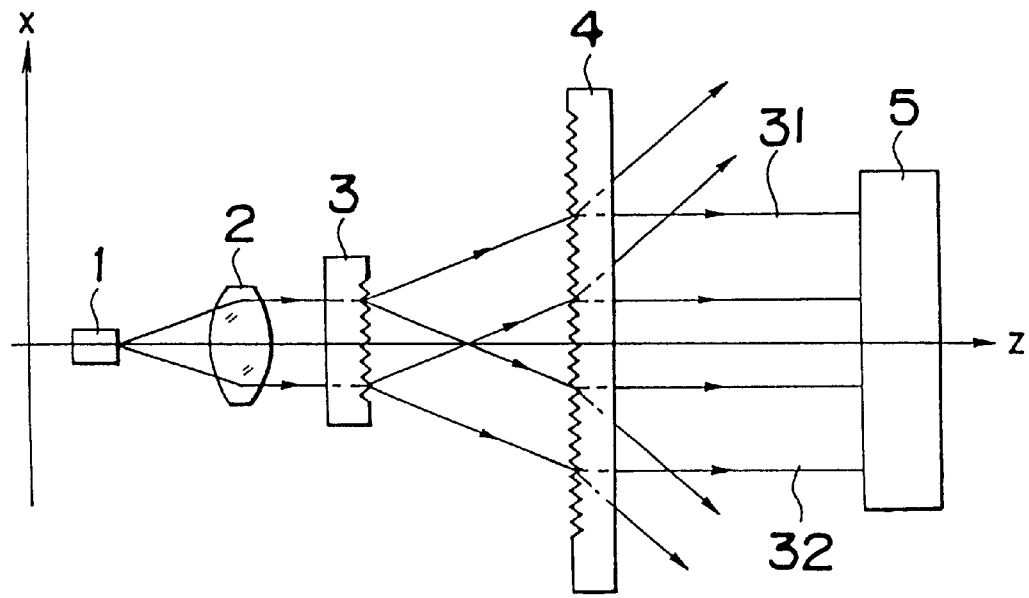
FIG. 18 is a plan view from a light source to a mirror in the embodiment.

Next, the operation of the apparatus is as follows. FIG. 18 shows an optical path from the light source 1 to the mirror 5, viewing the x-y plane from a positive x direction. The light emitted by the light source 1 is collimated by the collimator lens 2 and enters the first fixed plate 3. The light is separated by the first fixed plate into diffracted light of orders of ±1. The diffracted light of orders of ±1 exiting the first fixed plate 3 enter the rotary plate 4 and is separated into diffracted light of orders of ±1. Because the diffraction angles of diffracted light of orders of ±1 at the first fixed plate 3 and the rotary plate 4 are the same, the light flux 31 is parallel to the light flux 32. The light flux 31 denotes a light flux which is diffracted by the first fixed plate 3 along a positive x direction and diffracted further by the rotary plate 4 along a negative x direction, while the light flux 32 denotes a light flux which is diffracted by the first fixed plate 3 along a negative y direction and diffracted by the rotary plate 4 further along a positive y direction.

It is known that when a grating moves relative to an entering light, the phase of light of the diffracted light of orders of ±1 becomes fast or slow. That is, the phase of light diffracted along a moving direction of the grating with respect to an optical axis of the entering light goes fast by $2\pi x/(\lambda p)$, wherein p denotes a pitch of the grating and $\lambda$ denotes wavelength of light. On the other hand, the phase of light diffracted along a reverse direction of the moving direction of the grating with respect to an optical axis of the entering light lags by $2\pi x/(\lambda p)$. Therefore, complex amplitudes of optical fluxes 31 and 32 are expressed as in Eq. (19), wherein $\theta$ denotes a rotation angle of the rotary plate 4, a moving direction of the grating of the rotary plate 4 being taken as a positive direction of the rotation angle $\theta$ in FIG. 18, N denotes a division number of the grating in the rotary plate 4 and r denotes a distance from a center of the rotary plate 4 to a beam illumination point on the rotary plate 4.

$$y1 = A1\exp\{-N\theta + \alpha 1\}i \quad (19)$$

$$y2 = A2\exp\{N\theta + \alpha 2\}i$$

wherein i denotes a unit of complex number ($\sqrt{(-1)}$), A1 and A2 denote amplitudes of light, and $\alpha 1$ and $\alpha 2$ denote constants of initial phases. The fluxes 31 and 32 are subjected to phase modulation by the rotary plate 4 and are guided by the mirror 5 to a symmetrical position with respect to the rotation center of the rotary plate 4.

Figure 7:
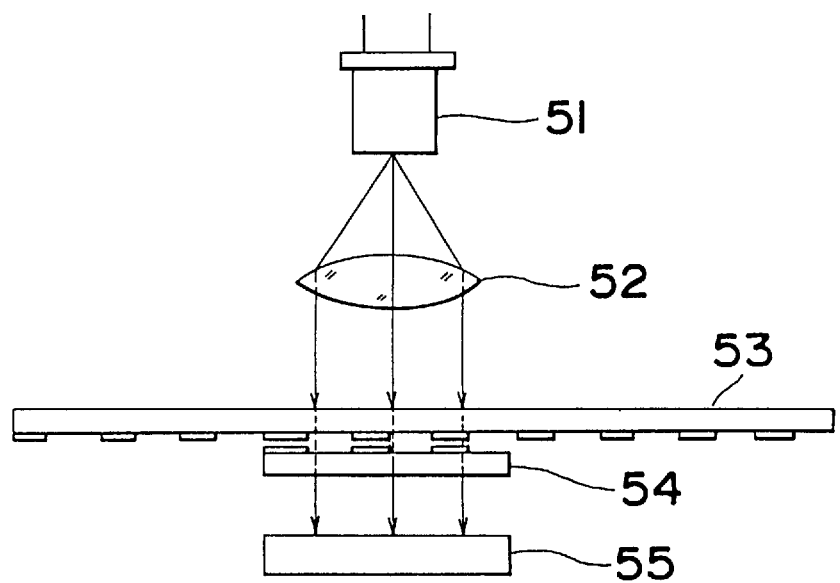
FIG. 7 is a diagram of a prior art optical encoder.
Figure 8A:
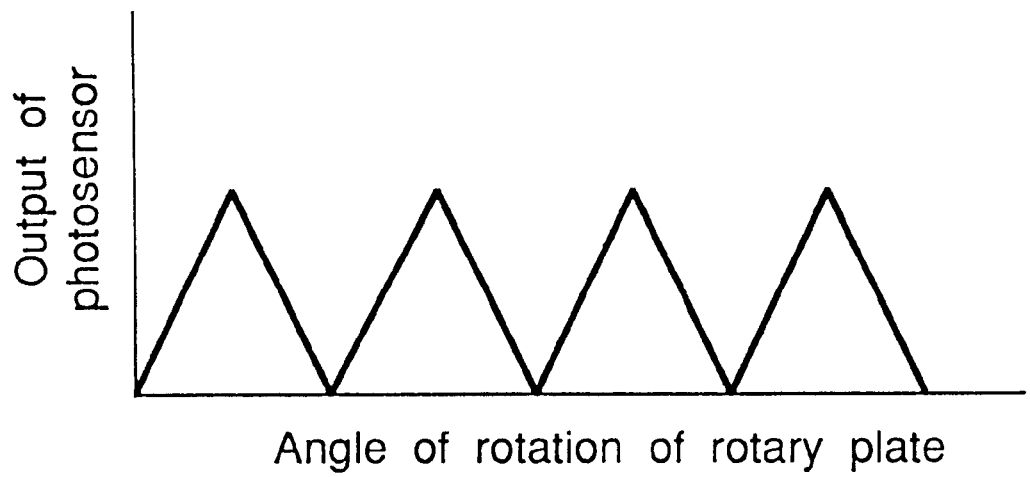
FIGS. 8A and 8B are graphs of signal waveforms of the prior art optical encoder.
Figure 8B:
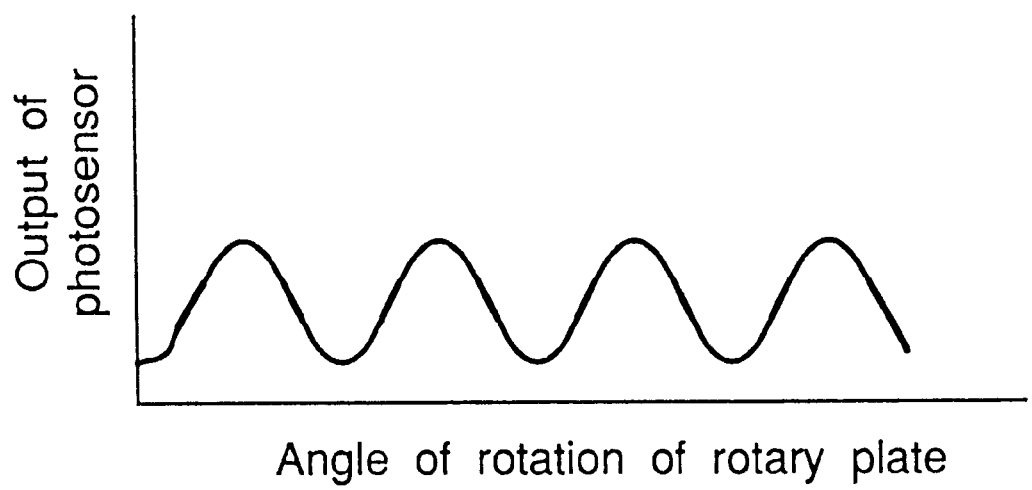
Figure 19:
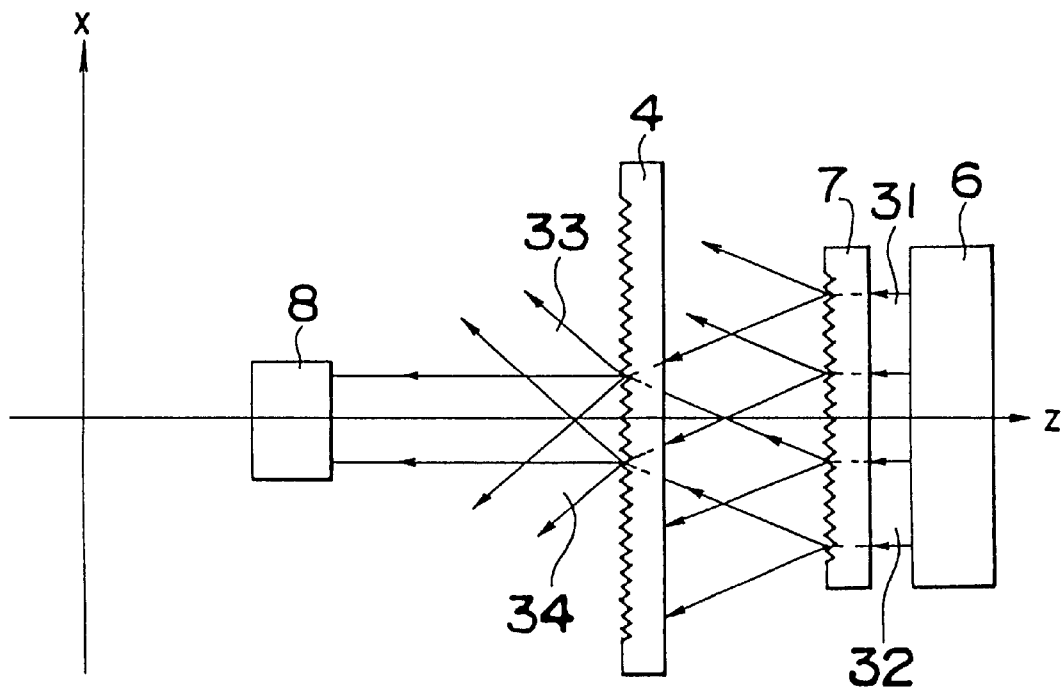
FIG. 19 is a plan view from a mirror to a photosensor in the embodiment.

FIG. 19 shows an optical path from the mirror 6 to the photosensor 8, viewing the x-z plane from a positive y direction. The light fluxes 31 and 32 exiting the mirror 6 are parallel to each other and are separated by the second fixed plate 7 into diffracted light of orders of ±1, respectively. The flux 31 is diffracted by the second fixed grating 7 along a negative x direction and further diffracted by the rotary plate 4 along a positive x direction to result in a flux 33. The flux 32 is diffracted by the second fixed grating 7 along a positive x direction and further diffracted by the rotary plate 4 along a negative x direction to result in a flux 34. The fluxes 33 and 34 are parallel to each other and are superposed to cause interference. When the rotary plate 4 rotates along a positive direction, complex amplitudes of the fluxes 33 and 34 are expressed as in Eq. (20) because the moving direction of the rotary plate 4 is a negative x direction in FIG. 7.

$$y3 = y1 \times A3\exp\{-N\theta + \alpha 3\}i \quad (20)$$

$$y4 = y2 \times A4\exp\{N\theta \alpha 4\}i$$

Further, an interference light amplitude of the fluxes 31 and 32 is calculated as in Eq. (21).

$$|y3+y4|^2 = (A1A2)^2 + (A3A4)^2 + 2\cos(4N\theta + (\alpha 1 + \alpha 3 - \alpha 2 - \alpha 4)) \quad (21)$$

The photosensor 8 detects an optical intensity expressed in Eq. (21) which shows that 4N pulses per rotation can be detected or four times the division number of the grating in the rotary plate can be obtained.

Figure 9:
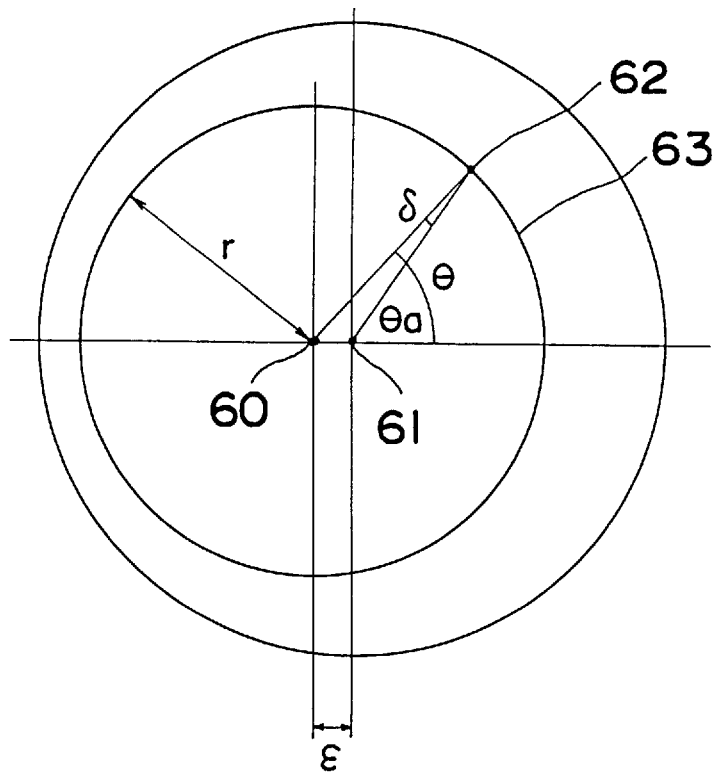
FIG. 9 is a diagram of the decentering of a rotary plate of the optical encoder.
Figure 10:
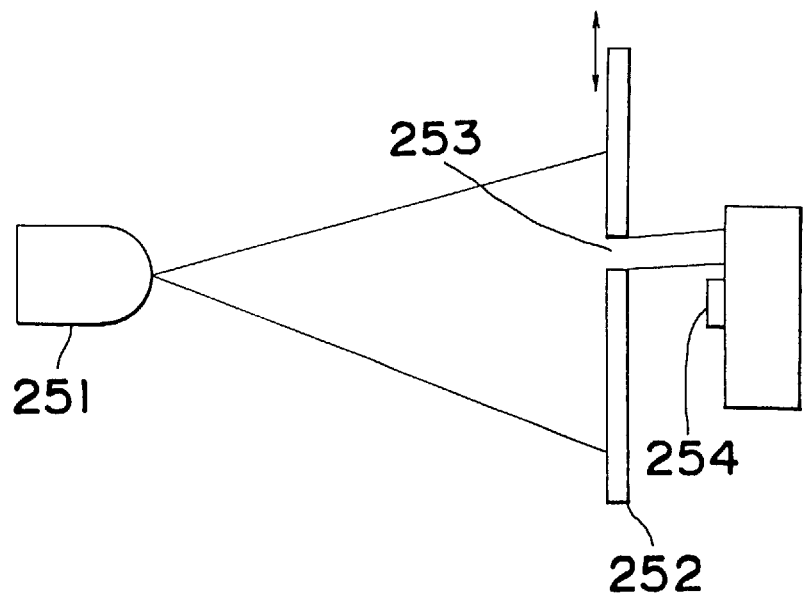
FIG. 10 is a plan view of a prior art position detection apparatus.

Next, accumulated errors are explained when a eccentricity amount $\epsilon$ of the rotary plate 4 occurs. If the rotary plate 4 has eccentricity as in the prior art shown in FIG. 9, a rotation angle $\theta$ of a particular point (say 62 in FIG. 9) differs from a rotation angle $\theta_a$ with respect to the center of the rotary plate 4. The rotation angle $\theta_a$ is expressed as $\theta_a = \theta + (\epsilon/r)\cos\theta$, as is obtained from the drawing. Therefore, the complex amplitudes of the fluxes 31 and 32 are expressed as follows:

$$y1 = A1\exp\{-N(\theta + (\epsilon/r)\cos\theta) + \alpha 1\}i \quad (22)$$

$$y2 = A2\exp\{N(\theta + (\epsilon/r)\cos\theta) + \alpha 2\}i$$

As to the symmetrical point of the particular point with respect to the rotation center of the rotary plate 4, $\theta_a = \theta - (\epsilon/r)\cos\theta$. Therefore, the complex amplitudes of the fluxes 33 and 34 are expressed as follows:

$$y3 = y1 \times A3\exp\{-N(\theta - (\epsilon/r)\cos\theta) + \alpha 3\}i$$

$$y4 = y2 \times A4\exp\{N(\theta - (\epsilon/r)\cos\theta) + \alpha 4\}i \quad (23)$$

An interference intensity of the fluxes 33 and 34 or an optical intensity received by the photosensor 8 is shown by Eq. (24).

$$|y3+y4|^2 = (A1A2)^2 + (A3A4)^2 + 2\cos(4N\theta + (\alpha 1 + \alpha 3 - \alpha 2 - \alpha 4)) \quad (24)$$

Because Eq. (24) does not have a term including an eccentricity amount $\epsilon$, there are no accumulated errors due to eccentricity, and there are no intensity fluctuations.

As explained above, diffracted light of orders of ±1 are collimated and subjected to phase modulation by the first fixed plate and the rotary plate having gratings and are subjected to phase modulation again at the symmetrical point with respect to the rotation center of the rotary plate and they are caused to interfere by the second fixed plate. Then, even if eccentricity occurs, the fluctuation of light intensity is small and an angle can be detected without accumulated errors. Therefore, it is not necessary to set up the rotary plate at a high precision, and the cost of an encoder can be reduced. Furthermore, an encoder can be made compact in size and having a better resolution. If the present embodiment is applied to a rotation type structure as shown in FIG. 1, the encoder is not liable to be affected by the eccentricity of an axis due to a load applied to a rotation axis. Then, a bearing can be made small in size and with a lighter weight.

A distance between the first fixed plate 3 and the rotary plate 4 is increased to completely separate the diffracted light of orders of ±1 on the rotary plate 4 and the distance between the first fixed plate 3 and the rotary plate 4 is arranged so that only fluxes 33 and 34 are received by the photosensor 8, so that signals of higher degree of modulation can be obtained.

Though mirrors 5 and 6 are used for reflecting light optically, prisms may also be used. Though, the first fixed plate 3, the rotary plate 4, the mirror 5, the mirror 6, the second fixed plate 7 and the rotary plate 4 are arranged in this order in an optical path from the light source 1 in the present embodiment, they may be arranged in an order of the rotary plate 4, the first fixed plate 3, the mirror 5, the mirror 6, the rotary plate 4 and the second fixed plate 7.

Fifth Embodiment

Figure 20:
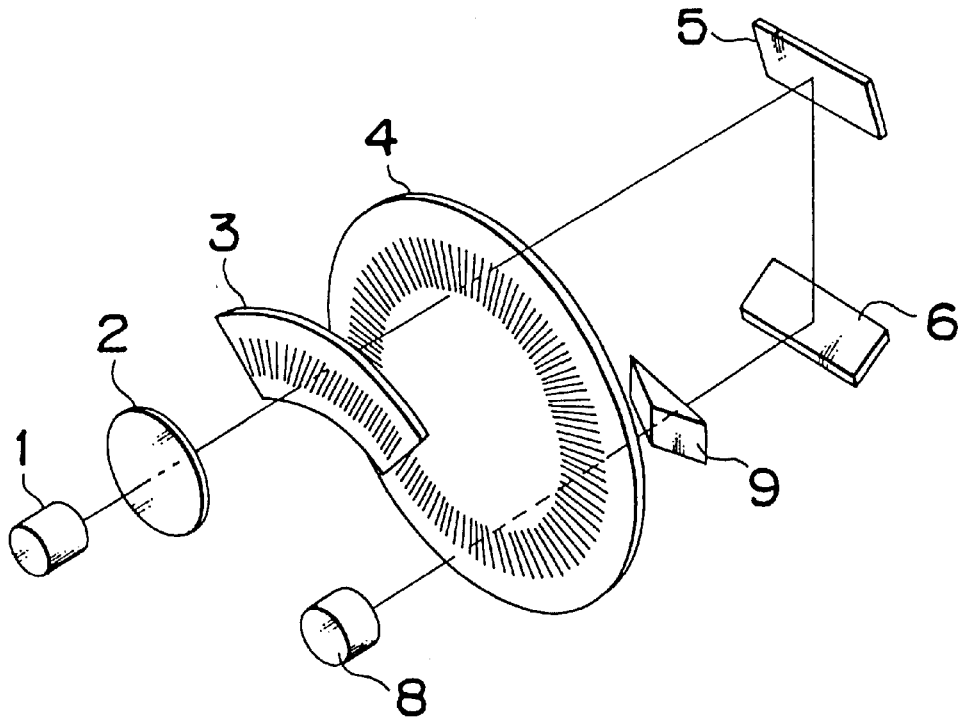
FIG. 20 is a diagram of a fifth embodiment of the present invention.

FIG. 20 shows a basic structure of a fifth embodiment of the present invention. A light source 1 emits coherent light, and a collimator lens 2 collimates the light emitted by the light source 1. The light enters a first fixed plate 3 having a grating which transmits only diffracted light of orders of ±1, and a rotary plate 4 having a grating provided on a circumference transmits only diffracted light of orders of ±1 of the same diffraction angle as that of the first fixed plate 3. Grooves of the grating of the rotary plate 4 are formed in radial directions. Mirrors 5 and 6 guide the light exiting the rotary plate 4 to a symmetrical position with respect to the rotation center. A triangular prism 9 refracts light from the mirror 6. A photosensor 8 receives light exiting the rotary plate 4. This embodiment differs from the fourth embodiment in that the triangular prism 9 is used instead of the second fixed diffraction plate 7 having a grating used in the fourth embodiment. The angle of deflection of light exiting the triangular prism 9 is designed to be the same as a diffraction angle $\lambda/p$ of diffracted light of orders ±1 of the first fixed plate 3. Therefore, the beam exiting the prism 9 has an angle $\Theta$ with respect to a normal of the rotary plate 4 satisfies the equation $\sin(\Theta)=\pm\lambda/p$.

Figure 21:
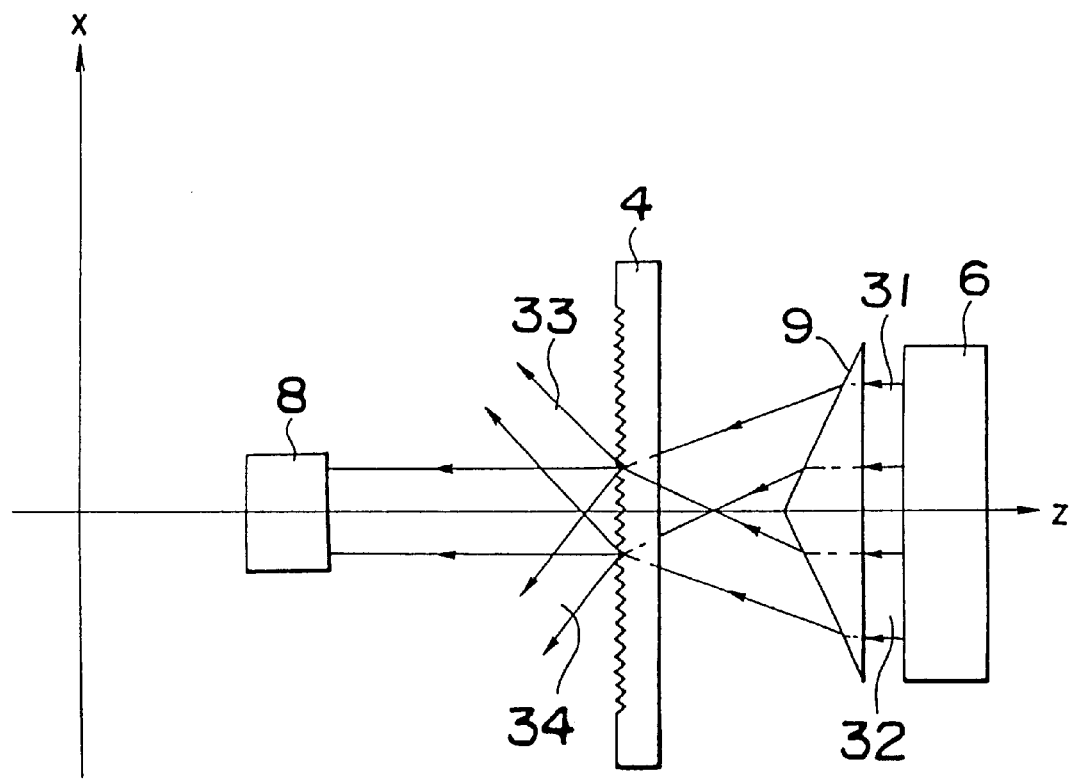
FIG. 21 is a plan view from a mirror to a photosensor in the embodiment.

The operation of the apparatus constructed as described above is explained with reference to FIG. 21. The operation of the apparatus from the light source 1 to the mirror 6 is same as in the fourth embodiment. Fluxes 31 and 32 diffracted by the plates 3 and 4 and exiting the mirror 6 enter the triangular prism 9. The flux 31 is refracted further by the triangular prism 9 in a negative x direction, while the flux 32 is refracted further by the triangular prism 9 in a positive x direction. As described above, the angle of deflection of light exiting the triangular prism 9 is designed to be same as a diffraction angle of diffracted light of orders ±1 at the first fixed plate 3. Therefore, the fluxes 33 and 34 are subjected to phase modulation similar to that of the fourth embodiment and are collimated, and an interference occurs.

The degree of interference of the fluxes 33 and 34 changes as shown in Eq. (24), and pulses of four times a division number of the grating of the rotary plate 4 are obtained. Even if eccentricity of the rotary plate 4 occurs, the optical intensity does not fluctuate much and an angle can be detected without being affected by accumulated errors, as in the fourth embodiment. Furthermore, though diffracted light which does not contribute to the interference of the fluxes 33 and 34 is generated in the fourth embodiment by using the second fixed plate, such unnecessary diffracted light can be reduced and the light efficiency can be increased.

Though mirrors 5 and 6 are used for reflecting light optically, prisms may also be used. Though the triangular prism 9 is used in the embodiment, the prism may have any shape as long as the angle of deflection is the same. Though, the first fixed plate 3, the rotary plate 4, the mirror 5, the mirror 6, the triangular prism 7 and the rotary plate 4 are arranged in this order in an optical path from the light source 1 in the present embodiment, they may be arranged in an order of the rotary plate 4, the first fixed plate 3, the mirror 5, the mirror 6, the rotary plate 4 and the triangular prism 9.

Sixth Embodiment

Figure 22:
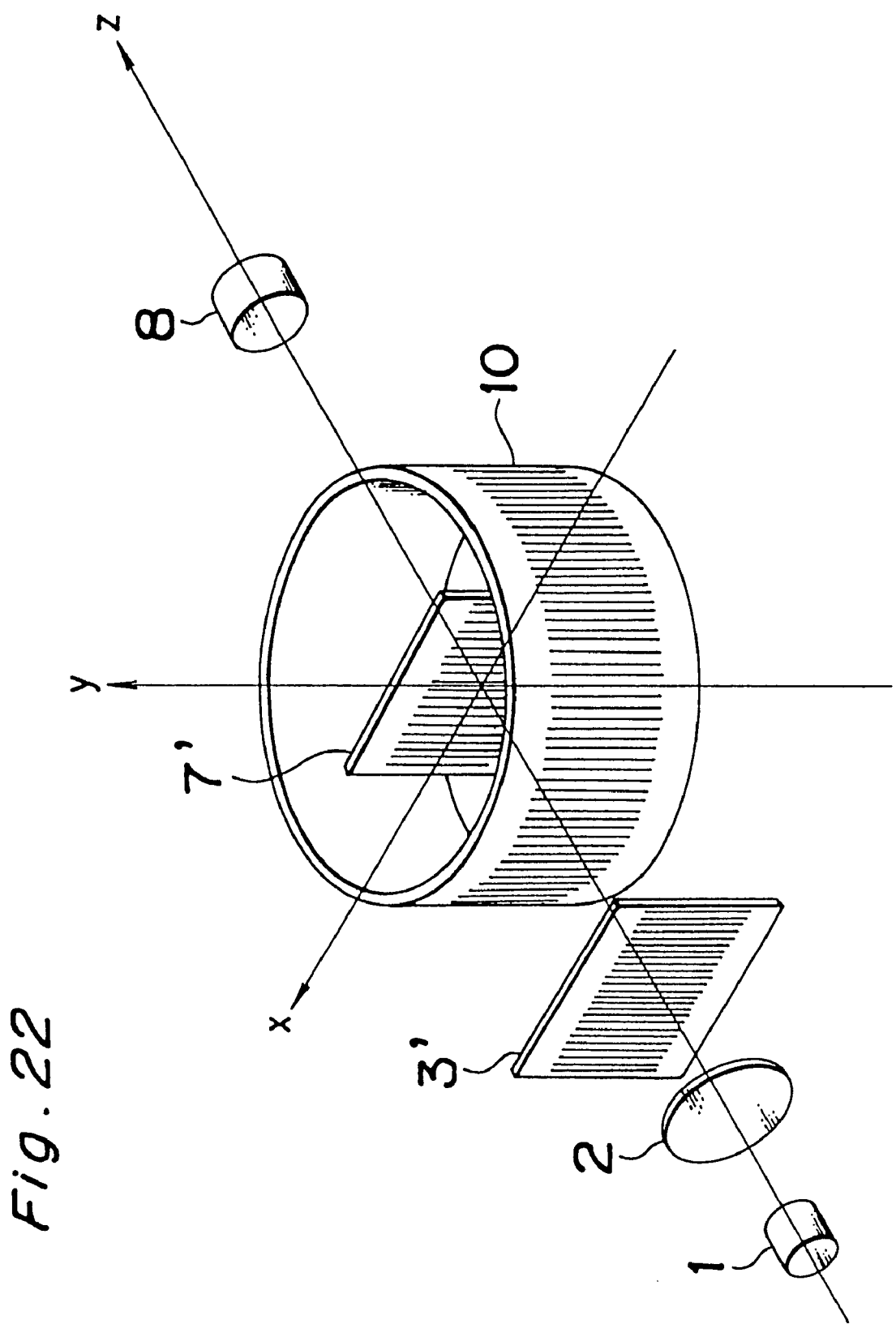
FIG. 22 is a diagram of a sixth embodiment of the present invention.

FIG. 22 shows a basic structure of a sixth embodiment of the present invention. A light source 1 emits coherent light and a collimator lens 2 collimates the light emitted by the light source 1. A first fixed plate 3' has a grating for transmitting only diffracted light of orders of ±1. A second fixed plate 7' has a grating for transmitting only diffracted light of orders of ±1 of same diffraction angle as that of the first fixed plate 3'. The second fixed plate 7' is located in a rotating body 10 having a grating on a cylinder. The grating transmits diffracted light only of orders of ±1. The rotation center of the rotating body 10 is located on an optical axis of the light source 1. A photosensor 8 receives the light. This embodiment differs from the fourth and fifth embodiments in that the rotating body 10 has a grating which transmits diffracted light only of orders of ±1 without using an optical reflector whereas the fourth and fifth embodiments use a rotary plate having a grating on a circular plate which transmits diffracted light only of orders of ±1.

Figure 23:
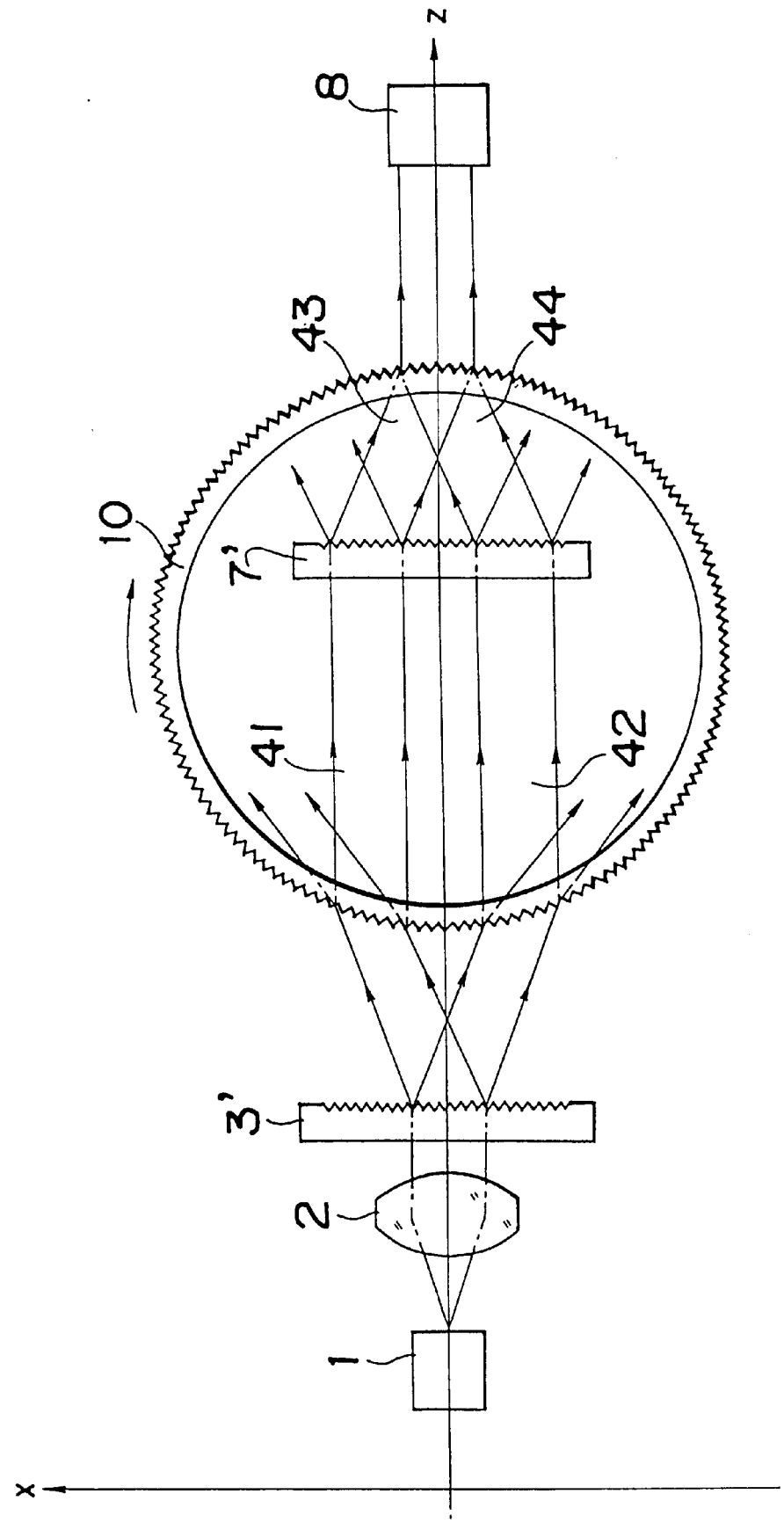
FIG. 23 is a plan view of an encoder in the embodiment.

The operation of the apparatus constructed as described above is explained with reference to FIG. 23. Light emitted by the light source 1 is collimated by the collimator lens 2 and enters the first fixed plate 3'. The emitted light is separated by the first fixed plate 3' into diffracted light of orders of ±1 so as to enter the rotating body 10. In this embodiment, if there is an error between a geometrical center and a rotation center, a rotation angle $\theta_a$ of the rotating body is expressed as $\theta_a=\theta+(\epsilon/r)\cos\theta$, as in that of the rotary plate 4 used in the fourth and fifth embodiments. The diffraction angle of diffracted light of orders of ±1 of the grating formed in the cylinder of the rotating body 10 is equal to that of the first fixed plate 3'. A light flux 41 is diffracted by the first fixed plate 3' along a positive x direction and is further diffracted by the rotary plate 10 along a negative x direction, while a light flux 42 is diffracted by the first fixed plate 3' along a negative y direction and is further diffracted by the rotary plate 4 along a positive y direction. Therefore, the fluxes 41 and 42 are parallel to each other, as in the fourth embodiment, and they are subjected to phase modulation according to the rotation of the rotating body 10.

The flux 41 is diffracted by the second fixed plate 7' along a negative x direction and is further diffracted by the rotating body 10 along a positive x direction to result in the flux 43. The flux 42 is diffracted by the second fixed plate 7' along a positive x direction and is further diffracted by the rotating body 10 along a negative x direction to result in the flux 44. Because the rotation center of the rotating body 10 is located on an optical axis of the light source 1, the fluxes 43 and 44 are subjected to phase modulation by the rotating body 10 and the degree of interference changes as shown in Eq. (24). Therefore, even if eccentricity of the rotating body 10 occurs, the optical intensity does not fluctuate much and an angle can be detected without being affected by accumulated errors, as in the fourth and fifth embodiments.

Furthermore, because the light source 1 to the photosensor can be arranged along a line, it is easy to set up and adjust an encoder. Because an optical reflector is not needed, an encoder can be made compact in size with a lighter weight. Though the first and second fixed plates 3 and 7 comprise a flat plate in FIGS. 22 and 23 in the embodiment, they may be parts of a cylinder. Though the grating is provided on an outer surface of the rotating body in FIG. 23, it may be provided on an inner surface thereof.

Seventh Embodiment

Figure 24:
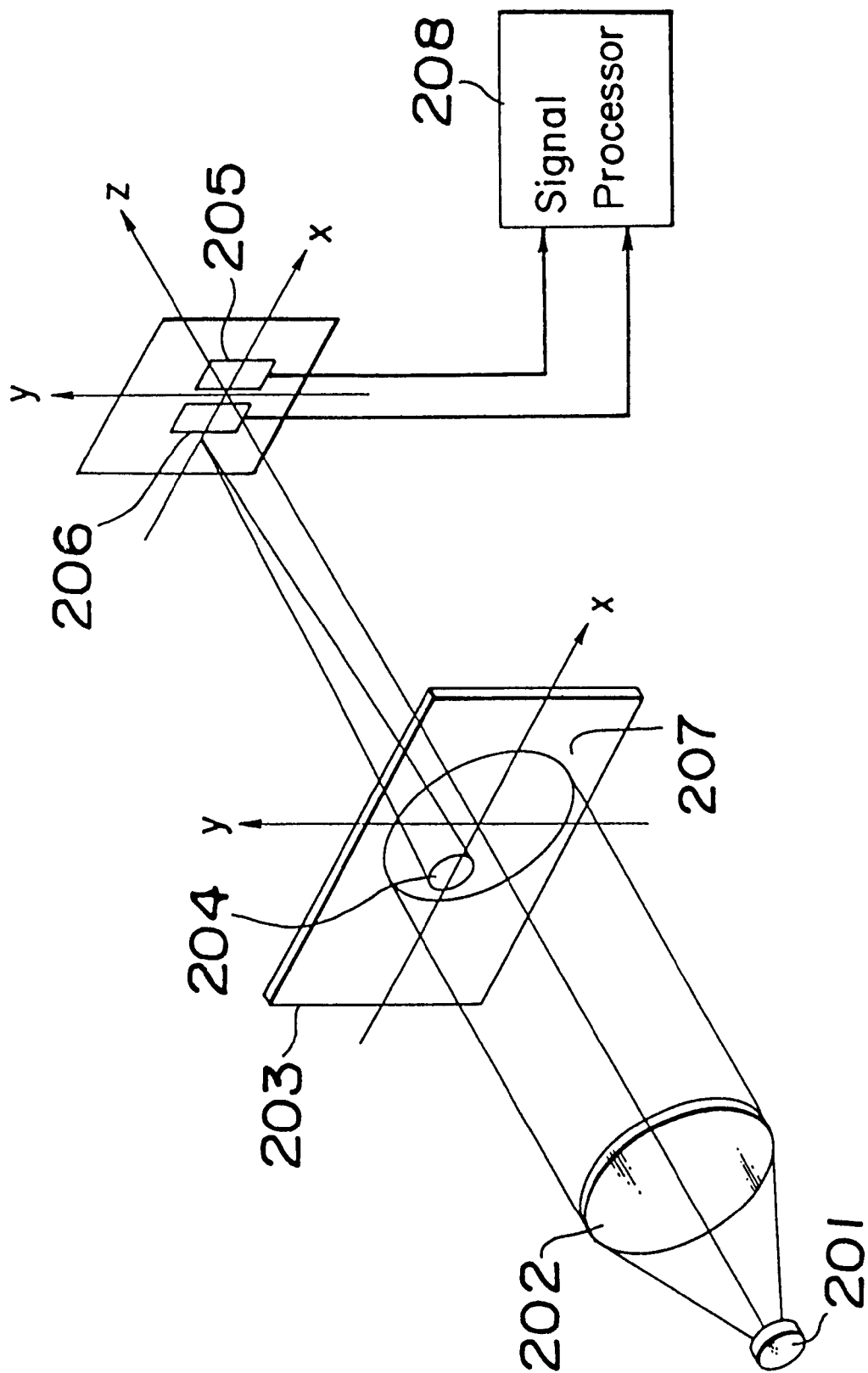
FIG. 24 is a perspective view of a position measurement apparatus according to a seventh embodiment of the present invention.

A seventh embodiment of the present invention is explained with reference to FIGS. 24–28. FIG. 24 is a perspective view of a structure of the embodiment. A laser light source 201 is provided at a position of a focal point in front of a collimator lens 202 for collimating light emitted by the light source 201. A Z axis is presumed to correspond to an optical axis of the collimator lens 202. A condenser lens 204 is arranged on a movable body 203 which moves perpendicularly to the optical axis through the emitted light. The X axis is presumed to be a direction along which the movable body 203 moves. First and second photosensors 205 and 206 are arranged on a contour of the focal point of the condenser lens 204. A gap between the first and second photosensors 205 and 206 is smaller than the size of the condensed beam on the photosensors 205 and 206 in a moving direction or x direction of the movable body 203, while the width of each of the first and second photosensors 205 and 206 is larger than the size of the condensed beam on the photosensors 205 and 206 in the x-axis direction. A shading member 207 is provided on the movable body 203 for shading the light exiting the collimator lens 202 to illuminate outside the entrance pupil of the condenser lens 204. Then, the shading member 207 prevents that the light exiting the collimator lens 202 from illuminating the photosensors 205 and 206 in a region wherein the movable body 203 moves. A signal processor 208 receives outputs of the first and second photosensors 205 and 206 and sends a reference position signal of the movable body 203.

Figure 25:
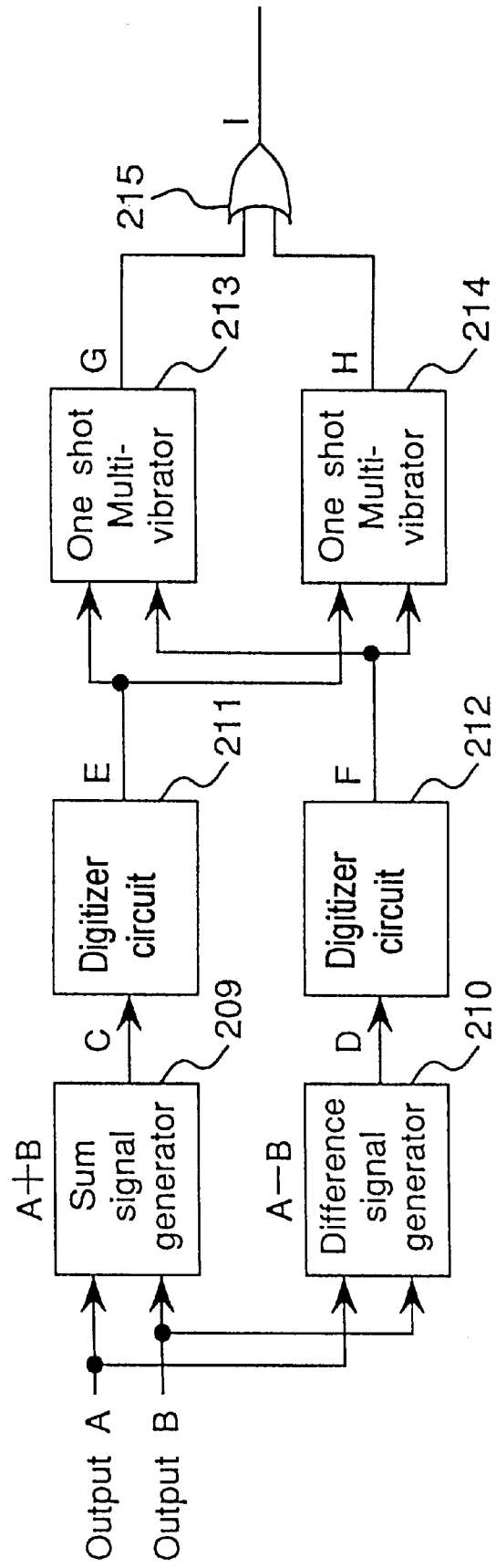
FIG. 25 is a block diagram of a signal processor of the embodiment.

FIG. 25 is a block diagram of the signal processor 208. A sum signal generator circuit 209 generates a sum signal C of an output signal A of the first photosensor 205 and an output signal B of the second photosensor 206, while a difference signal generator circuit 210 generates a difference signal D of the signals A and B. A digitizer circuit 211 provides a bi-level signal E of the signal C. That is, if an input signal is lower than a prescribed threshold level, a low level signal is output, while if an input signal is higher than the prescribed threshold level, a high level signal is output. On the other hand, a digitizer circuit 212 receives the signal D and performs digitizer by using a hysteresis characteristic to output a signal F. That is, the digitalization is performed with a threshold value $V_{c1}$ at a leading edge of an input signal, and with a threshold value $-V_{c1}$ at a trailing edge of an input signal. The threshold value $V_{c1}$ is set to have a value larger than a maximum amplitude of noise included in the signal D. A one shot multivibrator 213 for a trailing edge trigger generates a pulse signal G with a prescribed width at a trailing edge of the signal E in a period when the signal F is at a high level, while a one shot multivibrator 214 for a leading edge trigger generates a pulse signal H with a prescribed width at a leading edge of the signal E in a period when the signal F is at a high level. A logic sum element 215 outputs a logical sum signal I of the signals G and H.

Figure 26:
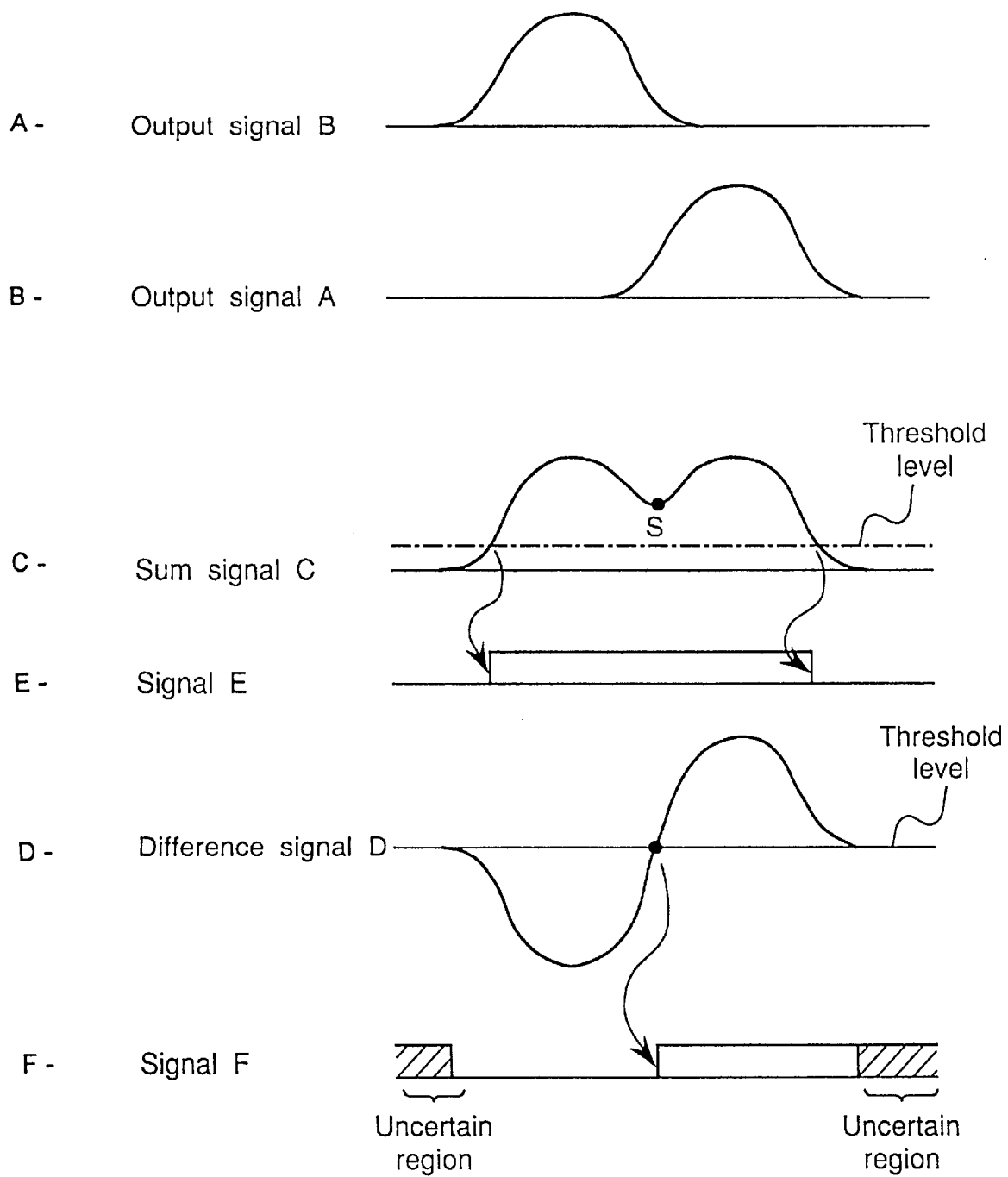
FIG. 26 is a waveform diagram of each portion in the signal processor in the embodiment.

The operation of the embodiment constructed as explained above is as follows. FIG. 26 shows waveforms of the signal processing means when the movable body 203 moves in a positive direction. As the movable body 203 moves, light exiting the collimator lens 202 enters the entrance pupil of the condenser lens 204, and the light is condensed at a focal point of the condenser lens 204. The focal point exist on an axis which is parallel to the light exiting the collimator lens 202 and passes a center of the condenser lens 204. Therefore, the amount of displacement of the movable body 203 in the x-axis direction is equal to that of the focal point of the condenser lens 204. The first and second photosensors 205 and 206 are arranged on a trace of the focal point of the condenser lens 204. Therefore, the condensed beam scans the photosensors 205 and 206 as the movable body 203 moves.

Next, generation of a reference position signal is explained from the output signals A and B of the first and second photosensors 205 and 206. As the condensed beam moves from the first photosensor 205 to the second photosensor 206, the difference signal D changes from a negative value to a positive value, while as the condensed beam moves from the second photosensor 206 to the first photosensor 205, the difference signal D changes from a positive value to a negative value. When the difference signal D becomes zero, the amount of light received by the first photosensor 205 is equal to that received by the second photosensor 206. Therefore, the signal D becomes zero only at a point if the condensed beam is on the photosensors 205 and 206. Therefore, a reference position is derived from a position where the condensed beam is on the photosensors and the difference signal becomes zero.

When the intensity of the condensed beam varies with an intensity change of the light source, the outputs of the photosensors 205 and 206 change. However, the ratio between them is constant. Therefore, the position where the signal D becomes zero or the position of the movable body 203 does not change. Further, because the signal D is a difference between the signals A and B, common mode noise on the signals A and B such as noise due to scattered light on the first and second photosensors 205 and 206 cancel each other. A signal change rate around zero of the signal D against a displacement of the movable body 203 becomes about twice as large as that of only the first or second photosensor 205 or 206. Therefore, an error of reference position signal due to noise included in the signal D can be reduced.

In order to detect a point where the signal D becomes zero, a signal F is generated by the digitizer circuit 212. A leading edge of the signal F means that the movable body 203 moves from a negative x direction to a positive direction and reaches the reference position, while a trailing edge thereof means that the movable body 203 moves from a positive x direction to a negative direction and reaches the reference position. The sum signal C of the first and second photosensors 205 and 206 is the sum of the amount of light received by the photosensors 205 and 206. Because the gap between the first and second photosensors 205 and 206 is smaller than the size of condensed beam on the photosensors, when the condensed beam is on the photosensors, the signal C has a value larger than zero, otherwise it becomes zero. When the amount of light received by the first and second photosensors 205 and 206 are equal to each other, the signal C has a minimum value. By setting a threshold value between 0 and S by considering noise included in the signal C, the signal E is obtained. By using the signal E, it can be detected that the condensed beam is located on the photosensors 205 and 206. Therefore, the reference position of the movable body 203 can be represented by using the signals E and F or an edge of the signal E when the signal F is at a high level. Further, if the signal E has a leading edge, it is found that the movable body 203 passes the reference position in the positive direction, while if the signal E has a trailing edge, it is found that the movable body 203 passes the reference position in the negative direction.

Figure 27A:
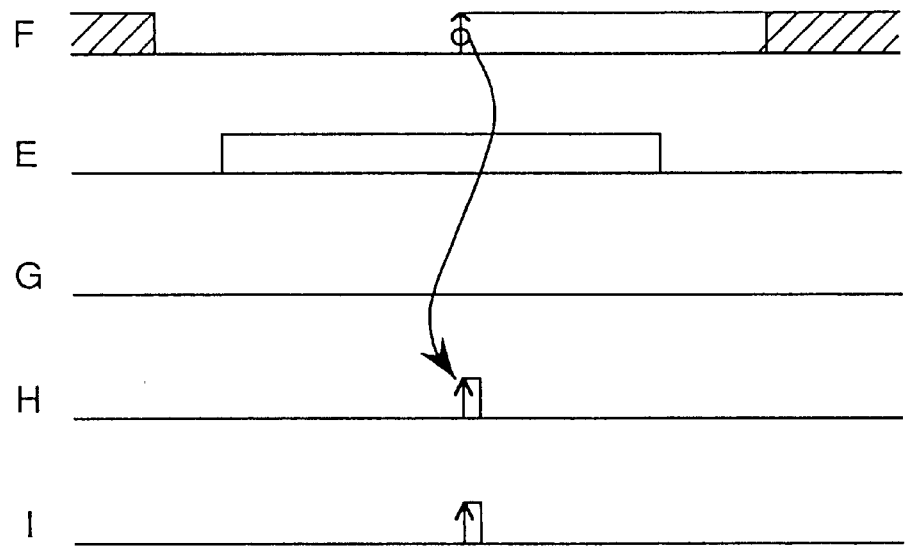
FIGS. 27A and 27B are waveform diagrams for beam scan in the embodiment.
Figure 27B:
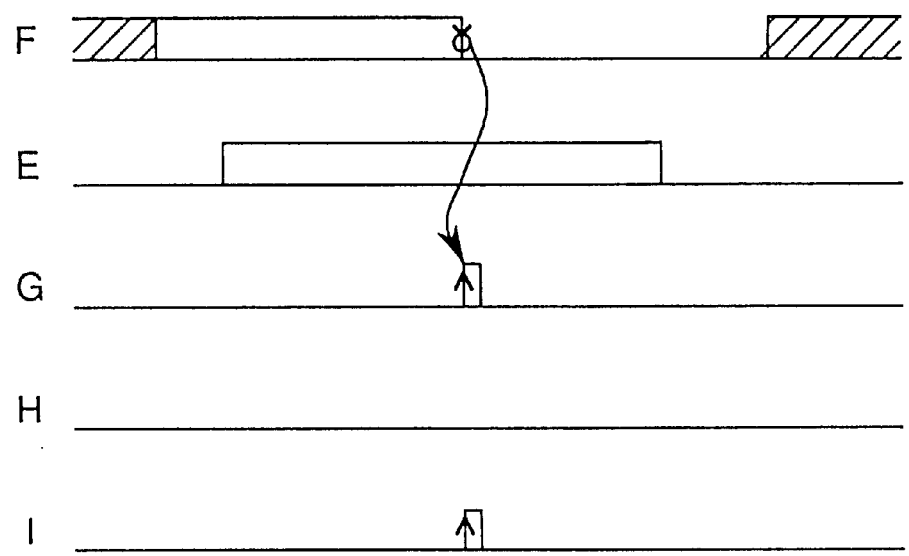

Next, the generation of a pulse signal is explained with reference to FIGS. 27A and 27B when the movable body 203 passes the reference position in the positive and negative directions. The signal F is provided to the one shot multivibrators 213 and 214 for the trailing edge trigger and for the leading edge trigger. A pulse of a prescribed width is generated when an edge occurs while the signal E is at a high level. As shown in FIG. 27A, when the movable body 203 passes the reference position in the positive direction, the signal F has a leading edge, and the one shot multivibrator 214 generates a pulse H. On the other hand, as shown in FIG. 27B, when the movable body 203 passes the reference position in the negative direction, the signal F has a trailing edge, and the one shot multivibrator 213 generates a pulse G. Therefore, if a logical sum signal I is obtained from the signals H and G, it is detected that the movable body 203 reaches the reference position according to the leading edge of the signal I.

As explained above, in the embodiment, the light emitted by the light source 201 is condensed by the condenser lens 204 provided on the movable body 203 and a difference signal is generated between the outputs of the first and second photosensors 205 and 206. Therefore, the reference position can be obtained without being affected by fluctuations of the intensity of the light emitted by the light source 201 and with a precision not deteriorated much by noise.

Figure 28:
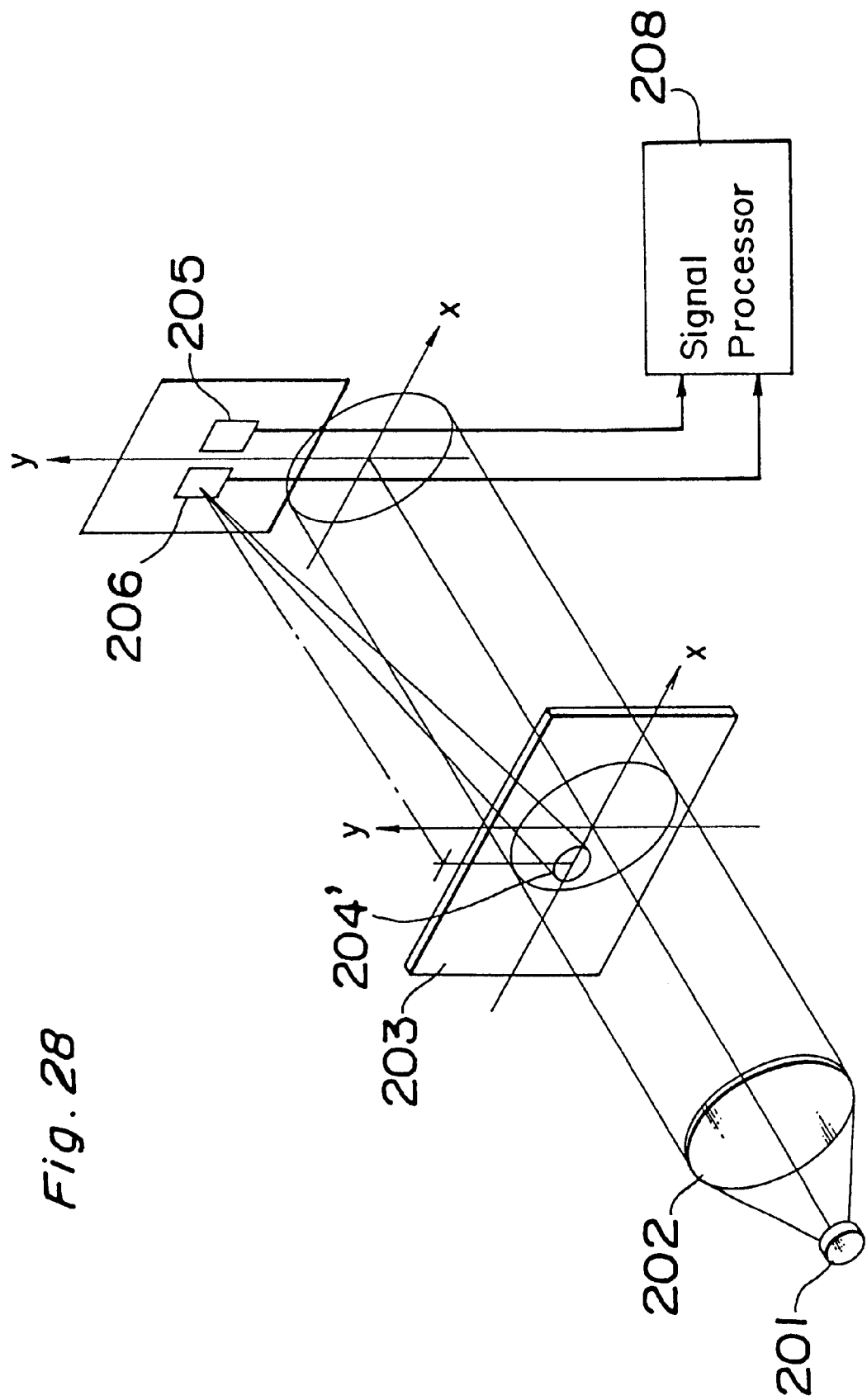
FIG. 28 is a perspective view of a structure using a focal lens outside an axis in the embodiment.

The shading member 207 is provided in the embodiment for preventing the light exiting the collimator lens 202 outside the entrance pupil of the condenser lens from entering the photosensors. However, FIG. 28 shows that a lens 204' having a focal point outside the optical axis is used as the condenser lens 204. Then, a focal point is provided outside the optical path or the light exiting the collimator lens does not illuminate the photosensors 205 and 206 directly.

The photosensors 205 and 206 are set at a focal point at a back side of the lens 204 in the above-mentioned example in order to decrease the size of the condensed beam. However, they may not be set on the focal point. Because a center of the condensed beam of the condenser lens 204 exists on a line which is parallel to the light exiting the collimator lens 202 and passes the center or the condenser lens 204, the amount of displacement of the movable body 203 in the x direction is equal to that of the center of the condensed beam.

The first and second photosensors 205 and 206 are arranged in a plane perpendicular to the z-axis in the above-mentioned example. However, they may be located in a plane oblique with respect to the z-axis. Furthermore, though the photosensors 205 and 206 are arranged in a same plane in the above-mentioned example, they may be located in different planes. A Fresnel zone plate of an amplitude type or phase type may be used instead of the condenser lens 204. The light source 201 may be a light-emitting diode or the like instead of the laser light source.

Eighth Embodiment

Figure 29:
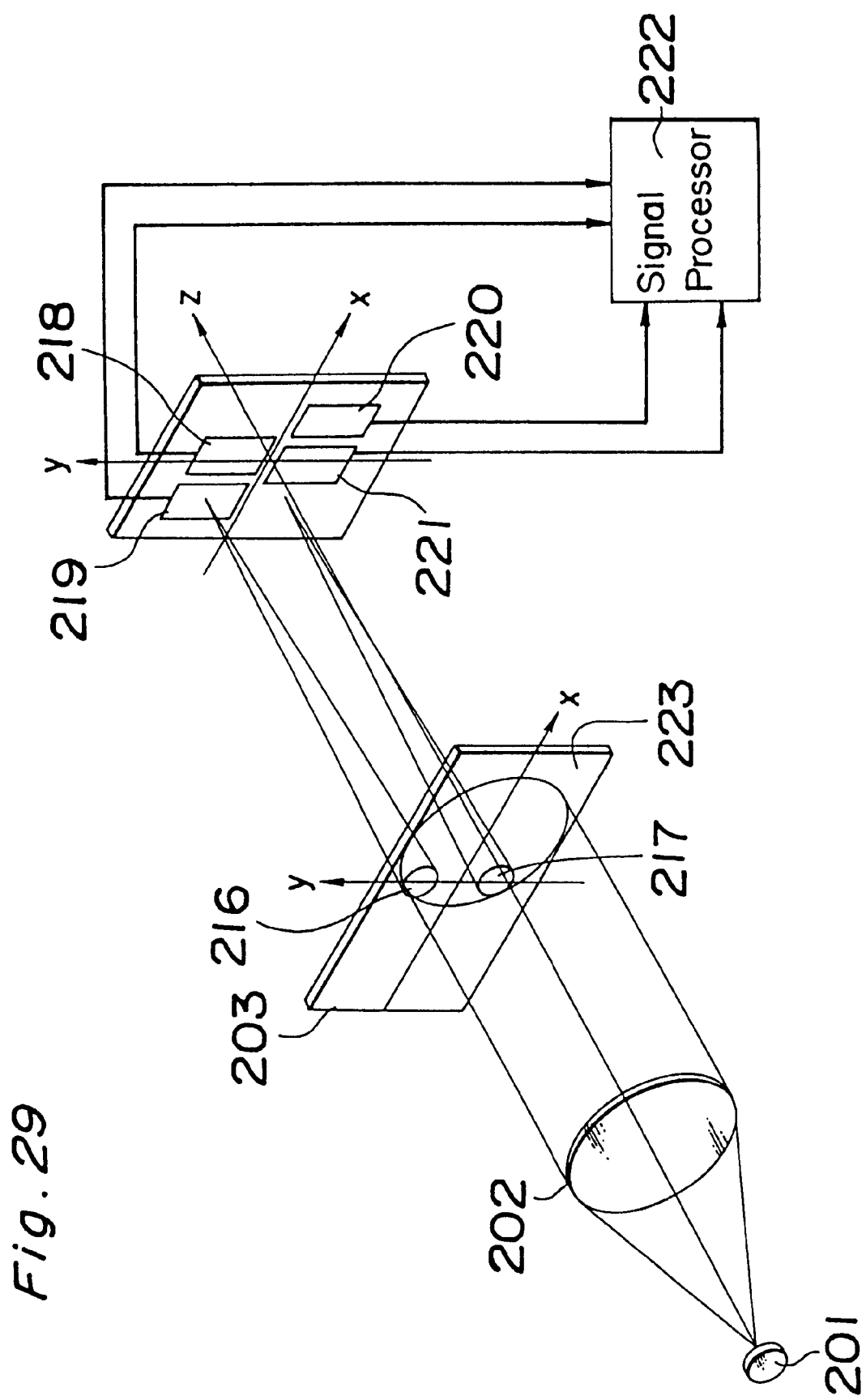
FIG. 29 is a perspective view of a position measurement apparatus of an eighth embodiment of the present invention.

An embodiment of an eighth embodiment of the present invention is explained with reference to FIGS. 29–31. FIG. 29 is a perspective view of the apparatus of eighth embodiment of the present invention. A laser light source 201 is provided at a position of a focal point in front of a collimator lens 202 for collimating light emitted by the light source 201. The Z axis is presumed to correspond to an optical axis of the collimator lens 202. A movable body 203 moves in a direction which is perpendicular to the optical axis through the emitted light. The X axis presumed to be the direction along which the movable body 203 moves.

A first condenser lens 216 and a second condenser lens 217 are disposed on the movable body 203 in y direction which is perpendicular to the optical axis, and they pass light exiting the collimator lens 202. A shading section 223 is provided on the movable body 203 and shades the light exiting the collimator lens 202 outside the entrance pupil of the condenser lenses 216 and 217 to prevent the light exiting the collimator lens 202 from illuminating the photosensors 218, 219, 220 and 221 in a region wherein the movable body 203 moves.

The first photosensor 218 and the second photosensor 219 are arranged on a trace of a focal point of the first condenser lens 216 outside a trace of a focal point of the second condenser lens 217. A gap between the first and second photosensors 218 and 219 in the x direction of the movable body 203 is smaller than a size of the beam condensed by the condenser lens 216 on the photosensors 218 and 219. The third photosensor 220 and the fourth photosensor 221 are arranged on a trace of a focal point of the second condenser lens 217 outside a trace of a focal point of the first condenser lens 216. A gap between the third and fourth photosensors 220 and 221 in the x direction of the movable body 203 is smaller than a size of the beam condensed by the condenser lens 217 on the photosensors.

As mentioned above, the gap between the first and second photosensors 218 and 219 in the moving direction of the movable body 203 is smaller than the size of the beam condensed by the condenser lens 216 on the photosensors 218 and 219 and, the gap between the third and fourth photosensors 220 and 221 in the moving direction of the movable body 203 is smaller than the size of the beam condensed by the condenser lens 217 on the photosensors. Further, a distance between a position where the outputs of the first and second photosensors 218 and 219 along the moving direction of the movable body 203 become equal to each other and a position where the outputs of the third and fourth photosensors along a moving direction of the movable body 203 has a value which is different by a prescribed value from a distance between a center of the first condenser lens 216 and that of the second one 217. Thus, when a part of the beam condensed by the first condenser lens 216 exists on the first or second photosensor 218 or 219, a part of the beam condensed by the second condenser lens 217 exists on the third or fourth photosensor 220 or 221.

Reference numeral 222 denotes a signal processor which receives output signals of the photosensors 218, 219, 220 and 221 and outputs a position detection signal. FIG. 30 is a block diagram of a structure of the signal processor 222. A sum signal generator circuit 224 generates a sum signal C1 of an output signal A1 of the photosensor 218 and an output signal B1 of the photosensor 219, while a difference signal generator circuit 225 generates a difference signal D1 of the signals A1 and B1. A digitizer circuit 226 provides a bi-level signal E1 of the signal C1. Further, a digitizer circuit 227 receives the signal D1 and performs digitalization by using a hysteresis characteristic to send a signal F1. A sum signal generator circuit 228 generates a sum signal C2 of an output signal A2 of the photosensor 220 and an output signal B2 of the photosensor 221, while a difference signal generator circuit 229 generates a difference signal D2 of the signals A2 and B2. A digitizer circuit 230 sends a bi-level signal E2 of the signal C2. Further, a digitizer circuit 231 receives the signal D2 and performs digitalization by using a hysteresis characteristic to provide a signal F2. An EXCLUSIVE-OR gate 232 receives the signals F1 and F2 and generates an EXCLUSIVE OR signal J. An AND gate 233 receives signals E1 and E2 and generates an AND signal K.

The operation of the apparatus explained above is as follows. As shown in FIG. 29, when light exiting the collimator lens 202 enters the entrance pupil of the condenser lens 216, 217 as the movable body 203 moves, the light reaches a focal point of the condenser lens. The focal point exists along an axis which is parallel to the light exiting the collimator lens 202 and passes through a center thereof. Therefore, the amount of displacement of the movable body 203 in x-axis direction is equal to the amount of displacement of the focal points of the condenser lenses 216 and 217. The photosensors 218 and 219 exist on a trace of the focal point of the condenser lens 217. Then, the condensed beam scans the photosensors as the movable body 203 moves.

Next, generation of a reference position signal from the signals A1, A2, B1 and B2 is explained with reference to FIG. 31 which shows waveforms in the signal processor 222 when the movable body 203 moves in the positive direction. As the condensed beam obtained by the condenser lens 216 moves from the photosensor 218 to 219, signals A1 and B1 are provided by the photosensors 218 and 219. Then, the difference signal D1 changes from a negative value to a positive value. If the digitalization is performed with a hysteresis characteristic to prevent noise included in the signal D1, a signal F1 is provided. Similarly, as the condensed beam obtained by the condenser lens 217 moves from the photosensor 220 to 221, signals A2 and B2 are provided by the photosensors 220 and 221. Then, a signal F2 is obtained by digitizing the signal D2. A moving distance of the body 203 from a leading edge of the signal F1 to that of the signal F2 or from a leading edge of the signal F2 to that of the signal F1 is given as a difference from a distance between a position of the moving body 203 where the outputs of the first and second photosensors 218 and 219 become equal to each other in a moving direction of the body 203 and a position of the moving body 203 where the outputs of the third and fourth photosensors 220 and 221 becomes equal to each other and a distance between a center of the beam condensed by the first condenser lens 216 and that of the beam condensed by the second condenser lens 217. Therefore, if the beam condensed by the first condenser lens 216 and the second condenser lens 217 exist on the photosensors, a signal J of a prescribed width can be obtained as a reference position signal of the movable body 203 by using an EXCLUSIVE-OR operation of the signals F1 and F2.

Next, a sum signal C1 of the signals A1 and B1 and a sum signal C2 of the signals A2 and B2 are digitized to obtain signals E1 and E2. It is detected from the signals E1 and E2 that the condensed beam exists on the photosensors. Then, by using an AND operation with the signal J, a position detection signal K of the movable body 203 is obtained. Further, because an edge of the signal K is obtained at a zero point of difference signals D1 and D2, it is not affected by intensity fluctuation of the light source 201. Furthermore, because the signal D1 is a difference signal between the signals A1 and B1 and the signal D2 is a difference signal between the signals A2 and B2, common mode noise in the signals such as noise due to scattered light on the photosensors cancel each other. A signal change rate around zero of the signals D1 and D2 with respect to a displacement of the movable body 203 in the x-axis direction becomes about twice as large as that of only the signal A1, B1, A2 or B2. Therefore, an error of the reference position signal due to noise can be reduced. Thus, the signal K is used as a correct reference signal with a prescribed width.

As explained above, in the present embodiment, the first and second condensing beams are formed from the light emitted by the light source with two lenses provided on the movable body, and are detected by the first and second photosensors and by the third and fourth photosensors, respectively. Then, a pulse signal is generated according to a difference signal between the outputs of the first and second photosensors and that of the outputs of the third and fourth photosensors. Therefore, a signal of reference position of a prescribed pulse width can be obtained without being affected by fluctuations of the intensity of the light emitted by the light source and with a precision which is not deteriorated much by noise.

A Fresnel zone plate of the amplitude type or phase type may be used instead of the condenser lens 216, 217. A shading member 223 is provided in the embodiment for preventing the light exiting the collimator lens 202 outside the entrance pupil of the condenser lens from entering the photosensors. However, a lens having a focal point outside the optical axis may be used as the condenser lenses 216 and 217 so as to provide the focal point outside the optical path or for the light exiting the collimator lens not to illuminate the photosensors directly. The photosensors 218, 219, 220 and 221 are set at a focal point at the back side of the condenser lenses 216 and 217 in the embodiment in order to decrease the size of the condensed beam. However, they may not be set on the focal point. Because a center of the condensed beam of the condenser lenses 216 and 217 exists on a line which is parallel to the light going out from the collimator lens 202 and passes the center or the condenser lenses 216 and 217, the amount of displacement of the movable body 203 in the x direction is equal to that of the center of the condensed beam. The photosensors 218, 219, 220 and 221 are arranged in a plane perpendicular to the z-axis in the above-mentioned example. However, they may be located in a plane oblique with respect to the z-axis. Furthermore, though the photosensors 218, 219, 220 and 221 are arranged in a same plane in the above-mentioned example, they may be located in different planes. The light source 201 may be a light-emitting diode or the like instead of the laser light source.

Ninth Embodiment

Figure 32:
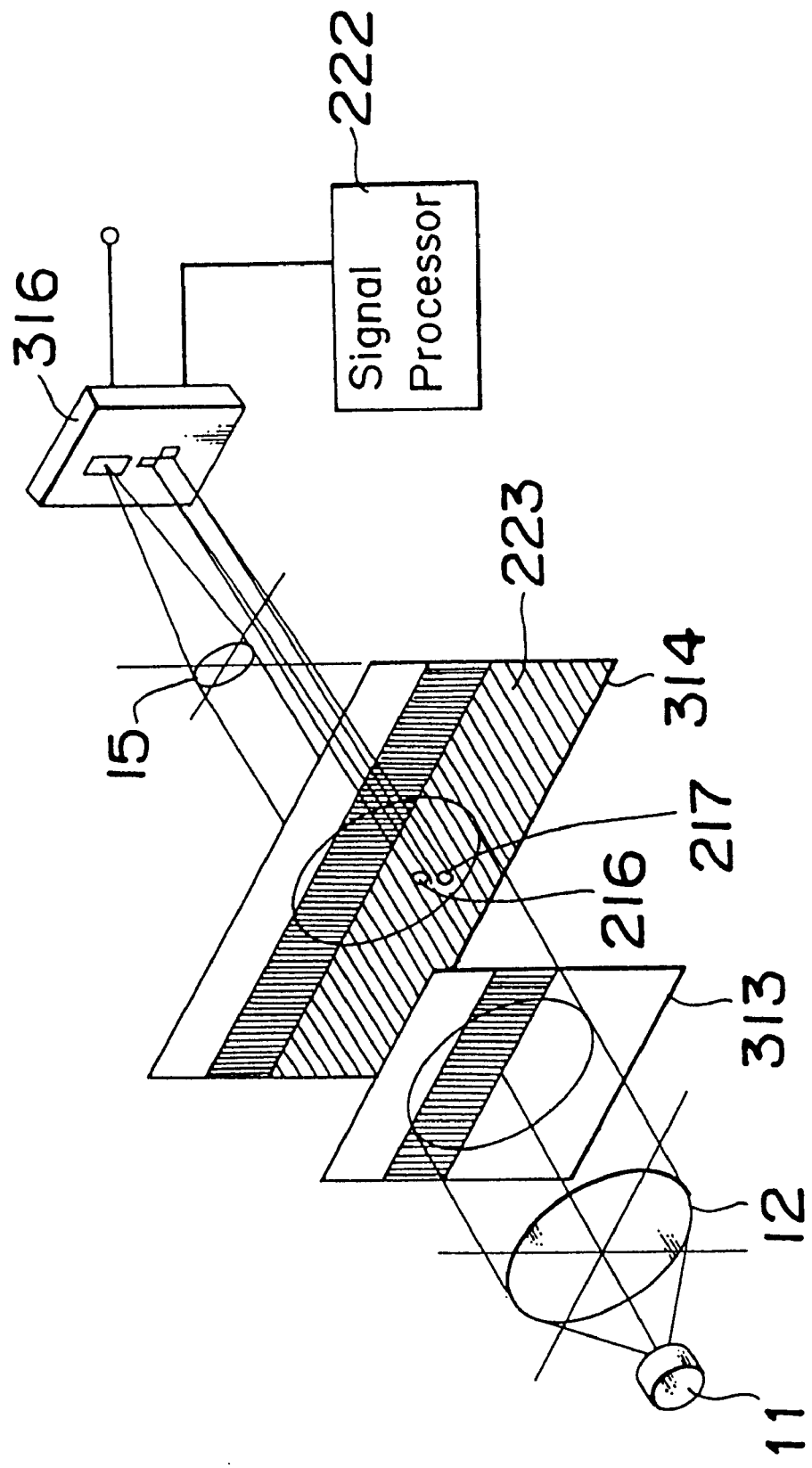
FIG. 32 is a diagram of a ninth embodiment of the present invention.
Figure 33:
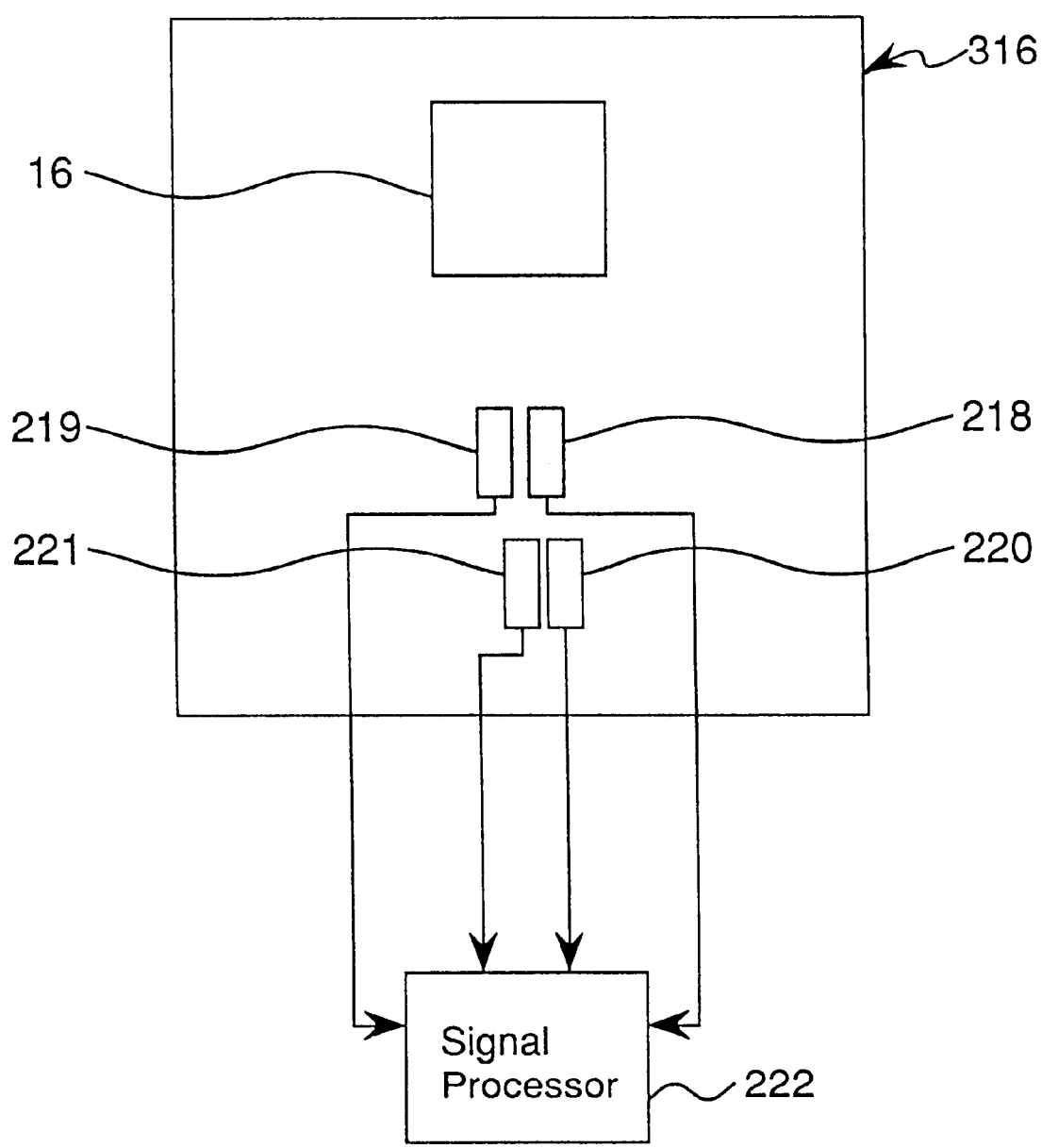
FIG. 33 is diagram of a photosensor in the embodiment.

FIG. 32 shows a basic structure of a ninth embodiment of the present invention and FIG. 33 shows a structure of a optical detection section. First, a structure of an A/B phase signal output section is explained. In FIG. 32, light source 11 comprises a laser diode or a light-emitting diode having a relatively high coherence. A collimator lens 12 collimates a light emitted by the light source 11. A fixed diffraction plate 313 has a grating of a rectangular wave section and is arranged so as to be perpendicular to an optical axis of the collimated light. A movable diffraction plate 314 has a grating of a rectangular wave section and is movable in the x direction perpendicular to the optical axis. The grating of the fixed diffraction plate 313 has a period which is the same as that of the movable diffraction plate 314. A step difference "d" of the height between the tops and bottoms of the fixed and movable diffraction plates 313 and 314 has a relationship which satisfies Eq. (1). A condenser lens 15 condenses light transmitted through the movable diffraction plate 314. The entrance pupil of the lens 15 is limited to be within D−2gλ/p, wherein "D" denotes a size of the beam collimated by the collimator lens 12, "g" denotes a distance between the fixed diffraction plate 313 and the movable diffraction plate 314, λ denotes the wavelength of the light and "p" denotes a the of the gratings formed on the diffraction plates. A distance between the diffraction plates 313 and 314 is set to satisfy the inequality g<pD/(2λ).

An optical detection section 316 shown in detail in FIG. 33 includes photosensors 16, 218, 219, 220 and 221. In contrast to the optical detection section shown in FIG. 29, the photosensor 16 is included, which converts a diffracted image condensed by the lens 15 into an electrical signal.

Next, a Z phase signal output section is explained. The first photosensor 218 and the second photosensor 219 are not arranged on a trace of a focal point of the Fresnel zone plate 217. A gap between the first and second photosensors 218 and 219 in a moving direction of the movable diffraction plate 314 is smaller than a size of the beam condensed by the condenser lens 216 on the photosensors 218 and 219. The third photosensor 220 and the fourth photosensor 221 are arranged on a trace of a focal point of the Fresnel zone plate 217 outside a trace of a focal point of the Fresnel zone plate 216. A gap between the third and fourth photosensors 220 and 221 in a moving direction of the movable diffraction plate 314 is smaller than a size of the beam condensed by the Fresnel zone plate 217 on the photosensors.

A width of the photosensors 218 and 219 in the x-axis direction is larger than a size of the condensed beam by the Fresnel zone plate 216 at the photosensors, while a width of the photosensors 220 and 221 in the x-axis direction is larger than a size of the condensed beam by the Fresnel zone plate 217 at the photosensors.

As explained above, the gap of the first and second photosensors 218 and 220 in the x-axis direction is smaller than a diameter of a beam condensed by the Fresnel zone plate 216 at least on the photosensors, while the gap between the first and second photosensors 218 and 220 is smaller than a diameter of a beam condensed by the Fresnel zone plate 217 on the photosensors. Furthermore, a distance between a position where the outputs of the first and second photosensors along a moving direction of the movable diffraction plate 314 become equal to each other and a position where the outputs of the third and fourth photosensors along a moving direction of the movable diffraction plate 314 become equal to each other is different by a prescribed value from a distance between a center of the first Fresnel zone plate 216 and that of the second plate 217. When a part of the beam condensed by the first Fresnel zone plate 216 exists on the first or second photosensor 218 and 219, a part of the beam condensed by the second Fresnel zone plate 217 exists on the third or fourth photosensor 220 or 221.

Reference numeral 222 denotes a signal processor which receives output signals of the photosensors 218, 219, 220 and 221 and provides a position detection signal. A shading section 223 is provided on the movable diffraction plate 314 and shades the light exiting the collimator lens 12 outside the entrance pupil of the Fresnel zone plates 216 and 217 in order to prevent the light exiting the collimator lens 12 from illuminating the photosensors 218, 219, 220 and 221 in a region wherein the movable diffraction plate 314 moves.

Figure 30:
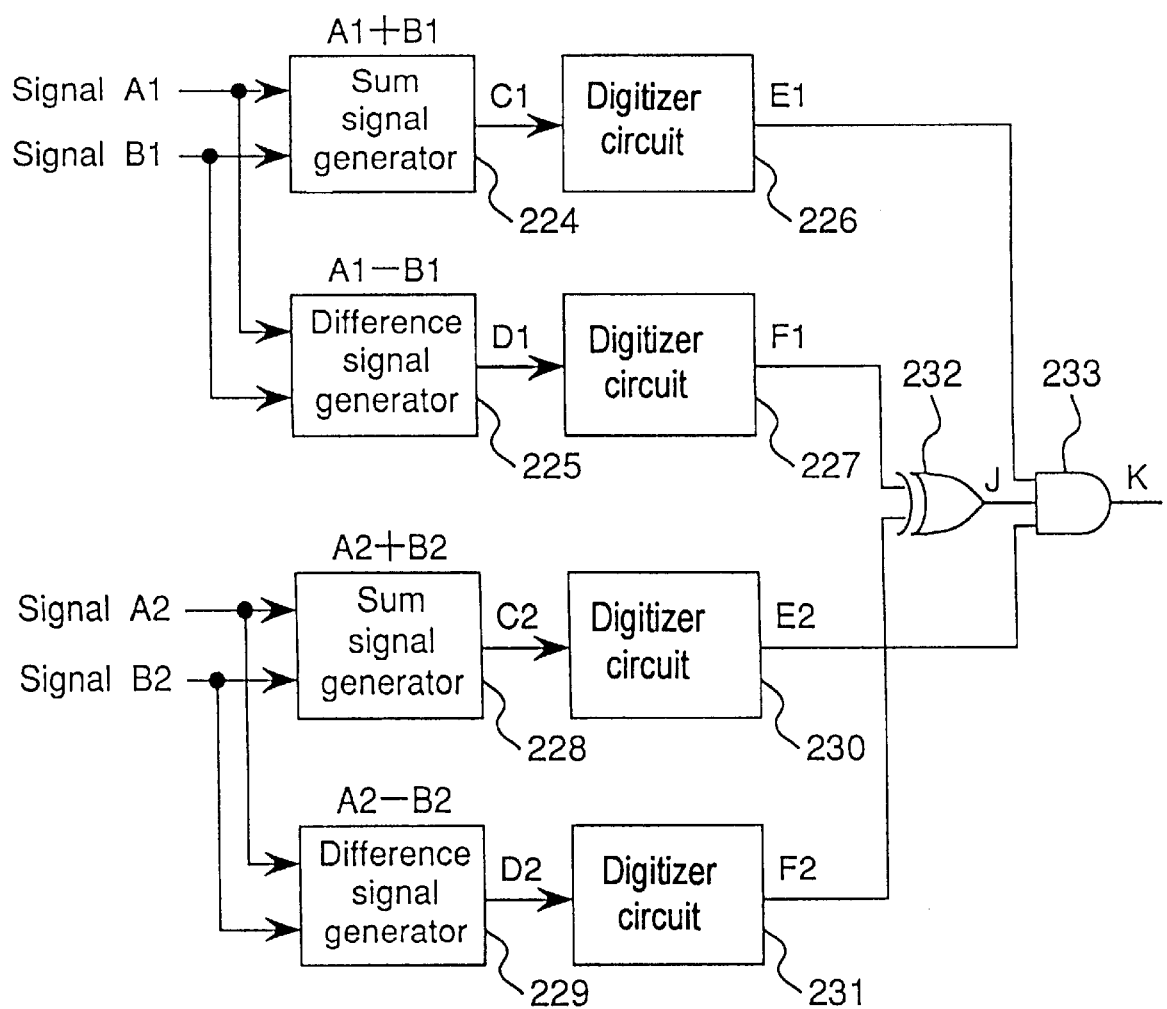
FIG. 30 is a block diagram of a signal processor of the embodiment.
Figure 31:
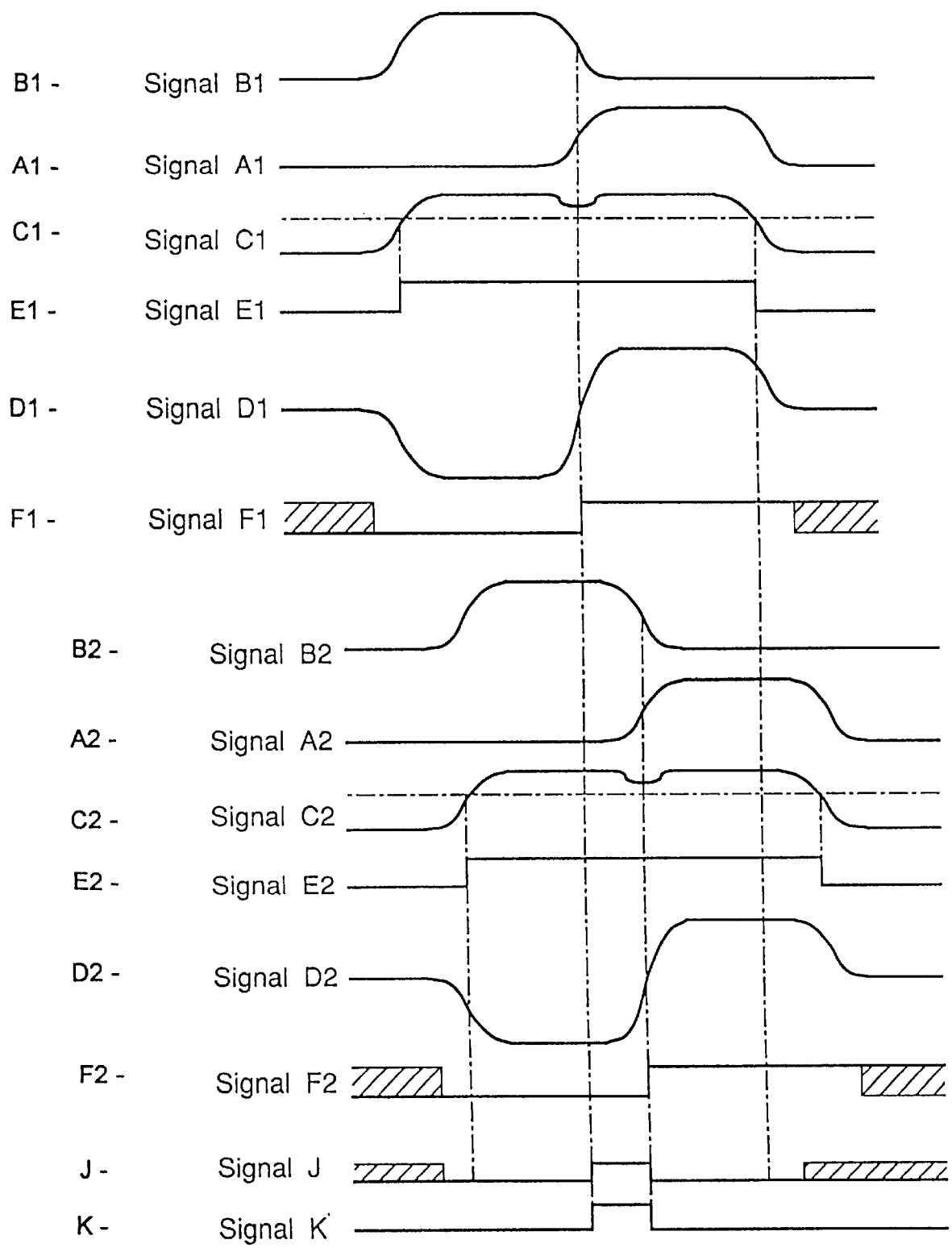
FIG. 31 is a waveform diagram of each portion in the signal processor in the embodiment.

The signal processor 222 is shown in FIG. 30, and has already been explained. The sum signal generator circuit 224 generates a sum signal C1 of an output signal A1 of the photosensor 218 and an output signal B1 of the photosensor 219, while the difference signal generator circuit 225 generates a difference signal D1 of the signals A1 and B1. The digitizer circuit 226 provides a bi-level signal E1 of the signal C1. Further, the digitizer circuit 227 receives the signal D1 and performs digitalization by using a hysteresis characteristic to send a signal F1. The sum signal generator circuit 228 generates a sum signal C2 of an output signal A2 of the photosensor 220 and an output signal B2 of the photosensor 221, while the difference signal generator circuit 229 generates a difference signal D2 of the signals A2 and B2. The digitizer circuit 230 sends a bi-level signal E2 of the signal C2. Further, the digitalization circuit 231 receives the signal D2 and performs binarization by using a hysteresis characteristic to provide a signal F2. The EXCLUSIVE-OR gate 232 receives the signals F1 and F2 and generates an EXCLUSIVE OR signal J. The AND gate 233 receives signals E1 and E2 and generates an AND signal K.

As to the apparatus explained above, first the operation of the A/B phase signal output section is explained. Light emitted by the light source 11 is collimated by the lens 12 and enters the fixed diffraction plate 313 generally vertically. Because the step difference "d" of the height between the tops and bottoms of the fixed diffraction plate 13 has the relationship of Eq. (1), most of the energy is concentrated in diffracted light of orders ±1. Therefore, the light entering the fixed diffraction plate 313 is diffracted and exits as diffracted light. The diffracted light enters the movable diffracted plate 314 and exits as diffracted light. As in the fixed diffraction plate 313, most of the energy of the diffracted light exiting the movable diffraction plate 314 is concentrated in diffracted light of orders ±1. The entrance pupil of the lens 15 is limited to be within D−2gλ/p, as described above.

The region limited to be within D−2gλ/p is explained with reference to FIG. 12. A diffraction angle of a diffracted light 110 of order +1 is λ/p. If λ/p is sufficiently small, the diffracted light of order +1 is diffracted only by gλ/p at a point distant by a distance "g". Similarly, diffracted light 111 of order −1 is also diffracted by gλ/p. In the drawing, a region enclosed by solid lines denotes a region of the diffracted light of order +1, while a region enclosed by dashed lines denotes a region of the diffracted light of order −1. Therefore, a region displayed with D−2gλ/p denotes a region where the diffracted light of orders ±1 interfere with each other. In the region, diffracted light from the movable diffraction plate 314 which is parallel to the optical axis is condensed by the lens 15. The light condensed by the lens 15 is detected by the photosensor 16.

In the apparatus described above, an output of a double frequency is obtained as in the prior art. Furthermore, the degree of modulation can be improved very much as explained in the first embodiment. FIG. 13 shows a modulation characteristic in this case. The degree of modulation in this case is 1.00. Thus, the position can be detected precisely.

Though the aperture is limited by the entrance pupil of the lens 15 in the embodiment, it is understood that similar advantages can be realized by using limitation with a pin hole or the like of the same size.

Next, the Z phase signal output section is explained. As shown in FIG. 29, when light exiting the collimator lens 202 enters the entrance pupil of the Fresnel zone plates 216 and 217 as the movable diffraction plate 314 moves, the light reaches focal points of the Fresnel zone plates. The focal point exists along an axis which is parallel to the light exiting the collimator lens and passes through a center of the Fresnel zone plate. Therefore, the mount of displacement of the movable diffraction plate 314 in x-axis direction is equal to the amount of displacement of the focal points of the Fresnel zone plates 216 and 217. The photosensors 218 and 219 exist on a trace of the focal point of the Fresnel zone plate 216, while the photosensors 220 and 221 exist on a trace of the focal point of the Fresnel zone plate 217. Then, the condensed beam scans the photosensors as the movable diffraction plate 314 moves.

Next, the generation of a reference position signal from the signals A1, A2, B1 and B2 is explained with reference to FIG. 19 which shows waveforms in the signal processing means 222 when the movable body 203 moves in the positive direction. As the condensed beam obtained by the Fresnel zone plate 216 moves from the photosensor 218 to 219, signals A1 and B1 are obtained from the photosensors 218 and 219. Then, the difference signal D1 changes from a negative value to a positive one. If the digitalization is performed with a hysteresis characteristic to prevent noise from being included in the signal D1, a signal F1 is obtained. Similarly, as the condensed beam obtained by the Fresnel zone plate 217 moves from the photosensor 220 to 221, signals A2 and B2 are obtained from the photosensors 220 and 221. Then, a signal F2 is obtained by digitizing the signal D2.

A moving distance of the movable diffraction plate 314 from a leading edge of the signal F1 to that of the signal F2 or from a leading edge of the signal F2 to that of the signal F1 is given as a difference from a distance between a position of the movable diffraction plate 314 where the outputs of the first and second photosensors become equal to each other in a moving direction of the movable diffraction plate 314 and a position of the movable diffraction plate 314 where the outputs of the third and fourth photosensors becomes equal to each other and a distance between a center of the beam condensed by the first Fresnel zone plate 216 and that of the beam condensed by the second Fresnel zone plate 217. Therefore, if the beam condensed by the first Fresnel zone plate 216 and the second Fresnel zone plate 217 exist on the photosensors, a signal F of a prescribed width can be obtained as a reference position signal by using an exclusive-or operation of the signals F1 and F2.

Next, a sum signal C1 of the signals A1 and B1 and a sum signal C2 of the signals A2 and B2 are digitized to obtain signals E1 and E2. It is detected from the signals E1 and E2 that the condensed beam exists on the photosensors. Then, by using a logic product operation with the signal J, a position detection signal K of the movable diffraction plate 314 is obtained. Further, because an edge of the signal K is obtained at a zero point of difference signals D1 and D2, it is not affected by intensity fluctuation of the light source 201. Furthermore, because the signal D1 is a difference signal between the signals A1 and B1 and the signal D2 is a difference signal between the signals A2 and B2, noise of the same phase in the signals such as noise due to scattered light on the photosensors cancel each other. A signal change rate around zero of the signals D1 and D2 with respect to a displacement of the movable diffraction plate 314 in the x-axis direction becomes about double that of only the signal A1, B1, A2 or B2. Therefore, an error of the reference position signal due to noise can be reduced. Thus, the signal K is used as a correct reference signal with a prescribed width.

The photosensors 218, 219, 220 and 221 are set at a back focal point of the Fresnel zone plates 216 and 217 in the embodiment in order to decrease the size of the condensed beam. However, they may not be set on the focal point. This is because a center of the condensed beam of the focussing lens 216 and 217 exists on a line which is parallel to the light exiting the collimator lens 202 and passes the center or the Fresnel zone plates 216 and 217, and the amount of displacement of the movable diffraction plates 314 in the x direction is equal to that of the center of the condensed beam. The photosensors 218, 219, 220 and 221 are arranged in a plane perpendicular to z-axis in the above-mentioned example. However, they may be located in a plane oblique with respect to z-axis. Furthermore, although the photosensors 218, 219, 220 and 221 are arranged in the same plane in the above-mentioned example, they may be located in different planes. The light source 1 may be a light-emitting diode or the like instead of the laser light source.

In the embodiment, because the entrance pupil of the condenser lens 15 is limited to be within $D-2g\lambda/p$, the degree of modulation is good and an angle signal is obtained precisely. As explained above, the first and second condensed beams are formed from the light emitted by the light source 11 with two Fresnel zone plates 216 and 217 provided on the movable body 314, and they are detected by the first and second photosensors 218 and 219 and by the third and fourth photosensors 220 and 221, respectively. Then, a pulse signal is generated according to a difference signal between the outputs of the first and second photosensors 218 and 219 and that of the outputs of the third and fourth photosensors 220 and 221. Therefore, a signal of the reference position of a prescribed pulse width can be obtained without being affected by fluctuations of the intensity of the light emitted by the light source 11 and with a precision which is not deteriorated much by noise. Furthermore, because the diffraction plate 314 and the Fresnel zone plates 216 and 217 can be produced simultaneously by a stamper, the productivity is high and the cost is low.

Tenth Embodiment

Figure 34:
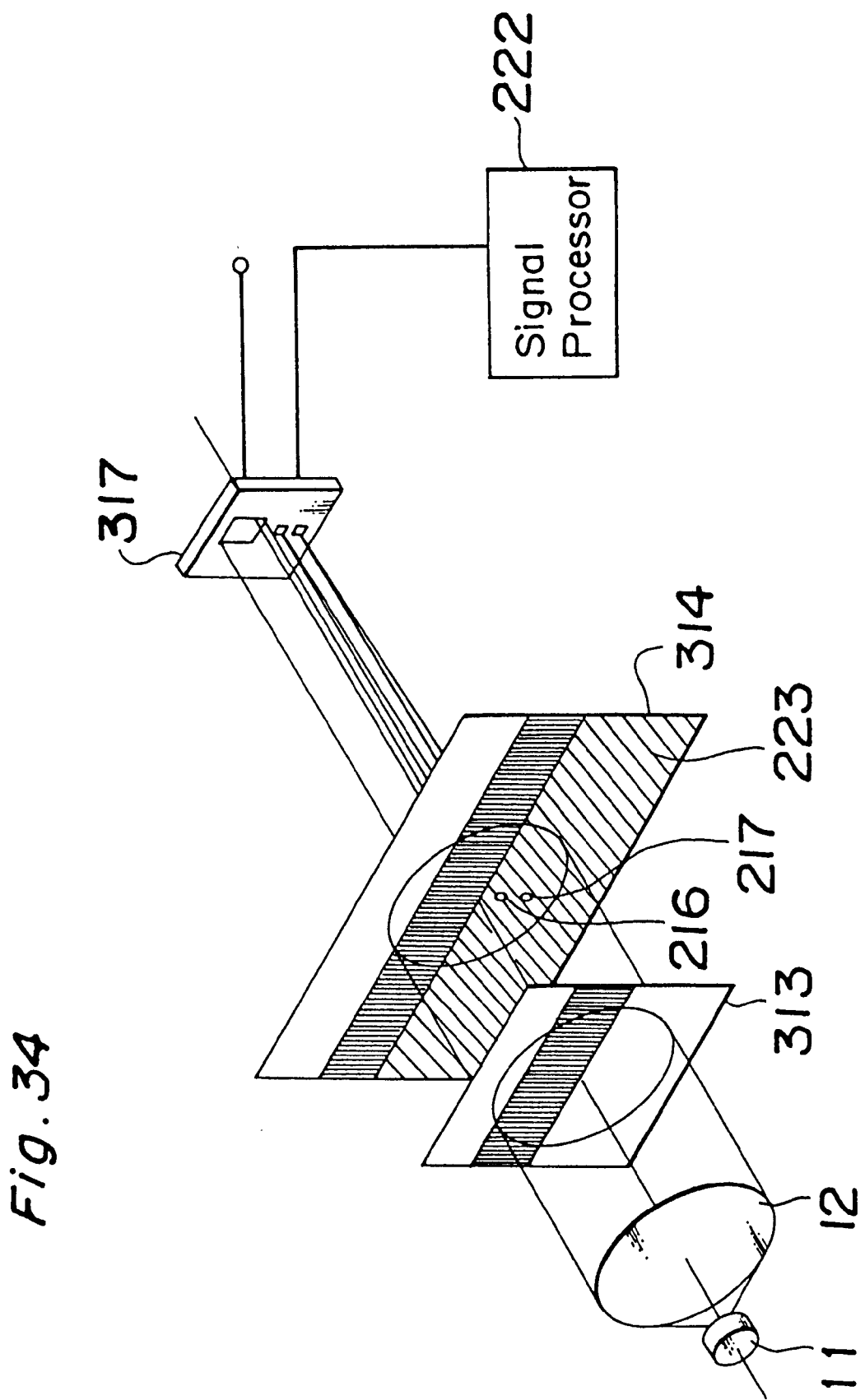
FIG. 34 is a diagram of a tenth embodiment of the present invention.
Figure 35:
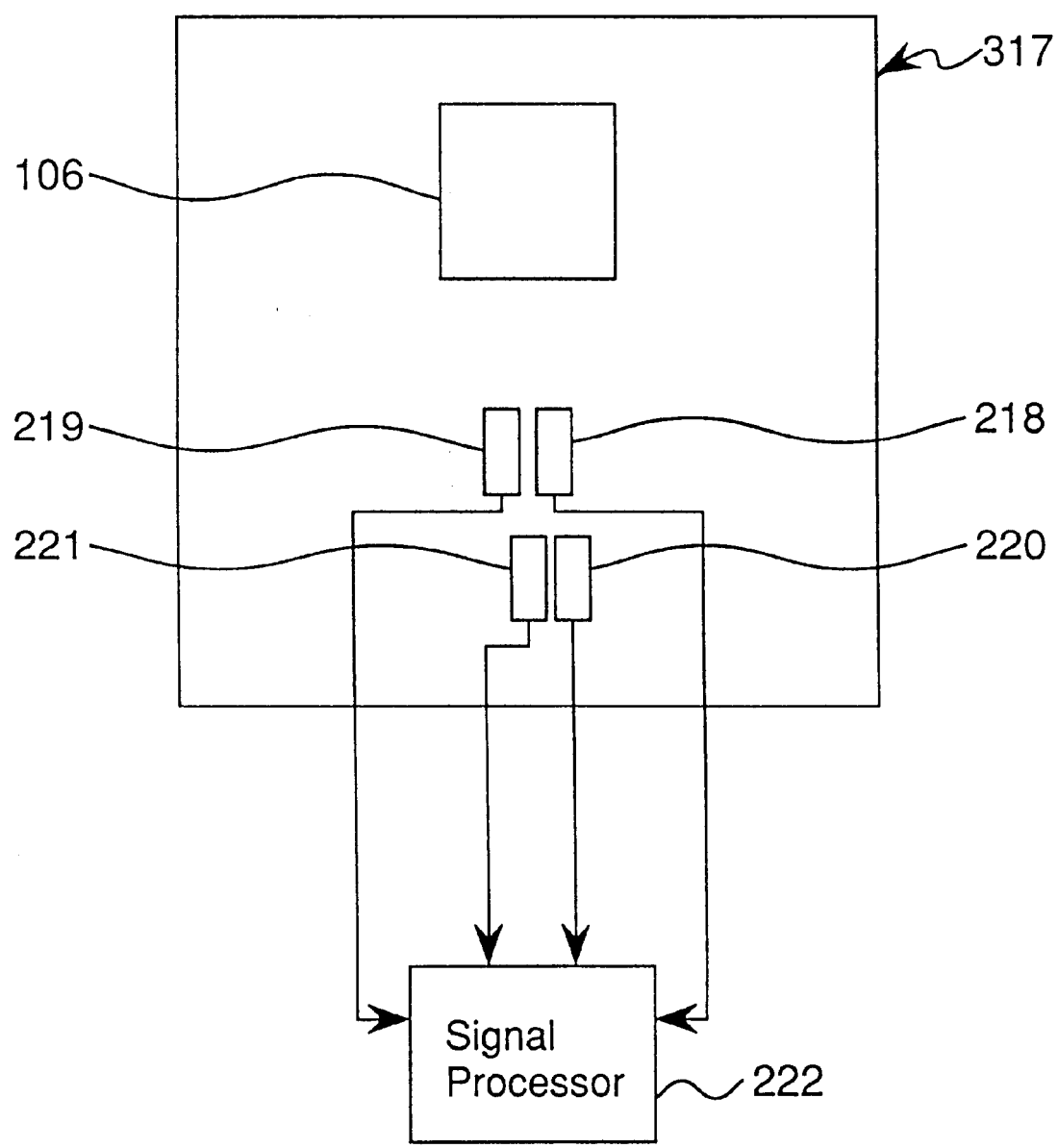
FIG. 35 is a diagram of a photosensor in the embodiment.

FIG. 34 shows a basic structure of a tenth embodiment of the present invention and FIG. 35 shows a structure of a optical detection section 317. First, a structure of an A/B phase signal output section is explained which is similar to that of the ninth embodiment shown in FIG. 32. A light source 11 emits coherent light and a collimator lens 12 collimates the light. A fixed diffraction plate 313 has a grating of a rectangular wave section and is arranged so as to be perpendicular to an optical axis of the collimated light. A movable diffraction plate 314 has a grating of a rectangular wave section and is movable in an x direction perpendicular to the optical axis. The grating of the fixed diffraction plate 313 has a period which is the same as that of the movable diffraction plate 314. A step difference "d" of the height between the tops and bottoms of the fixed and movable diffraction plates 313 and 314 has a relationship which satisfies Eq. (1). The optical detection section 317 shown in FIG. 35 includes photosensors 106, 218, 219, 220 and 221. The photosensor 106 is set at a distance of $pD/(2\lambda)-g$ or more from a movable diffraction plate 314, wherein D denotes a size of a beam collimated by the collimator lens 12, g denotes a distance between a fixed diffraction plate 313 and the movable diffraction plate 314, $\lambda$ denotes wavelength of a light, and p denotes a pitch of the diffraction plates. The photosensor 106 receives light limited to a width of $D-2g\lambda/p$. This embodiment differs from the ninth embodiment in that this embodiment does not use a condenser lens 15 in contrast to the ninth embodiment.

Next, a Z phase signal output section is explained. A first photosensor 218 and a second photosensor 219 are not arranged on a trace of a focal point of the Fresnel zone plate 217. A gap between the first and second photosensors 218 and 219 in a moving direction of the movable diffraction plate 314 is smaller than a size of the beam condensed by the condenser lens 216 on the photosensors 218 and 219. A third photosensor 220 and a fourth photosensor 221 are arranged on a trace of a focal point of the Fresnel zone plate 217 outside a trace of a focal point of the Fresnel zone plate 216. A gap between the third and fourth photosensors 220 and 221 in a moving direction of the movable diffraction plate 314 is smaller than a size of the beam condensed by the Fresnel zone plate 217 on the photosensors. A width of each of the photosensors 218 and 219 in the x-axis direction is larger than a size of the condensed beam by the Fresnel zone plate 216 at the photosensors, while a width of each of the photosensors 220 and 221 in the x-axis direction is larger than a size of the condensed beam by the Fresnel zone plate 217 at the photosensors.

As explained above, the gap of the first and second photosensors 218 and 220 in the x-axis direction is smaller than a diameter of a beam condensed by the Fresnel zone plate 216 at least on the photosensors, while the gap between the first and second photosensors 218 and 220 is smaller than a diameter of a beam condensed by the Fresnel zone plate 217 on the photosensors. Furthermore, a distance between a position where the outputs of the first and second photosensors along a moving direction of the movable diffraction plate 314 become equal to each other and a position where the outputs of the third and fourth photosensors along a moving direction of the movable diffraction plate 314 become equal to each other is different by a prescribed value from a distance between a center of the first Fresnel zone plate 216 and that of the second one 217. When a part of the beam condensed by the first Fresnel zone plate 216 exists on the first or second photosensor 218 and 219, a part of the beam condensed by the second Fresnel zone plate 217 exists on the third or fourth photosensor 220 or 221. Reference numeral 222 denotes a signal processor which receives outputs of the photosensors 218, 219, 220 and 221 and outputs a position detection signal. A shading section 223 is provided on the movable diffraction plate 314 and shades the light exiting the collimator lens 12 outside the entrance pupil of the Fresnel zone plates 216 and 217 in order to prevent the light exiting the collimator lens 12 from illuminating the photosensors 218, 219, 220 and 221 in a region wherein the movable diffraction plate 314 moves.

The signal processor 222 is shown in FIG. 30, and has already been explained. The sum signal generator circuit 224 generates a sum signal C1 of an output signal A1 of the photosensor 218 and an output signal B1 of the photosensor 219, while the difference signal generator circuit 225 generates a difference signal D1 of the signals A1 and B1. The digitizer circuit 226 provides a bi-level signal E1 of the signal C1. Further, the digitizer circuit 227 receives the signal D1 and performs digitalization by using a hysteresis characteristic to output a signal F1. The hysteresis is set to have a value larger than a maximum amplitude of noise included in the signal D1. The sum signal generator circuit 228 generates a sum signal C2 of an output signal A2 of the photosensor 220 and an output signal B2 of the photosensor 221, while the difference signal generator circuit 229 generates a difference signal D2 of the signals A2 and B2. The digitizer circuit 230 provides a bi-level signal E2 of the signal C2. Further, the digitizer circuit 231 receives the signal D2 and performs digitalization by using a hysteresis characteristic to output a signal F2. The hysteresis is set to have a value larger than a maximum amplitude of noise included in the signal D2. The EXCLUSIVE-OR gate 232 receives the signals F1 and F2 and generates an EXCLUSIVE-OR signal J. An AND gate 233 receives signals E1 and E2 and generates an AND signal K.

As to the apparatus explained above, first an operation of the A/B phase signal output section in is explained next, with reference to FIG. 15. Light emitted by the light source 11 is collimated by the lens 12 and enters the fixed diffraction plate 313 generally vertically. The light entering the fixed diffraction plate 313 is diffracted and exits as diffracted light.

Diffracted light exiting the movable diffraction plate 314 is expressed as (n, m), wherein n denotes an order of diffraction of the fixed diffraction plate 313 and m denotes an order of diffraction of the movable diffraction plate 314. Then, an area denoted as "a" shows an area of (−1, +1) and (+1, −1), an area denoted as "b" shows an area of (−1, +1), an area denoted as "c" shows an area of (+1, −1), an area denoted as "d" shows an area of (−1, −1) and an area denoted as "e" shows an area of (+1, +1). However, diffracted light of orders of 3 or more has been omitted for convenience in FIG. 15. A light-receiving plane of a photosensor 106 is set so that a distance from the movable diffraction plate 314 is $pD/(2\lambda)-g$ or more and the light is limited to be in a region within $D-2g\lambda/p$. Therefore, the photosensor 106 detects the light only in the area "a".

Next, the Z phase signal output section is explained. As shown in FIG. 29, when light exiting the collimator lens 202 enters the entrance pupil of the Fresnel zone plates 216 and 217 as the movable diffraction plate 314 moves, the light reaches focal points of the Fresnel zone plates. The focal point exist along an axis which is parallel to the light exiting the collimator lens and passes through a center of the Fresnel zone plate. Therefore, the amount of displacement of the movable diffraction plate 314 in the x-axis direction is equal to the amount of displacement of the focal points of the Fresnel zone plates 216 and 217. The photosensors 218 and 219 exist on a trace of the focal point of the Fresnel zone plate 216, while the photosensors 220 and 221 exist on a trace of the focal point of the Fresnel zone plate 217. Then, the condensed beam scans the photosensors as the movable diffraction plate 314 moves.

Next, the generation of a reference position signal from the signals A1, A2, B1 and B2 is explained with reference to FIG. 31 which shows the waveforms in the signal processor 222 when the movable body 203 moves in the positive direction. As the condensed beam obtained by the Fresnel zone plate 216 moves from the photosensor 218 to 219, signals A1 and B1 are obtained from the photosensors 218 and 219. Then, the difference signal D1 changes from a negative value to a positive one. If the digitalization is performed with a hysteresis characteristic to prevent noise included in the signal D1, a signal F1 is obtained. Similarly, as the condensed beam obtained by the Fresnel zone plate 217 moves from the photosensor 220 to 221, signals A2 and B2 are obtained from the photosensors 220 and 221. Then, a signal F2 is obtained by digitizing the signal D2.

A moving distance of the movable diffraction plate 314 from a leading edge of the signal F1 to that of the signal F2 or from a leading edge of the signal F2 to that of the signal F1 is given as a difference from a distance between a position of the movable diffraction plate 314 where the output signals of the first and second photosensors become equal to each other in a moving direction of the movable diffraction plate 314 and a position of the movable diffraction plate 314 where the output signals of the third and fourth photosensors becomes equal to each other and a distance between a center of the beam condensed by the first Fresnel zone plate 216 and that of the beam condensed by the second Fresnel zone plate 217. Therefore, if the beam condensed by the first Fresnel zone plate 216 and the second one 217 exist on the photosensors, a signal F of a prescribed width can be obtained as a reference position signal by using an EXCLUSIVE-OR operation of the signals F1 and F2.

Next, a sum signal C1 of the signals A1 and B1 and a sum signal C2 of the signals A2 and B2 are digitized to obtain signals E1 and E2. It is detected from the signals E1 and E2 that the condensed beam exists on the photosensors. Then, by using an AND operation with the signal J, a position detection signal K of the movable diffraction plate 314 is obtained. Further, because an edge of the signal K is obtained at a zero point of difference signals D1 and D2, it is not affected by intensity fluctuation of the light source 201. Further, because the signal D1 is a difference signal between the signals A1 and B1 and the signal D2 is a difference signal between the signals A2 and B2, noise of the same phase in the signals such as noise due to scattered light on the photosensors cancel each other. A signal change rate around zero of the signals D1 and D2 with respect to a displacement of the movable diffraction plate 314 in the x-axis direction becomes about double that of only the signal A1, B1, A2 or B2. Therefore, an error of the reference position signal due to noise can be reduced. Thus, the signal K is used as a correct reference signal with a prescribed width.

In the embodiment, the degree of modulation is improved by using only the area wherein the diffracted light of orders ±1 interfere with each other. Because a condenser lens is not needed, the number of components is reduced and the weight of the decoder can be decreased. Further, because the diffraction plates and the Fresnel zone plates can be produced simultaneously by a stamper, the productivity is high and the cost is low.

The photosensors 218, 219, 220 and 221 are set at a focal point at the back of the Fresnel zone plates 216 and 217 in the embodiment in order to decrease the size of the condensed beam. However, they may not be set on the focal point. This is because a center of the condensed beam of the focussing lens 216 and 217 exists on a line which is parallel to the light exiting the collimator lens 202 and passes the center or the Fresnel zone plates 216, 217, and the amount of displacement of the movable diffraction plates 314 in the x direction is equal to that of the center of the condensed beam. The photosensors 218, 219, 220 and 221 are arranged in a plane perpendicular to the z-axis in the above-mentioned example. However, they may be located in a plane oblique with respect to the z-axis. Further, although the photosensors 218, 219, 220 and 221 are arranged in the same plane in the above-mentioned example, they may be located in different planes. The light source 11 may be a light-emitting diode or the like instead of the laser light source.

Eleventh Embodiment

Figure 36:
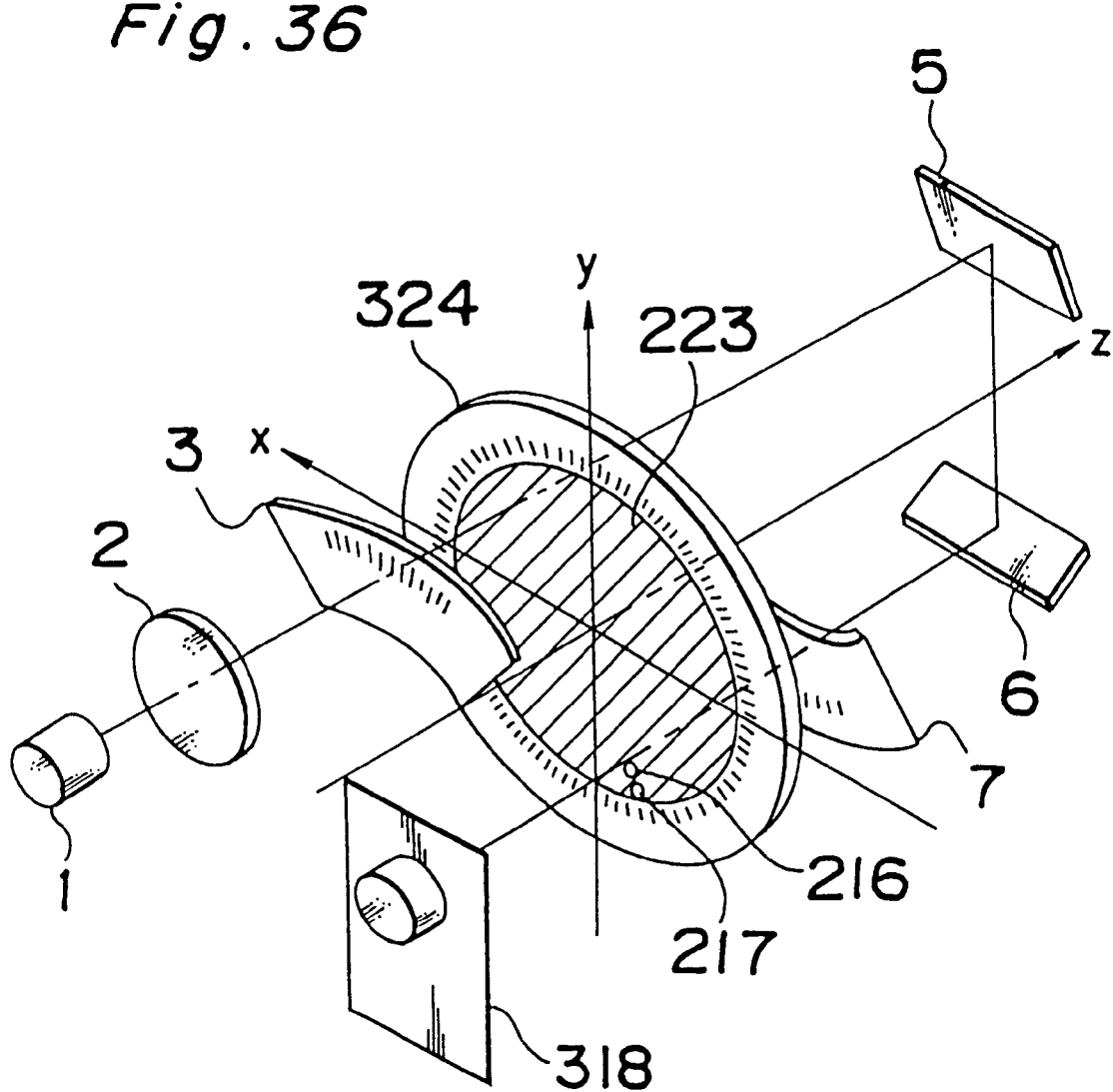
FIG. 36 is a perspective view of an eleventh embodiment of the present invention.
Figure 37:
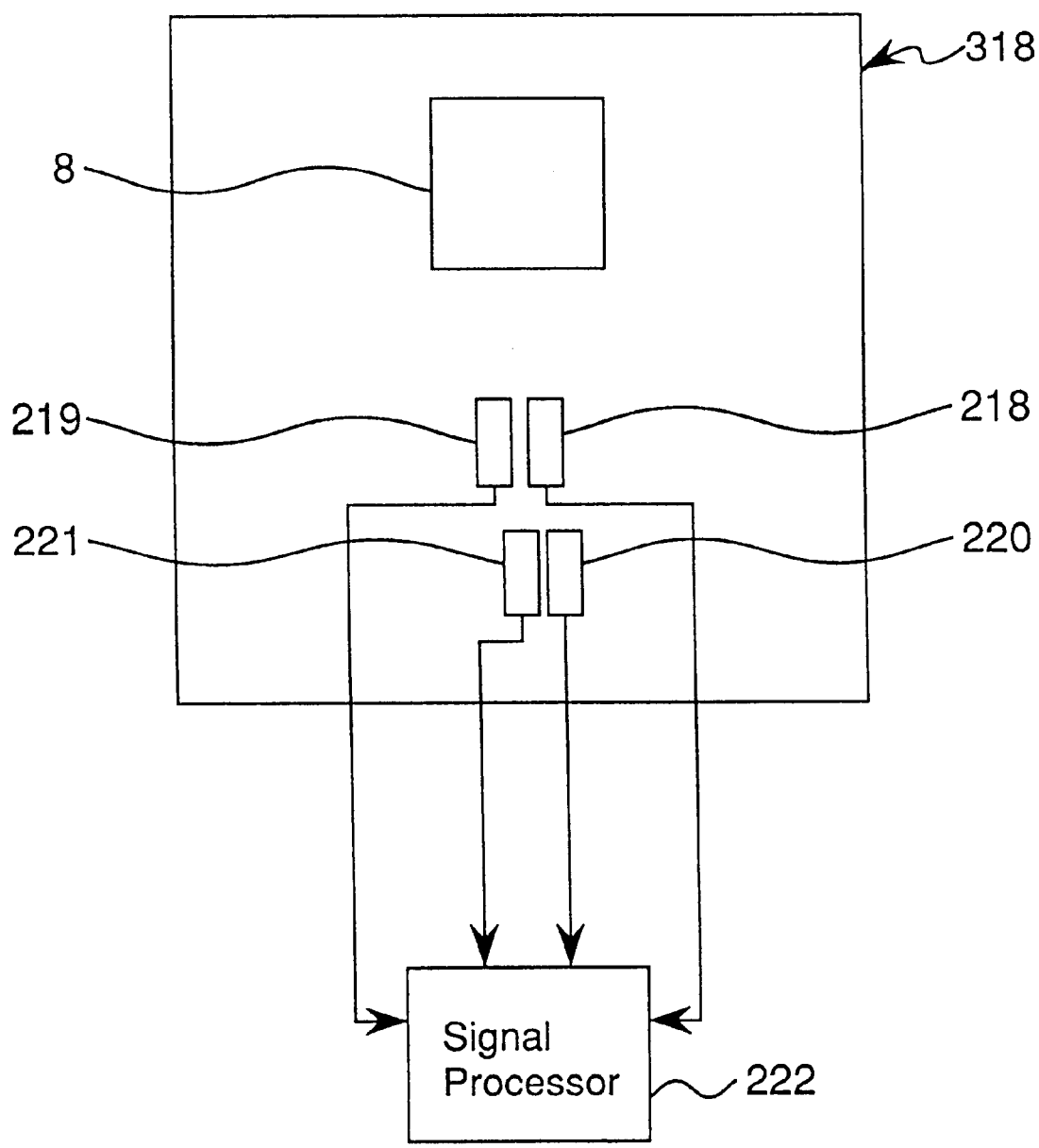
FIG. 37 is a diagram of photosensors in the embodiment.

FIG. 36 shows a basic structure of an eleventh embodiment of the present invention and FIG. 37 shows a structure of a photosensor. First, a structure of an A/B phase signal output section is explained. A collimator lens 2 collimates light emitted by a coherent light source 1 of wavelength λ. A first fixed plate 3 has a grating of a rectangular wave section which can transmit diffracted light only of orders ±1, and a rotary plate 324 has a grating of a rectangular wave section which can transmit diffracted lights only of orders ±1 of diffraction angles which are the same as those of the first fixed plate 3. The rotary plate 324 has grooves in radial directions on a circumference and includes first and second Fresnel zone plates 216 and 217. Mirrors 5 and 6 guide the light exiting the rotary plate 324 to a symmetrical position with respect to the rotation center thereof. A second fixed plate 7 has a grating of a rectangular wave section which can transmit diffracted light only of orders ±1 of diffraction angles which are the same as those of the first fixed plate 3. A optical detection section 318 includes photosensors 8, 218, 219, 220 and 221, as shown in detail in FIG. 37.

Next, a Z phase signal output section is explained. The first photosensor 218 and the second photosensor 219 are arranged on a trace of a focal point of the Fresnel zone plate 216 and not on a trace of a focal point of the Fresnel zone plate 217. A gap between the first and second photosensors 218 and 219 in a moving direction of the rotary plate 324 is smaller than a size of the beam condensed by the condenser lens 216 on the photosensors 218 and 219. The third photosensor 220 and the fourth one 221 are arranged on a trace of a focal point of the Fresnel zone plate 217 outside a trace of a focal point of the Fresnel zone plate 216. A gap between the third and fourth photosensors 220 and 221 in a moving direction of the rotary plate 324 is smaller than a size of the beam condensed by the Fresnel zone plate 217 on the photosensors. A width of the photosensors 218 and 219 in the x-axis direction is larger than a size of the condensed beam by the Fresnel zone plate 216 at the photosensors, while a width of the photosensors 220 and 221 in the x-axis direction is larger than a size of the condensed beam by the Fresnel zone plate 217 at the photosensors. A gap of the first and second photosensors 218 and 220 in the x-axis direction is smaller than a diameter of a beam condensed by the Fresnel zone plate 216 at least on the photosensors, while a gap between the first and second photosensors 218 and 220 is smaller than a diameter of a beam condensed by the Fresnel zone plate 217 on the photosensors. A distance between a position where the outputs of the first and second photosensors 218 and 219 along a rotation direction of the rotary plate 324 become equal to each other and a position where the outputs of the third and fourth photosensors 220 and 221 along a rotation direction of the rotary plate 324 become equal to each other is different by a prescribed value from a distance between a center of the first Fresnel zone plate 216 and that of the second one 217. When a part of the beam condensed by the first Fresnel zone plate 216 exists on the first or second photosensor 218 and 219, a part of the beam condensed by the second Fresnel zone plate 217 exists on the third or fourth photosensor 220 and 221.

Reference numeral 222 denotes a signal processor which receives outputs of the photosensors 218, 219, 220 and 221 and outputs a position detection signal. A shading section 223 is provided on the rotary plate 324 and shades the light exiting the collimator lens 12 outside the entrance pupil of the Fresnel zone plates 216 and 217 in order to prevent the light exiting the collimator lens 12 from illuminating the photosensors 218, 219, 220 and 221 in a region wherein the rotary plate 324 moves.

The signal processor 222 is shown in FIG. 30 and it has already been explained.

As to the embodiment constructed as explained above, first an operation of the A/B phase signal output section in is explained next. In FIG. 36, an optical path from the light source 1 to the mirror 5 viewing an x-y plane from a positive x direction is similar to FIG. 18. Then, the operation is explained by using FIG. 18. The light emitted by the light source 1 is collimated by the collimator lens 2 and enters the first fixed plate 3. The light is separated by the first fixed plate 3 into diffracted light of orders ±1. The diffracted light of orders ±1 going out from the first fixed plate 3 enters the rotary plate 324 and it is separated into diffracted light of orders ±1. Because the diffraction angles of diffracted light of orders of ±1 at the first fixed plate 3 and the rotary plate 324 are the same, a light flux 31 is in parallel to a light flux 32. The light flux 31 denotes a light flux which is diffracted by the first fixed plate 3 along a positive x direction and is further diffracted along a negative x direction by the rotary plate 324, while the light flux 32 denotes a light flux which is diffracted by the first fixed plate 3 along a negative y direction and is further diffracted along a positive y direction by the rotary plate 324.

It is known that when a grating moves relative to an entering light, the phase of light of the diffracted light of orders ±1 leads or lags. That is, the phase of diffracted light of order +1 diffracted along a moving direction of the grating with respect to an optical axis of the entering light leads by $2\pi x/(\lambda \cdot p)$, wherein p denotes a pitch of the grating and $\lambda$ denotes wavelength of light. On the other hand, the phase of diffracted light of order +1 diffracted along a reverse direction of the moving direction of the grating with respect to an optical axis of the entering light lags by $2\pi x/(\lambda \cdot p)$. Therefore, the complex amplitudes of optical fluxes 31 and 32 are expressed as in Eq. (19), wherein $\theta$ denotes a rotation angle of the rotary plate 324, a moving direction of the grating of the rotary plate 324 being taken as a positive direction of the rotation angle $\theta$ in FIG. 18, N denotes a division number of the grating in the rotary plate 324 and r denotes a distance from a center of the rotary plate 324 to a beam illumination point on the rotary plate 324. The fluxes 31 and 32 are subjected to phase modulation by the rotary plate 324 are guided by the mirror 5 to a symmetrical position with respect to the rotation center of the rotary plate 324.

FIG. 19 corresponds to an optical path from the mirror 6 to the photosensor 8, viewing x-z plane from a positive y direction in FIG. 36. Therefore, the embodiment is explained by using FIG. 19. The light fluxes 31 and 32 exiting the mirror 6 are parallel and are separated by the second fixed plate 7 into diffracted light of orders ±1, respectively. The flux 31 is diffracted by the second fixed grating 7 along a negative x direction and further diffracted by the rotary plate 324 along a positive x direction to result in a flux 33. The flux 32 is diffracted by the second fixed grating 7 along a positive x direction and further diffracted by the rotary plate 324 along a negative x direction to result in a flux 34. The fluxes 33 and 34 are parallel to each other and are superposed to cause interference. When the rotary plate 324 rotates along a positive direction, the complex amplitudes of the fluxes 33 and 34 are expressed as in Eq. (20) because the moving direction of the rotary plate 324 is a negative x direction in FIG. 7. Further, an interference light amplitude of the fluxes 31 and 32 is calculated as in Eq. (21). The photosensor 8 detects an optical intensity expressed in Eq. (21) which shows that 4N pulses per rotation can be detected or four times the division number of the grating in the rotary plate can be obtained.

Next, accumulated errors are explained when an eccentricity amount $\epsilon$ of the rotary plate 324 occurs. If the rotary plate 324 has eccentricity, a rotation angle $\theta$ differs from a rotation angle $\theta_a$ with respect to the center of the rotary plate 324. The rotation angle $\theta_a$ is expressed as $\theta_a = \theta + (\epsilon/r) \cos \theta$ as found from the drawing. Therefore, the complex amplitudes of the fluxes 31 and 32 are expressed in Eq. (22). As to a symmetrical point of the particular point with respect to the rotation center of the rotary plate 324, $\theta_a = \theta - (\epsilon/r) \cos \theta$. Therefore, the complex amplitudes of the fluxes 33 and 34 are expressed in Eq. (23). An interference intensity of the fluxes 33 and 34 or an optical intensity received by the photosensor 8 is shown in Eq. (24). Because Eq. (24) does not have a term including an eccentricity amount $\epsilon$, it is found that there are no accumulated errors due to eccentricity, and it is also found that there are no intensity fluctuations.

Next, the Z phase signal output section is explained with reference to FIG. 29. As shown in FIG. 29, when light exiting the collimator lens 202 enters the entrance pupil of the Fresnel zone plates 216 and 217 as the rotary plate 324 rotates, the light reaches a focal point of the Fresnel zone plate. The focal point exist along an axis which is parallel to the light exiting the collimator lens and passes through a center of the Fresnel zone plate. Therefore, the amount of displacement of the rotary plate 324 in x-axis direction is equal to the amount of displacement of the focal points of the Fresnel zone plates 216 and 217. The photosensors 218 and 219 exist on a trace of the focal point of the Fresnel zone plate 217. Then, the condensed beam scans the photosensors as the rotary plate 324 rotates.

Next, the generation of a reference position signal from the signals A1, A2, B1 and B2 is explained with reference to FIG. 31 which shows waveforms in the signal processor 222 when the rotary plate 324 moves in the positive direction. As the condensed beam obtained by the Fresnel zone plate 216 moves from the photosensor 218 to 219, signals A1 and B1 are obtained from the photosensors 218 and 219. Then, the difference signal D1 changes from a negative value to a positive one. If the digitalization is performed with a hysteresis characteristic to prevent noise from being included in the signal D1, a signal F1 is obtained. Similarly, as the condensed beam obtained by the Fresnel zone plate 217 moves from the photosensor 220 to 221, signals A2 and B2 are obtained from the photosensors 220 and 221. Then, a signal F2 is obtained by binarizing the signal D2.

A moving distance of the rotary plate 324 from a leading edge of the signal F1 to that of the signal F2 or from a leading edge of the signal F2 to that of the signal F1 is given as a difference from a distance between a position of the rotary plate 324 where the outputs of the first and second photosensors become equal to each other in a moving direction of the rotary plate 324 and a position of the body where the outputs of the third and fourth photosensors becomes equal to each other and a distance between a center of the beam condensed by the first Fresnel zone plate 216 and that of the beam condensed by the second Fresnel zone plate 217. Therefore, if the beam condensed by the first Fresnel zone plate 216 and the second Fresnel zone plate 217 exist on the photosensors, a signal F of a prescribed width can be obtained as a reference position signal of the rotary plate 324 by using an EXCLUSIVE-OR operation of the signals F1 and F2.

Next, an OR signal C1 of the signals A1 and B1 and an OR signal C2 of the signals A2 and B2 are digitized to obtain signals E1 and E2. It is detected from the signals E1 and E2 that the condensed beam exists on the photosensors. Then, by using an AND operation with the signal J, a position detection signal K of the rotary plate 324 is obtained. Further, because an edge of the signal K is obtained at a zero point of difference signals D1 and D2, it is not affected by intensity fluctuation of the light source 201. Further, because the signal D1 is a difference signal between the signals A1 and B1 and the signal D2 is a difference signal between the signals A2 and B2, common mode noise in the signals such as noise due to scattered light on the photosensors cancel each other. A signal change rate around zero of the signals D1 and D2 against a displacement of the rotary plate 324 in the x-axis direction becomes about twice as large as that of only the signal A1, B1, A2 or B2. Therefore, an error of the reference position signal due to noise can be reduced. Thus, the signal K is used as a correct reference signal with a prescribed width.

The photosensors 218, 219, 220 and 221 are set at a focal point at the back side of the Fresnel zone plate 216, 217 in order to decrease the size of the condensed beam. However, they may not be set on the focal point. This is because a center of the condensed beam of the Fresnel zone plate 216 and 217 exists on a line which is parallel to the light exiting the collimator lens 202 and passes the center or the Fresnel zone plate 216 and 217; the amount of displacement of the rotary plate 324 in the x direction is equal to that of the center of the condensed beam. The photosensors 218, 219, 220 and 221 are arranged in a plane perpendicular to the z-axis in the above-mentioned example. However, they may be located in a plane oblique with respect to the z-axis. Further, though the photosensors 218, 219, 220 and 221 are arranged in a same plane in the above-mentioned example, they may be located in different planes. The light source 1 may be a light-emitting diode or the like instead of the laser light source.

A distance between the first fixed plate 3 and the rotary plate 324 is increased to separate the diffracted light of orders ±1 completely on the rotary plate 324 and it is equalized to a distance between the first fixed plate 3 and the rotary plate 324 to receive only fluxes 33 and 34 by the photosensor 8, so that signals of higher degree of modulation can be obtained.

As explained above, in the embodiment, the diffracted light of orders ±1 which are parallel to each other by the first fixed plate 3 and the rotary plate 324 having gratings are subjected to phase modulation. Next, they are further subjected to phase modulation at a symmetrical position with respect to the rotation center of the rotary plate 324. Then, they are interfered by the second fixed plate 7. Therefore, even if the rotary plate 324 has an eccentricity, an angle can be detected precisely, without being affected by the fluctuations of optical intensity very much and without accumulated errors. Thus, because the precise set up and precise adjustment of the rotary plate are not needed, the cost can be reduced, an encoder can be produced compactly and the resolution can be improved. Furthermore, an encoder is also not affected by the eccentricity of an axis due to a load very much, and a bearing can be made compactly. Furthermore, because the diffraction plate 324 and the Fresnel zone plates 216 an d 217 can be produced simultaneously by a stamper, the productivity is high and the cost is low.

In the embodiments 9–11, Fresnel zone plates are used to produce a condensed beam. However, a condenser lens may be used instead of the Fresnel zone plate. On the other hand, a Fresnel zone plate may be used to form a condensed beam instead of a condenser lens in the above-mentioned embodiments wherein a condenser lens is used.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. An apparatus for measuring a displacement of a moving body comprising:

a light source for providing a coherent collimated beam of wavelength $\lambda$ and diameter "D";

a fixed diffraction plate and a movable diffraction plate each comprising a grating of pitch "p", said grating having main diffraction components of orders ±1, said fixed and movable diffraction plates being arranged in parallel to each other with a distance "g" between them, said plates being provided in an optical path of the collimated beam so as to be perpendicular to an optical axis of the collimated beam so that the collimated beam is diffracted by the gratings in the fixed and movable diffraction plates successively; and an optical detector for detecting an amount of a light substantially caused by interference of diffraction components of orders ±1, said diffraction components being generated by the successive diffraction by the first and second diffraction plates, said optical detector comprising a condenser lens and a photosensor, said condenser lens having an entrance pupil size which is within $D-2g\lambda/p$, wherein said condenser lens condenses the light transmitted through said fixed and movable diffraction plates, and said photosensor detecting light condensed by said condenser lens;

whereby a displacement of the movable diffraction plate can be detected from the detected amount of light.

2. The apparatus according to claim 1, wherein said movable diffraction plate is a plate which can translate in a direction which is perpendicular to an optical axis of the collimated beam.

3. The apparatus according to claim 1, wherein said movable diffraction plate is a plate which can rotate with a rotation axis which is parallel to an optical axis of the collimated beam.

4. An apparatus for measuring a displacement of a moving body comprising:

a movable diffraction plate comprising a grating of pitch p, said grating having main diffraction components of orders ±1;

a light source for providing a beam of wavelength $\lambda$, said beam having an angle $\Theta$ relative to a normal to said movable diffraction plate so that $\sin(\Theta)=\pm\lambda/p$;

a lens for condensing light diffracted by the movable diffraction plate; and a photosensor for detecting the light condensed by said lens.

5. The apparatus according to claim 4, wherein said light source comprises a triangular prism which refracts a coherent beam entering the prism perpendicularly, said prism having an angle of deflection equal to an angle of diffraction of said movable diffraction plate.

6. The apparatus according to claim 4, wherein said movable diffraction plate is a plate which can translate in a direction which is perpendicular to an optical axis of the collimated beam.

7. The apparatus according to claim 4, wherein said movable diffraction plate is a plate which can rotate with a rotation axis which is parallel to an optical axis of the collimated beam.

8. The apparatus according to claim 4, wherein said movable diffraction plate is a plate which can translate in a direction which is perpendicular to an optical axis of said beam.

9. The apparatus according to claim 4, wherein said movable diffraction plate is a plate which can rotate with a rotation axis parallel to an optical axis of said beam.

10. An apparatus for measuring a displacement of a moving body comprising:

a light source for providing a coherent collimated beam of wavelength $\lambda$;

a rotary plate which can rotate around a rotation axis, said rotary plate comprising a grating of pitch p of a ring-like shape which is symmetrical with respect to the rotation axis, said grating having main diffraction components of orders ±1;

a first optical element for transmitting the coherent collimated beam to provide a beam to said rotary plate, said beam having an angle Θ relative to a normal to said rotary plate so that sin(Θ)=±λ/p;

an optical guide for guiding a beam transmitted through said first optical element and the grating of said rotary plate to a second optical element at a position which is symmetrical with respect to the rotation axis of said rotary plate;

said second optical element transmitting the beam guided by said optical guide to said rotary plate, wherein the beam with respect to said rotary plate has an angle Θ relative to a normal of said rotary plate so that sin(Θ)=±λ/p; and an optical detector for detecting an amount of a light transmitted through the second optical element and said rotary plate successively to cause interference of diffraction components of orders ±1;

whereby a displacement of the rotary plate can be detected from the detected amount of light.

11. The apparatus according to claim 10, wherein said first optical element is a first fixed plate comprising a second grating, said grating having main diffraction components of orders ±1, said second grating having a pitch which is the same as that of the grating of said rotary plate, said first fixed plate and rotary plate being arranged in parallel to each other, said first fixed plate and rotary plate being provided in an optical path of the collimated beam so as to be perpendicular to an optical axis of the collimated beam so that the collimated beam is diffracted by said first fixed plate and said rotary plate successively.

12. The apparatus according to claim 10, wherein said second optical element is a first fixed plate comprising a second grating, said grating having main diffraction components of orders ±1, said second grating having a pitch which is the same as that of the grating of said rotary plate, said first fixed plate and rotary plate being arranged in parallel to each other, said first fixed plate and rotary plate being provided in an optical path of the collimated beam so as to be perpendicular to an optical axis of the collimated beam so that the collimated beam is diffracted by said first fixed plate and said rotary plate successively.

13. The apparatus according to claim 10, wherein said first optical element is a triangular prism which refracts a coherent beam entering the prism perpendicularly, said prism having an angle of deflection equal to an angle of diffraction of said rotary plate.

14. The apparatus according to claim 10, wherein said second optical element is a triangular prism which refracts a coherent beam entering the prism perpendicularly, said prism having an angle of deflection equal to an angle of diffraction of said rotary plate.

15. An apparatus for measuring a displacement of a moving body comprising:

a light source for providing a coherent collimated beam;

a first fixed diffraction plate comprising a first grating, said grating having main diffraction components of orders ±1; and a rotary cylinder which can rotate around a rotation center which is perpendicular to an optical axis of the collimated beam, said rotary cylinder comprising a second grating of a ring-like shape symmetrical with respect to the rotation center, said second grating having a pitch which is the same as that of the first grating, said second grating having main diffraction components of orders ±1;

a second fixed diffraction plate comprising a third grating, said second fixed diffraction plate being arranged in parallel to the first fixed diffraction plate, said third grating having main diffraction components of orders ±1 and having a diffraction angle equal to main diffraction components of the first fixed plate, said third grating having a pitch which is the same as that of the first fixed diffraction plate, said second fixed diffraction plate being provided in the rotary cylinder so that the collimated light is diffracted by the first grating, the second grating, the third grating and the second grating successively; and an optical detector for detecting an amount of light substantially caused by interference of diffraction components of orders ±1, said diffraction components being generated by the successive diffraction by the first, second and third gratings;

whereby a displacement of the rotary cylinder can be detected from the detected amount of light.

16. An apparatus for measuring a displacement of a moving body comprising:

a light source for providing a coherent collimated beam;

a movable body which can pass an optical path of the collimated beam in a direction which is perpendicular to the collimated beam;

a first condenser which is attached to the movable body, said first condenser condensing the collimated beam;

first and second photosensors for detecting an amount of light only of the beam condensed by the first condenser, said first and second photosensors having a gap between them which is smaller than a diameter of the collimated beam in a moving direction of the movable body, said first and second photosensors each having a width which is larger than the diameter of the collimated beam; and a signal processor for generating a difference signal between output signals of the first and second photosensors, whereby a position of the movable body can be determined according to the difference signal.

17. The apparatus according to claim 16, further comprising:

a second condenser which is attached to the movable body, said second condenser condensing the collimated beam; and third and fourth photosensors for detecting a amount of light of only the beam collimated by the second condenser, said third and fourth photosensors having a gap between them which is smaller than a diameter of the collimated beam in a moving direction of the movable body, said third and fourth photosensors having a width which is larger than the diameter of the collimated beam;

wherein said signal processor further generates a second difference signal between output signals of the third and fourth photosensors and generates a pulse signal from the first and second difference signals, whereby a position of the movable body can be determined according to the pulse signal.

18. The apparatus according to claim 17, wherein at least one of the first and second condensers comprises a condenser lens.

19. The apparatus according to claim 17, wherein at least one of the first and second condensers comprises a Fresnel zone plate.

20. The apparatus according to claim 17, further comprising:
- a fixed diffraction plate and a movable diffraction plate each comprising a grating of pitch "p", said grating having main diffraction components of orders ±1, said fixed and movable diffraction plates being arranged in parallel to each other with a distance "g" between them, said plates being provided in an optical path of the collimated beam so as to be perpendicular to the optical axis of the collimated beam so that the collimated beam is diffracted by the gratings in the fixed and movable diffraction plates successively; and
- an optical detector for detecting an amount of a light substantially caused by interference of diffraction components of orders ±1, said diffraction components being generated by the successive diffraction by the first and second diffraction plates, said optical detector comprising a condenser lens and a photosensor, said condenser lens having an entrance pupil size which is within $D-2g\lambda/p$, wherein the condenser lens condenses the light transmitted through said fixed and movable diffraction plates, and said photosensor detecting light condensed by said condenser lens;
- wherein the first and second condensers attached to the movable diffraction plate and the coherent collimated beam each has a wavelength $\lambda$ and a diameter "D";
- whereby a displacement of the movable diffraction plate can be detected from the detected amount of light.

21. The apparatus according to claim 20, wherein said photosensor is arranged at a position which is distant from said fixed and movable diffraction plates by $D/2\lambda-g$ or more in a region which is within $D-2g\lambda/p$ around the optical axis.

22. The apparatus according to claim 17, further comprising:
- a first fixed diffraction plate comprising a first grating, said grating having main diffraction components of orders ±1; and
- a rotary plate which can rotate around a rotation center, movable diffraction plate comprising a second grating of a ring-like shape which is symmetrical with respect to the rotation center, said second grating having a pitch which is the same as that of the first grating, said second grating having main diffraction components of orders ±1, said first fixed plate and said rotary plate being arranged in parallel to each other, said first fixed plate and said rotary plate being provided in an optical path of the collimated beam so as to be perpendicular to the optical axis of the collimated beam so that the collimated beam is diffracted by said first and second gratings successively; and
- an optical guide for guiding light transmitted through the first grating and said second grating to a second fixed plate at a position which is symmetrical with respect to the rotation center on said rotary plate; and
- a second fixed diffraction plate comprising a third grating, said second fixed diffraction plate being arranged in parallel to said rotary plate, said third grating having main diffraction components of orders ±1 and having a diffraction angle equal to main diffraction components of said first fixed plate, said third grating having a pitch which is the same as that of said first fixed diffraction plate, said second fixed diffraction plate being provided in an optical path from the optical guide so as to be perpendicular to the optical axis so that light guided by the optical guide is diffracted by said second and third gratings successively;
- an optical detector for detecting an amount of a light substantially caused by interference of diffraction components of orders ±1, said diffraction components being generated by the successive diffraction by said first, second and third gratings;
- wherein said first and second condensers are attached to the rotary plate in an optical path from the optical guide to the optical detector.

23. An apparatus for measuring a displacement of a moving body comprising:
- a light source for providing a coherent collimated beam of wavelength $\lambda$ and diameter "D";
- a fixed diffraction plate and a movable diffraction plate each comprising a grating of pitch "p", said grating having main diffraction components of orders ±1, said fixed and movable diffraction plates being arranged in parallel to each other with a distance "g" between them, said plates being provided in an optical path of the collimated beam so as to be perpendicular to an optical axis of the collimated beam so that the collimated beam is diffracted by the gratings in the fixed and movable diffraction plates successively; and
- an optical detector for detecting an amount of light substantially caused by interference of diffraction components of orders ±1, said diffraction components being generated by the successive diffraction by the first and second diffraction plates, wherein said optical detector comprises a photosensor arranged at a position distant from the fixed and movable diffraction plates by $D/2\lambda-g$ or more in a region which is within $D-2g\lambda/p$ around the optical axis;
- whereby a displacement of the movable diffraction plate can be detected from the detected amount of light.

24. The apparatus according to claim 23, wherein said movable diffraction plate is a plate which can translate in a direction which is perpendicular to the optical axis.

25. The apparatus according to claim 23, wherein said movable diffraction plate is a plate which can rotate with a rotation axis which is parallel to the optical axis.

* * * * *